(12) United States Patent
Kawamoto

(10) Patent No.: US 8,924,317 B2
(45) Date of Patent: Dec. 30, 2014

(54) INFORMATION PROCESSING APPARATUS, INFORMATION PROCESSING METHOD AND PROGRAM

(75) Inventor: Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 13/589,559

(22) Filed: Aug. 20, 2012

(65) Prior Publication Data

US 2013/0066817 A1  Mar. 14, 2013

(30) Foreign Application Priority Data

Sep. 9, 2011  (JP) .................................. 2011-196773

(51) Int. Cl.
G06N 5/00 (2006.01)
G06F 1/00 (2006.01)
G06N 99/00 (2010.01)

(52) U.S. Cl.
CPC .................................... G06N 99/005 (2013.01)
USPC ................................ 706/12; 709/226; 381/56

(58) Field of Classification Search
CPC ........... G06N 3/08; G06N 7/005; G06F 15/18
See application file for complete search history.

(56) References Cited

U.S. PATENT DOCUMENTS 7,215,631 B2 * 5/2007 Horibe et al. ............... 369/124.1
7,991,722 B1 * 8/2011 Hintz ............................... 706/45
2010/0262286 A1 * 10/2010 Eidenberger et al. ......... 700/246

FOREIGN PATENT DOCUMENTS

JP  2010-287028  12/2010

* cited by examiner

Primary Examiner — Jeffrey Gaffin
Assistant Examiner — Kalpana Bharadwaj
(74) Attorney, Agent, or Firm — Oblon, Spivak, McClelland, Maier & Neustadt, L.L.P.

(57) ABSTRACT

There is provided an information processing apparatus including an information amount gain calculation unit that, on the assumption that a factor that could cause a state transition in a state transition model occurs and the state transition takes place as a result of an occurrence of the factor, determines an information amount gain, which is an information amount obtained by causing the factor to occur regarding a causal relationship between the factor and the state transition and observing a result thereof, an evaluation value calculation unit that determines an evaluation value to evaluate effectiveness of causing each of the factors to occur based on the information amount gain to acquire the causal relationship between the factor and the state transition, and a decision unit that decides the factor to be occurred based on the evaluation value.

14 Claims, 18 Drawing Sheets

1

INFORMATION PROCESSING APPARATUS, INFORMATION PROCESSING METHOD AND PROGRAM

BACKGROUND

The present technology relates to an information processing apparatus, an information processing method, and a program, and in particular, relates to an information processing apparatus, an information processing method, and a program enabling an agent taking action to efficiently collect data used to learn a causal relationship.

To realize an agent such as a robot and intelligent machine acting in a so-called open environment like a home, instead of a pre-defined environment like, for example, a factory, self-developmental intelligence allowing the agent to collect necessary data by acting on its own in an environment without prior knowledge and to learn the environment by using the data is necessary.

In normal machine learning, how to learn by using data collected by an agent is important, but for an agent acting in an open environment, how to acquire (collect) data to be used for learning is also an important issue.

That is, when collecting data to be used for learning, instead of simply collecting data, it is necessary to collect data in such a way that important areas are covered.

In online learning that performs learning while collecting data, it is necessary to figure out a way to use appropriate data for learning in such an order that learning itself is efficiently furthered.

Japanese Patent Application Laid-Open No. 2010-287028 proposes an agent that efficiently collects data used for structural learning that acquires the structure of an environment in which the agent placed.

SUMMARY

Incidentally, no method of efficiently collecting data used for causal learning that acquires a causal relationship between an event such as a state transition and a factor as an element to cause the event in an environment without prior knowledge has been proposed.

The present technology has been developed in view of such circumstances and it is desirable to provide a technology capable of efficiently collecting data used to learn a causal relationship.

An information processing apparatus or a program according to an aspect of the present technology is an information processing apparatus or a program for causing a computer to function as the information processing apparatus, including an information amount gain calculation unit that, on the assumption that a factor that could cause a state transition in a state transition model occurs and the state transition takes place as a result of an occurrence of the factor, determines an information amount gain, which is an information amount obtained by causing the factor to occur regarding a causal relationship between the factor and the state transition and observing a result thereof, an evaluation value calculation unit that determines an evaluation value to evaluate effectiveness of causing each of the factors to occur based on the information amount gain to acquire the causal relationship between the factor and the state transition, and a decision unit that decides the factor to be occurred based on the evaluation value.

An information processing method according to an aspect of the present technology is an information processing method, including, on the assumption that a factor that could cause a state transition in a state transition model occurs and the state transition takes place as a result of an occurrence of the factor, determining an information amount gain, which is an information amount obtained by causing the factor to occur regarding a causal relationship between the factor and the state transition and observing a result thereof, determining an evaluation value to evaluate effectiveness of causing each of the factors to occur based on the information amount gain to acquire the causal relationship between the factor and the state transition, and deciding the factor to be occurred based on the evaluation value.

According to an aspect as described above, on the assumption that a factor that could cause a state transition in a state transition model occurs and the state transition occurs as a result of an occurrence of the factor, an information amount gain, which is an information amount obtained by causing the factor regarding a causal relationship between the factor and the state transition and observing a result thereof, is determined. Then, an evaluation value to evaluate effectiveness of causing each of the factors is determined based on the information amount gain to acquire the causal relationship between the factor and the state transition and the factor to be caused is decided based on the evaluation value.

The information processing apparatus may be an independent apparatus or an internal block constituting one apparatus.

The program can be provided by transmission via a transmission medium or by recording in a recording medium.

According to an aspect of the present technology, data used to learn a causal relationship can efficiently be collected.

DETAILED DESCRIPTION OF THE EMBODIMENTS

Embodiments of the present technology will be described below, but as preparations in a pre-stage thereof, an autonomously acting agent will be described.

[Configuration Example of an Autonomously Acting Agent]

Figure 1:
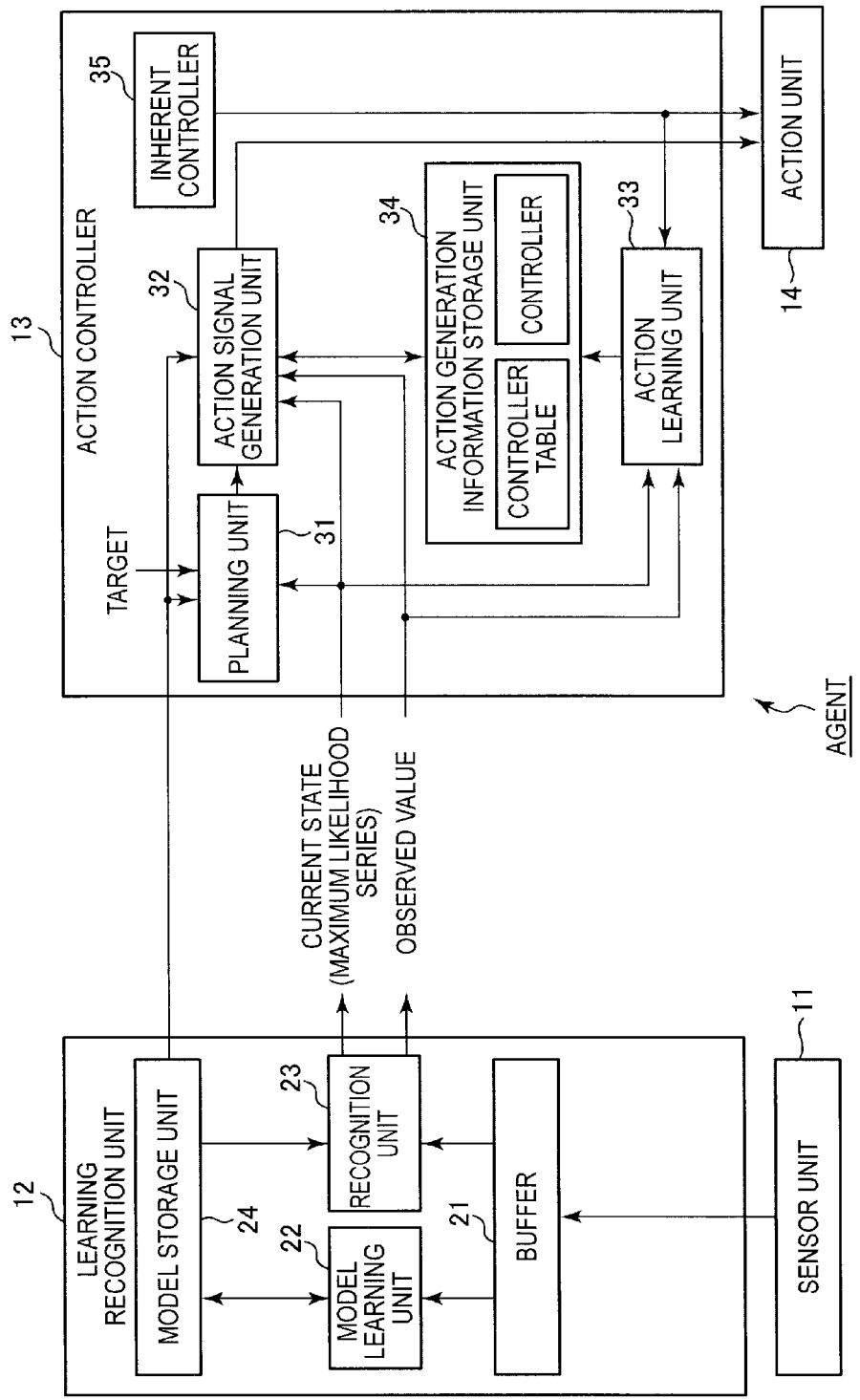
FIG. 1 is a block diagram showing a configuration example of an autonomously acting agent.

FIG. 1 is a block diagram showing a configuration example of an autonomously acting agent.

In FIG. 1, the agent includes a sensor unit 11, a learning recognition unit 12, an action controller 13, and an action unit 14.

The sensor unit 11 is configured by, for example, a camera that photographs a subject and outputs an image in which the subject appears and a sensor that senses a physical quantity like a detector that detects an angle of a rotating movable portion (not shown) of the action unit 14.

The sensor unit 11 outputs an image obtained as a result of sensing and in which a subject appears, information obtained by processing the image, the angle of the movable portion of the action unit 14 and the like in chronological order as observed values that can be observed.

(A time series) of observed values output by the sensor unit 11 is supplied to the learning recognition unit 12.

The learning recognition unit 12 includes a buffer 21, a model learning unit 22, a recognition unit 23, and a model storage unit 24 and learns a state transition model by using time-series data as a time series of observed values from the sensor unit 11 and recognizes the time-series data by using the state transition model after the learning.

That is, observed values from the sensor unit 11 are supplied to the buffer 21.

The buffer 21 sequentially stores observed values from the sensor unit 11.

The model learning unit 22 reads a time series of observed values stored in the buffer 21 as model learning data used for learning of a state transition model stored in the model storage unit 24 to learn the state transition model stored in the model storage unit 24 by using the model learning data.

The recognition unit 23 reads a time series of observed values stored in the buffer 21 as recognition data used for recognition of (a series) of states of a state transition model in which the time series is observed to recognize the state in which the recognition data is observed by using the state transition model stored in the model storage unit 24.

The model storage unity 24 stores state transition models.

As a state transition model stored in the model storage unit 24, a learning model including an internal state and having a transition model of the internal state and an observation model in which an observed value is observed (generated) from the internal state can be adopted.

That is, as a state transition model, for example, an HMM (Hidden Markov Model) having a transition probability of state transition between internal states from which observed values are observed (transition model) and an observation likelihood of observing an observed value from an internal state (observation model) can be adopted.

The model learning unit 22 learns to self-organize a state transition model stored in the model storage unit 24 (learning in which model parameters of the state transition model are decided by using only model learning data and model parameters are not forcibly controlled from outside) by using a times series of observed values stored in the buffer 21 as model learning data.

If the recognition unit 23 recognizes a state in which recognition data is observed by using a state transition model stored in the model storage unit 24, the recognition unit 23 determines the state probability of being in each state (internal state) of the state transition model and also determines a maximum likelihood series (maximum likelihood state series) as a series of states (internal states) in which a state transition in which the likelihood of observing recognition data is the greatest occurs in the transition model.

Then, the recognition unit 23 supplies the maximum likelihood series determined when recognition data is recognized, the observed value (latest observed value) as the last sample value of the recognition data, and the current state (last state of the maximum likelihood series) that is the state in which the latest observed value is observed of sample values of recognition data in the maximum likelihood series in which the recognition data is observed to the action controller 13 when necessary.

The action controller 13 controls action of an agent by using the state transition model stored in the model storage unit 24, the maximum likelihood series (containing the current state) supplied from the recognition unit 23, and the latest observed value.

That is, the action controller 13 includes a planning unit 31, an action signal generation unit 32, an action learning unit 33, an action generation information storage unit 34, and an inherent controller 35.

The current state (last state of the maximum likelihood series) from the recognition unit 23 is supplied to the planning unit 31 and also target information indicating the state to be a target of states of a state transition model is supplied from outside or inside the agent.

A state series (state series of the state transition model) reaching another state Se from a state Ss of the state transition model will be called a plan and also the initial state (state Ss) of the plan will be called a start state and the last state (state Se) of the plan will be called a target state.

The planning unit 31 refers to a state transition model stored in the model storage unit 24 to set, for example, the current state from the recognition unit 23 as the start state and the state represented by target information as the target state, creates planning to determine the state series whose likelihood of state transitions from the start state to the target state is the greatest as a plan, and supplies the plan obtained by the planning to the action signal generation unit 32.

In addition to the plan supplied from the planning unit 31, observed values and the current state from the recognition unit 23 are supplied to the action signal generation unit 32.

The action signal generation unit 32 determines (generates) an action signal (command) to cause the agent to take predetermined action such as action according to a plan from the planning unit 31 based on the state transition model stored in the model storage unit 24, action generation information stored in the action generation information storage unit 34, and observed values and the current state from the recognition unit 23 and supplies the action signal to the action unit 14.

The current state and the latest observed value from the recognition unit 23 are supplied to the action learning unit 33. Further, an action signal generated by the inherent controller 35 is supplied to the action learning unit 33.

The action learning unit 33 performs action learning that learns a relationship between an action signal to cause the agent to take predetermined action by using the current state and the latest observed value from the recognition unit 23 and an action signal from the inherent controller 35 and the state transition of the state transition model caused by the action according to the action signal being taken.

The action learning unit 33 obtains action generation information used to generate an action signal to cause a predetermined state transition of the state transition model by action learning and supplies the action generation information to the action generation information storage unit 34.

The action generation information storage unit 34 stores action generation information supplied from the action learning unit 33 and obtained as a result of action learning.

In FIG. 1, the action generation information includes a controller table and a controller.

If the state transition from some state $S_i$ to some state $S_j$ in a state transition model is denoted as $T_{ij}$, the controller is, for example, a function $F_{ij}(o)$ having an observed value o as input and outputs an action signal and which exists for each state transition $T_{ij}$.

The function $F_{ij}(o)$ as a controller is associated with a controller ID (Identification) specific to the controller and a state transition $T_{ij}$ and the controller ID of a controller (function $F_{ij}(o)$) to be used for generating an action signal to take action to cause the state transition $T_{ij}$ are associated in the controller table.

Therefore, to generate an action signal to take action to cause some state transition $T_{ij}$, the action signal generation unit 32 first refers to the controller table to recognize the controller ID associated with the state transition $T_{ij}$. Then, the action signal generation unit 32 generates an action signal by using the controller (function $F_{ij}(o)$) associated with the controller ID recognized from the controller table.

The inherent controller 35 randomly generates actions signals to cause the agent to take various kinds of action.

Alternatively, the inherent controller 35 generates a signal obtained by adding appropriate perturbation to a signal of a pattern decided by the designer of an agent or the like in advance as an action signal for the agent to take inherently possible action.

An action signal generated by the inherent controller 35 is supplied to the action unit 14 and the action learning unit 33.

The action unit 14 includes a movable portion (not shown) such as an arm and leg of an agent and an actuator to drive the movable portion.

In the action unit 14, the actuator drives the movable portion according to an action signal from the action signal generation unit 32 or the inherent controller 35 and the agent thereby takes predetermined action.

Figure 2:
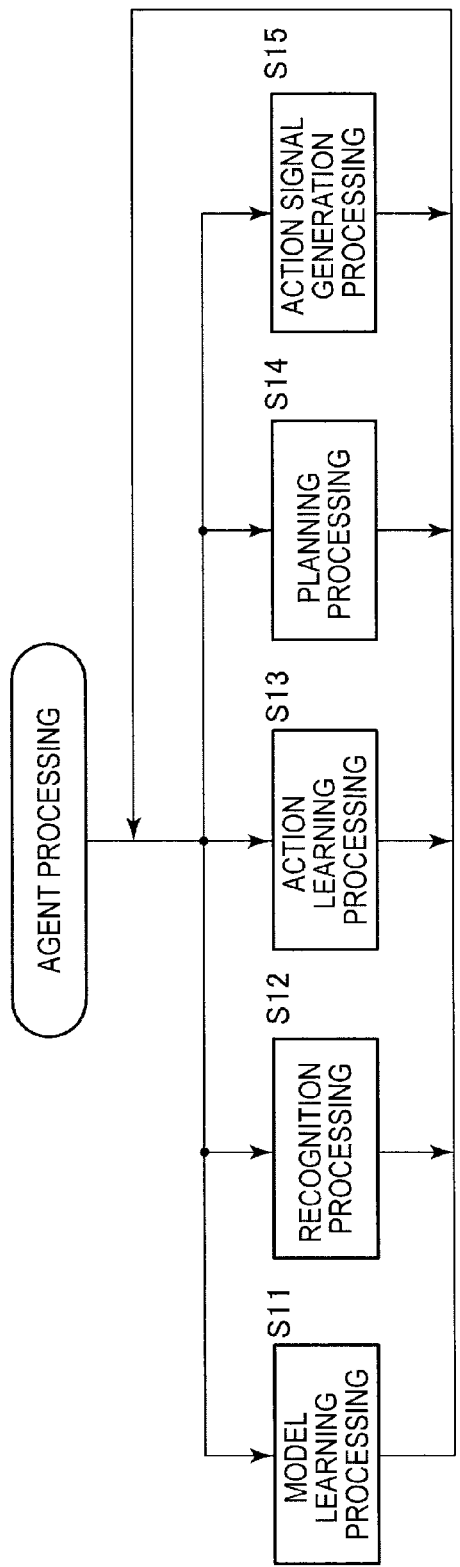
FIG. 2 is a flow chart illustrating processing performed by the agent.

FIG. 2 is a flow chart illustrating processing performed by the agent in FIG. 1.

In the agent, processing in steps S11, S12, S13, S14, and S15 is performed when necessary.

In step S11 of FIG. 2, model learning processing is performed. In the model learning processing, the model learning unit 22 performs model learning that learns the HMM as a state transition model stored in the model storage unit 24.

That is, the agent generates an action signal for the agent to take inherently possible action through the inherent controller 35 and supplies the action signal to the action unit 14 and the action learning unit 33.

The action unit 14 drives the movable portion according to the action signal from the inherent controller 35 and the agent thereby takes action according to the action signal.

The sensor unit 11 observes an observed value observed after action being taken by the agent and supplies the observed value to the buffer 21, which is caused to store the observed value.

If a times series (time series data) of observed values of a certain number of samples is stored in the buffer 21, the model learning unit 22 learns the HMM (whose model parameters are) stored in the model storage unit 24 by using the time series data stored in the buffer 21 as model learning data and stores resultant model parameters of the HMM in the model storage unit 24 in the form of overwriting.

The HMM can be learned according to, for example, the Baum-Welch algorithm (re-estimation method of Baum-Welch) using the EM algorithm. In the HMM learning, the initial state probability $\pi_i$, transition probability $a_{ij}$, and observation likelihood $b_j(o)$ are determined as model parameters.

If the HMM has N states and the i-th state of the N states is represented by $S_i$, the initial state probability $\pi_i$ represents the probability of being in the state $S_i$ in the initial time, the transition probability $a_{ij}$ represents the probability of transition from the state $S_i$ to the state $S_j$, and the observation likelihood $b_j(o)$ represents the probability of the observed value o being observed in the state $S_j$ or the probability distribution of each.

In the model learning processing, as described above, the HMM stored in the model storage unit 24 is learned (structural learning) by using (time series data of) observed values obtained by the sensor unit 11.

It is assumed here that the arm of the agent moves a predetermined distance in a predetermined direction on a table as a two-dimensional plane according to an action signal as the action of the agent at a time. Further, it is assumed that the HMM is learned by using position information representing the position of the arm (on the table as a two-dimensional plane) recognized from an image of the arm on the table as observed values.

In this case, the movement of the arm of the agent is acquired (learned) by the HMM.

The observation probability $b_i(o)$ of the state $S_i$ of the HMM is a probability with which each observed value o as position information of the arm is observed in the state $S_i$ and thus, the state $S_i$ can be associated (can be considered to associate) with the position of the arm on the table where each observed value o is observed with the observation probability $b_i(o)$ of the state $S_i$.

In the agent, if the HMM stored in the model storage unit 24 is not learned, the model learning processing in step S21 is first performed. Then, when the HMM acquires (learns) the movement of the arm of the agent to some degree by the model learning processing, the processing in step S12 or S15 can be performed by using the HMM.

The HMM stored in the model storage unit 24 is learned by using observed values observed only when the agent takes action according to an action signal generated by the inherent controller 35, but the HMM can thereafter be learned in the form of additional learning by using observed values observed when the agent takes action according to an action signal generated by the action signal generation unit 32.

In step S12 of FIG. 2, recognition processing is performed. In the recognition processing, the recognition unit 23 recognizes (a series of) states in which recognition data of the HMM stored in the model storage unit 24 is observed by using a time series of observed values stored in the buffer 21 as recognition data.

That is, the recognition unit 23 determines a state series (maximum likelihood series) in which the likelihood of observing recognition data is the greatest in an HMM, that is, a state series that, when each sample value of recognition data is observed in chronological order, makes the state probability when the latest sample value is observed is the greatest according to, for example, the Viterbi algorithm by using the HMM whose model learning has proceeded to some degree (including HMM models whose model learning is completed).

Then, the recognition unit 23 determines (recognizes) the state in which the latest (current) sample value (observed value) of recognition data is observed in the maximum likelihood series, that is, the last state of the maximum likelihood series as the current state corresponding to the current situation of the arm of the agent.

In step S13 of FIG. 2, action learning processing is performed. In the action learning processing, the action learning unit 33 performs action learning that learns a relationship between an action signal causing an agent to take predetermined action and a state transition of the HMM caused by the action according to the action signal being taken.

That is, while the action unit 14 drives the agent according to the action signal and action to move the arm of the agent is thereby taken, the agent before action learning has no knowledge of how to move the arm according to which action signal (what action to take).

In the action learning, the relationship between an action signal and the movement of the arm as action taken according to the action signal (knowledge of how the arm moves according to which action signal) is learned.

In the HMM that has acquired the movement of the arm by the model learning, each state $S_i$ can be associated, as described above, with the position of the arm in the table and a transition from a state corresponding to the position of the arm before the movement to a state corresponding to the position of the arm after the movement is caused by the movement of the arm.

In the action learning, as a relationship between an action signal and the movement of the arm as action taken according to the action signal, the relationship between the action signal and the state transition of the HMM caused by the action according to the action signal being taken is acquired.

More specifically, after the learning of HMM proceeds to some degree, the action learning unit 33 collects an action signal supplied from the inherent controller 35 and also collects an observed value observed when (after) action according to the action signal is taken and the current state of the HMM in which the observed value is observed from the recognition unit 23.

Then, the action learning unit 33 stores, at each time t, a set of an observed value $o_{t-1}$ at time t−1 one time unit before and an action signal $m_{t-1}$ at time t−1 one time unit before as action learning data used for action learning by associating with a state transition $T_{ij}$ from the current state $s_{t-1}$ at time t−1 to the current state $s_t$ at the latest time t.

If a sufficient number of pieces of action learning data is obtained regarding each state transition $T_{ij}$ of the HMM, the action learning unit 33 determines a controller as a function $m=F_{ij}(o)$ that takes an observed value o as input and outputs an action signal m by using the observed value o and the action signal m set as action learning data for each state transition $T_{ij}$.

As the function $F_{ij}( )$ for example, a neural network can be cited. Also, in addition to the function $m=F_{ij}(o)$ that takes the observed value o as input and outputs the action signal m, for example, a function that outputs a constant value such as an average value of the action signal m used as action learning data for the state transition $T_{ij}$ regardless of the observed value o can be adopted as the controller.

If the controller as the function $m=F_{ij}(o)$ is determined for each state transition $T_{ij}$, the action learning unit 33 associates a unique controller ID that identifies the controller with the function $m=F_{ij}(o)$ as a controller determined for each state transition $T_{ij}$.

Further, the action learning unit 33 creates a controller table that associates each state transition $T_{ij}$ and the controller ID associated with the function $m=F_{ij}(o)$ as a controller determined for the state transition $T_{ij}$.

Then, the action learning unit 33 supplies the function $m=F_{ij}(o)$ as a controller associated with the controller ID and the controller table as action generation information to the action generation information storage unit 34, which is caused to store the function $m=F_{ij}(o)$ and the controller table.

In step S14 of FIG. 2, planning processing is performed. In the planning processing, the planning unit 31 performs planning to create a plan as a state transition in which one state Ss of the HMM stored in the model storage unit 24 is set as a start state and another state Se is set as a target state and the target state is reached from the start state.

If a plan is obtained by the planning, the agent can take action that reaches the target state in the end by sequentially making the state transition to states constituting the plan.

In the planning processing, as a method of determining a plan when the start state and the target state are given, for example, a method of randomly selecting a state transition from state transitions with the start state set as the transition source state and having the transition probability equal to a predetermined threshold or more and randomly selecting one state transition again from state transitions with the transition destination state of the state transition set as the transition source state and having the transition probability equal to a predetermined threshold or more and repeating the above processing until the transition destination state of the state transition becomes the target state.

According to this method, however, plans taking time (plans with many state transitions (and states)) to reach the target state from the start state are frequently determined.

Thus, as a method of determining the target state from the start state in a short time, a method of using the Viterbi algorithm is known.

According to the method of using the Viterbi algorithm, the planning unit 31 sets, with the current state from the recognition unit 23 set as the start state of a plan, the state probability of (the state set as) the start state at time t=1 to 1.0 as the initial value and also sets the state probability of other states other than the start state at time t to 0.0.

Of transition probabilities $a_{ij}$ of HMM, the planning unit 31 sets transition probabilities $a_{ij}$ equal to a predetermined threshold (for example, 0.01) or more and used for planning processing to larger values (for example, 0.9) and other transition probabilities $a_{ij}$, and used for planning processing to smaller values (for example, 0.0).

Further, the planning unit 31 multiplies the state probability of each state $S_i$ at time t by the state probability $a_{ij}$ to the state $S_j$ for each state $S_j$ of HMM at time t+1 and determines the maximum value of N multiplication values as the number of resultant states of the HMM as the state probability of the $S_j$ at time t+1 and repeats the above processing until the state transition of the target state becomes larger than 0.0 while incrementing time t.

Then, when the state transition of the target state becomes larger than 0.0, that is, a state series in which the target state is reached from the start state can be obtained only by state transitions whose transition probabilities $a_{ij}$ are set to larger values, the planning unit 31 outputs the state series as a plan.

In step S15 of FIG. 2, action signal generation processing is performed. The action signal generation processing can be performed if a plan is obtained by the planning unit 31 after the model learning processing in step S11 and the action learning processing in step S13.

In the action signal generation processing, the action signal generation unit 32 generates action signals to take action to reach the target state in the end after sequentially making state transitions to states in the plan from the planning unit 31 and supplies the action signals to the action unit 14.

That is, the action signal generation unit 32 detects the current state from the recognition unit 23 from the state series as a plan from the planning unit 31 and recognizes the state transition from the current state to the next state in the state series as the state transition to be caused next.

Further, the action signal generation unit 32 refers to action generation information of the action generation information storage unit 34 to generate (determine) an action signal m to take action to cause the state transition according to the plan (state transition to be caused next) by providing an observed value (observed value observed in the current state) from the recognition unit 23 as input to the controller as the function $m=F_{ij}(o)$ associated with the state transition $T_{ij}$ to be caused next and supplies the action signal m to the action unit 14.

The action unit 14 drives the movable portion according to the action signal m from the action signal generation unit 32 and the agent thereby takes action such as moving the arm on the table according to the action signal m.

Then, after the action of the agent, the action signal generation unit 32 waits until the current state and observed values are newly supplied from the recognition unit 23, detects, from the state series as the plans from the planning unit 31, the current state from the recognition unit 23, and repeats the same processing until the current state from the recognition unit 23 matches the target state as the last state of the plan from the planning unit 31.

[Configuration Example of an Autonomously Acting Agent by Using a Causal Relationship]

Figure 3:
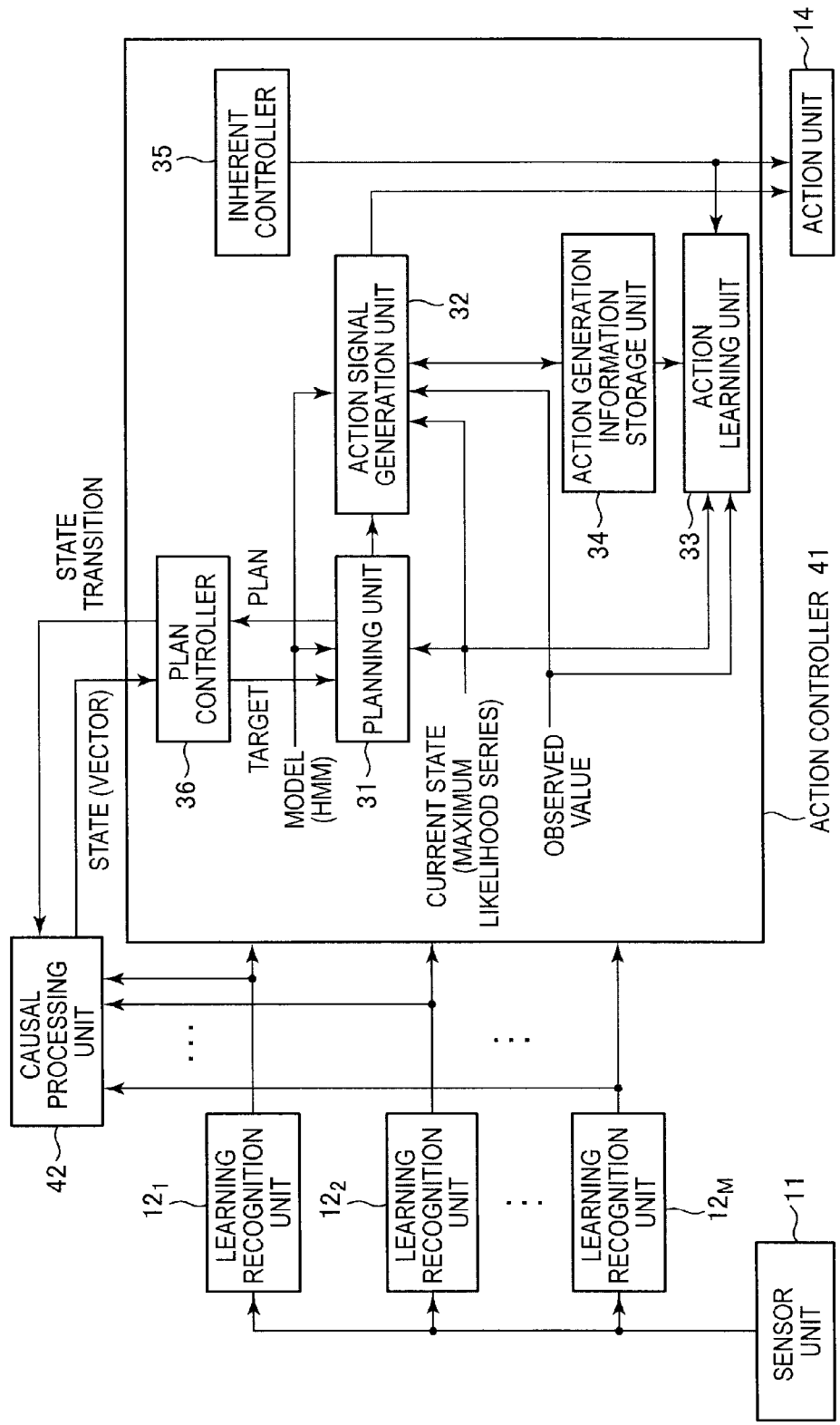
FIG. 3 is a block diagram showing another configuration example of the autonomously acting agent.

FIG. 3 is a block diagram showing another configuration example of the autonomously acting agent.

In FIG. 3, the same reference numerals are attached to the corresponding portions in FIG. 1 and a description thereof is omitted below when appropriate.

In FIG. 3, the agent includes the sensor unit 11, a plurality of M learning recognition units $12_1$ to $12_M$, the action unit 14, an action controller 41, and a causal processing unit 42.

Therefore, the agent in FIG. 3 is common to the agent in FIG. 1 in that the sensor unit 11 and the action unit 14 are included. The agent in FIG. 3 is different from FIG. 1 in that, instead of the one learning recognition unit 12, the M learning recognition units $12_1$ to $12_M$ are provided, instead of the action controller 13, the action controller 41 is provided, and the causal processing unit 42 is newly provided.

In the agent of FIG. 3, the sensor unit 11 observes (senses) the plurality of M observed values and supplies, among M observed values, the m-th (m=1, 2, ..., M) observed value to, among the M learning recognition units $12_1$ to $12_M$, the m-th learning recognition unit $12_m$.

While in the agent of FIG. 1, (movement of) the arm is modeled and learning of the HMM, that is, learning of acquiring the movement of the arm by the HMM is performed by using position information of the arm obtained by observing the arm, learning of the HMM can also be performed by using a plurality of observed values (to be a time series), for example, various modes of observed values (for example, the position, speed and the like of the arm observed from the arm to be modeled) observed from one object to be modeled and observed values of one mode (type) observed from each of a plurality of objects to be modeled.

In the agent of FIG. 3, one HMM is allocated to each of a plurality of observed values and learning of each HMM is performed by using the observed value associated with the HMM.

In FIG. 3, it is assumed that, for example, the agent is a robot capable of moving action and such an agent is placed in a labyrinth in which a light source is installed to perform a moving task to move in the labyrinth. Therefore, in the agent of FIG. 3, the action unit 14 constitutes a leg of the agent and is driven according to an action signal supplied from the action controller 41 provided in place of the action controller 13 to move the agent in the direction according to the action signal by the predetermined amount of movement.

It is also assumed that the agent can observe three modes of observed values, the distance to the wall of the labyrinth in each of a plurality of directions such as four directions and eight directions around the agent, the amount of light in each of the plurality of directions around the agent, and energy increasing in proportion to the amount of light and decreasing in proportion to the amount of movement of the agent.

In this case, the number M of the learning recognition units $12_1$ to $12_M$ provided in the agent is 3(or more).

The sensor unit 11 can observe three modes of observed values, the distance from the agent to the wall, the amount of light received by the agent, and energy of the agent. Then, the sensor unit 11 supplies the distance from the agent to the wall to the learning recognition unit $12_1$ as a distance modal observed value, the amount of light received by the agent to the learning recognition unit $12_2$ as an optical modal observed value, and energy of the agent to the learning recognition unit $12_3$ as an energy modal observed value.

The learning recognition units $12_1$ to $12_3$ perform processing similar to the processing of the learning recognition unit 12 in FIG. 1 by using the observed value supplied thereto. As a result, the HMM (hereinafter, also called the distance HMM) that has learned by using the distance modal observed value is obtained in the learning recognition unit $12_1$, the HMM (hereinafter, also called the optical HMM) that has learned by using the optical modal observed value is obtained in the learning recognition unit $12_2$, and the HMM (hereinafter, also called the energy HMM) that has learned by using the energy modal observed value is obtained in the learning recognition unit $12_3$.

The distance HMM, optical HMM, and energy HMM, the maximum likelihood series (current state) obtained by recognition processing using the distance HMM, optical HMM, and energy HMM, and observed values used for the recognition processing in the learning recognition units $12_1$ to $12_3$ are supplied, like the learning recognition unit 12 in FIG. 1, to the action controller 41 corresponding to the action controller 13.

The distance HMM, optical HMM, and energy HMM and the maximum likelihood series obtained by recognition processing are also supplied from the learning recognition units $12_1$ to $12_3$ to the causal processing unit 42.

The action controller 41 includes the planning unit 31, the action signal generation unit 32, the action learning unit 33, the action generation information storage unit 34, the inherent controller 35, and a plan controller 36.

Therefore, the action controller 41 is common to the action controller 13 in FIG. 1 in that that the planning unit 31 to the inherent controller 35 are included and is different from the action controller 13 in FIG. 1 in that the plan controller 36 is newly provided.

The action controller 41 performs processing similar to processing of the action controller 13 in FIG. 1.

Therefore, in the action controller 41, like the action controller 13 in FIG. 1, in addition to an action signal being supplied to the action unit 14, the action learning unit 33 performs action learning that determines action generation information such as a function $F_{ij}(o)$ as a controller for each state transition $T_{ij}$ by using the current state and the latest observed value supplied from the learning recognition unit $12_m$ and an action signal generated by the inherent controller 35.

To simplify the description, it is assumed here that the action learning unit 33 performs action learning that determines action generation information such as a function $F_{ij}(o)$ as a controller for each state transition $T_{ij}$ of the distance HMM by using the current state of the distance HMM and the latest observed value supplied from the learning recognition unit $12_1$ among the learning recognition units 12, to $12_3$ and an action signal generated by the inherent controller 35.

In FIG. 3, therefore, the action signal generation unit 32 can generate only an action signal to take action to cause the state transition $T_{ij}$ of the distance HMM of the distance HMM, optical HMM, and energy HMM and it is difficult to directly generate an action signal to take action to cause the state transition $T_{ij}$ of the optical HMM or the energy HMM.

The current state (the last state of the maximum likelihood series) of the distance HMM, optical HMM, and energy HMM is supplied to the planning unit 31 from the learning recognition units $12_1$ to $12_3$ respectively and also target information indicating the state to be a target of the states of the distance HMM, optical HMM, and energy HMM is supplied from the plan controller 36.

When the target state is supplied from the plan controller 36, the planning unit 31 sets the HMM having the target state of the distance HMM, optical HMM, and energy HMM as the attention HMM.

Then, the planning unit 31 performs planning to determine the state series whose likelihood of state transitions from a start state to a target state is the greatest as a plan after setting the current state of the attention HMM of the current states of the distance HMM, optical HMM, and energy HMM from the learning recognition units $12_1$ to $12_3$ respectively as the start state and the state of the attention HMM indicated by target information as the target state.

If the attention HMM used by the planning unit 31 to determine a plan is not an HMM capable of generating an action signal to take action to cause a state transition (if the attention HMM is not an HMM acquired in action learning to have a relationship between an action signal and the state transition T, caused by action according to the action signal being taken as a function $F_{ij}(o)$), that is, if the attention HMM is the optical HMM or the energy HMM other than the distance HMM, it is difficult to directly generate an action signal to take action to cause a state transition according to a plan determined by the optical HMM or the energy HMM other than the distance HMM by action generation information such as the function $F_{ij}(o)$ as a controller determined for each state transition $T_{ij}$, of the distance HMM and thus, the planning unit 31 supplies the plan to the plan controller 36 without supplying the plan to the action signal generation unit 32.

When a plan is supplied from the planning unit 31, the plan controller 36 recognizes state transitions of the attention HMM according to the plan and supplies the state transitions to the causal processing unit 42.

When a state transition of the attention HMM is supplied from the plan controller 36, the causal processing unit 42 returns states of at least one HMM other than the attention HMM having a causal relationship with the state transition of the attention HMM, that is, (a state vector having as elements) states of HMMs (hereinafter, also called causal HMMs) other than the attention HMM causing the state transition of the attention HMM and the plan controller 36 receives states of causal HMMs returning in this manner for the state transition of the attention HMM from the causal processing unit 42.

Then, the plan controller 36 supplies a state (any state as an element of a state vector) of the causal HMM from the causal processing unit 42 to the planning unit 31 as a target state.

When the target state is supplied from the plan controller 36, the planning unit 31 newly sets the HMM having the target state of the distance HMM, optical HMM, and energy HMM as the attention HMM and similar processing is recursively repeated below.

If the attention HMM used by the planning unit 31 to determine a plan is an HMM capable of generating an action signal to take action to cause a state transition (if the attention HMM is an HMM acquired in action learning to have a relationship between an action signal and the state transition $T_{ij}$ caused by action according to the action signal being taken as a function $F_{ij}(o)$), that is, if the attention HMM is the distance HMM, an action signal to take action to cause a state transition according to a plan determined by the distance HMM as the attention HMM can directly be generated by action generation information such as the function $F_{ij}(o)$ as a controller determined for each state transition $T_{ij}$ of the distance HMM and thus, the planning unit 31 supplies the plan to the action signal generation unit 32.

An HMM acquired in action learning to have a relationship between an action signal and the state transition $T_{ij}$ caused by action according to the action signal being taken as a function $F_{ij}(o)$ is also called an action enabled HMM.

The causal processing unit 42 acquires causal learning data used for causal learning, which is learning that acquires a causal relationship between a state transition of a first HMM, which is one HMM of the distance HMM, optical HMM, and energy HMM, from the current states of the distance HMM, optical HMM, and energy HMM from the learning recognition unit $12_1$ to $12_3$ and a state of a second HMM, which is at least one other HMM, and performs the causal learning by using the causal learning data.

When a state transition of the attention HMM is supplied from the plan controller 36, the causal processing unit 42 makes a causal estimate that estimates the state of an HMM (causal HMM) having a causal relationship with the state transition of the attention HMM based on causal learning results and supplies (a state vector having as an element) the state of the causal HMM to the plan controller 36.

[Configuration Example of the Causal Processing Unit 42]

Figure 4:
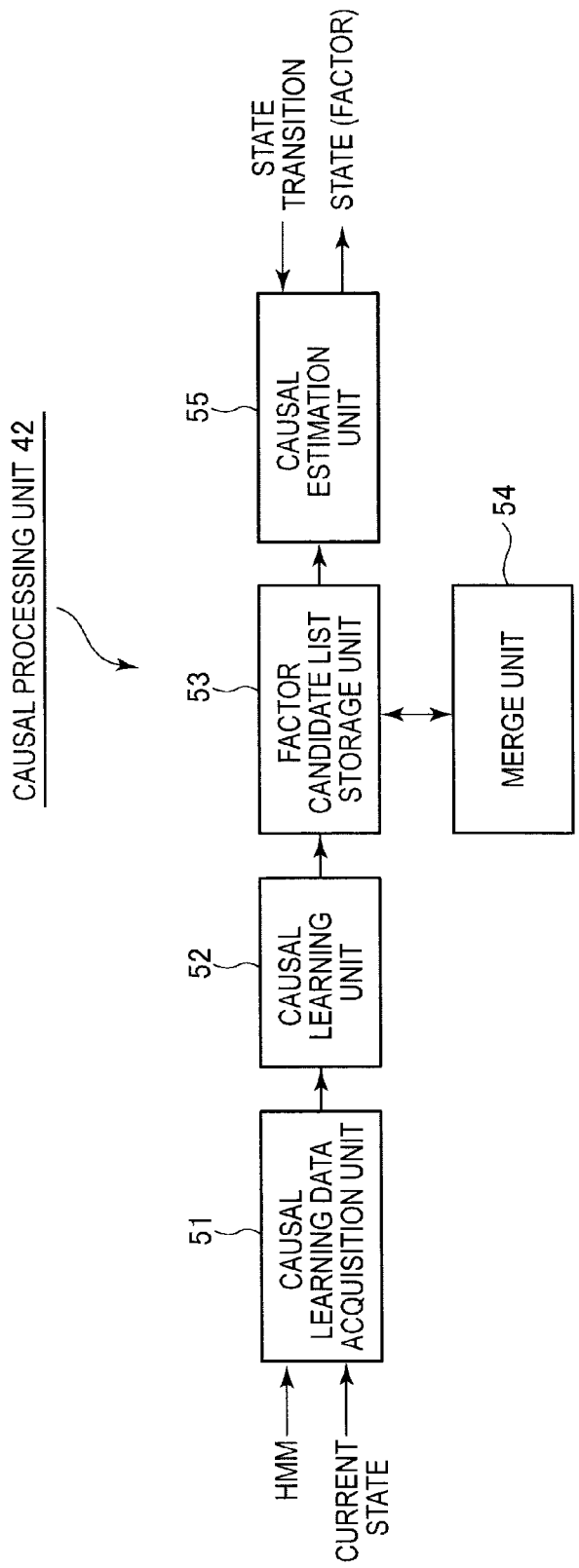
FIG. 4 is a block diagram showing a configuration example of a causal processing unit 42.

FIG. 4 is a block diagram showing a configuration example of the causal processing unit 42 in FIG. 3.

Regarding a plurality of HMMs that has learned by using each of a plurality of observed values such as the distance HMM, optical HMM, and energy HMM described with reference to FIG. 3, an event of state transition taking place in the first HMM, which is one HMM of the above HMMs, may be caused by a factor (cause) of being in some state in the second HMM (the current state of the second HMM is in some state), which is at least one other HMM, and in such a case, there is a causal relationship between being in some state in the second HMM and a state transition being caused in the first HMM.

The causal processing unit 42 performs learning (causal learning) of a causal relationship between a state transition of the first HMM and being in some state in the second HMM as an occurrence of a factor that could cause the state transition.

Then, when a state transition of the attention HMM (HMM used to create a plan) as the first HMM is supplied from the plan controller 36 (FIG. 3), the causal processing unit 42 makes a causal estimate that estimates the state (factor) of the causal HMM as the second HMM having a causal relationship with the state transition of the attention HMM based on causal learning results and (a state vector having as an element) the state of the causal HMM is supplied (returned) to the plan controller 36.

That is, in FIG. 4, the causal processing unit 42 includes a causal learning data acquisition unit 51, a causal learning unit 52, a factor candidate list storage unit 53, a merge unit 54, and a causal estimation unit 55.

The causal learning data acquisition unit 51 acquires causal learning data used for causal learning from the current states of the distance HMM, optical HMM, and energy HMM from the learning recognition units $12_1$ to $12_M$ and supplies the causal learning data to the causal learning unit 52.

The causal learning unit 52 performs causal learning by using causal learning data supplied from the causal learning data acquisition unit 51. The causal learning unit 52 supplies a factor candidate list, which is a list representing a causal relationship between a state transition of the first HMM and the state of the second HMM as a factor that could cause the state transition obtained by performing causal learning to the factor candidate list storage unit 53.

The factor candidate list storage unit 53 stores a factor candidate list from the causal learning unit 52.

The merge unit 54 sorts out a factor candidate list by merging items of the factor candidate list stored in the factor candidate list storage unit 53.

A state transition of the attention HMM (HMM used to create a plan) as the first HMM is supplied to the causal estimation unit 55 from the plan controller 36 (FIG. 3).

The causal estimation unit 55 makes a causal estimate that estimates the state (factor) of the causal HMM as the second HMM having a causal relationship with the state transition of the attention HMM from the plan controller 36 based on a factor candidate list stored in the factor candidate list storage unit 53 as causal learning results and supplies (returns) (a state vector having as an element) the state of the causal HMM to the plan controller 36.

Figure 5:
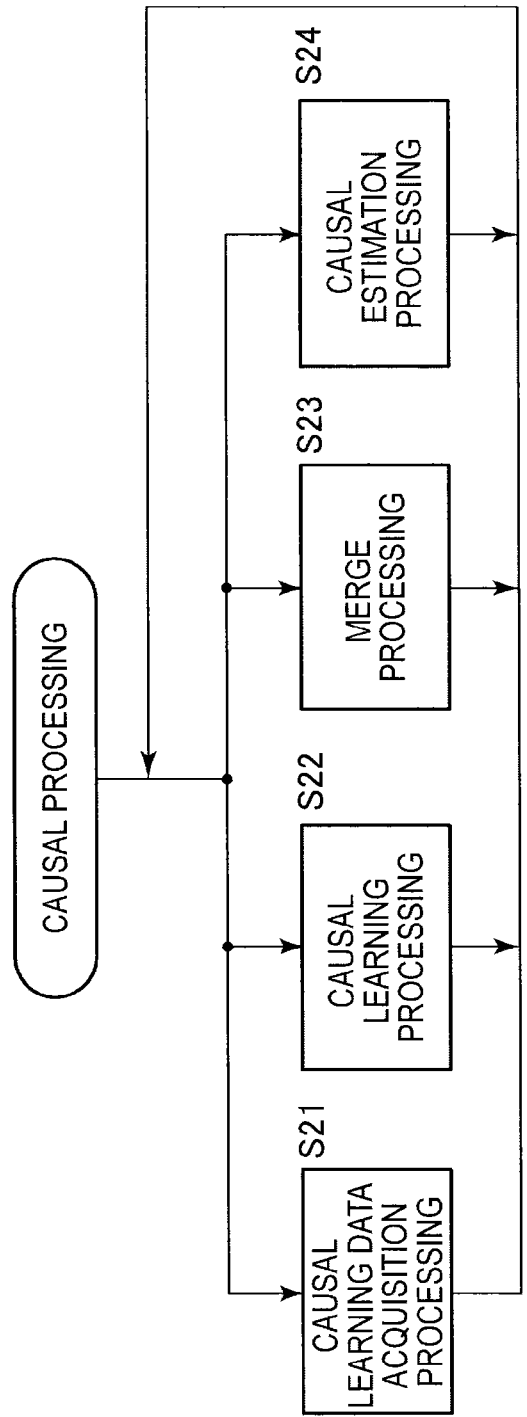
FIG. 5 is a flow chart illustrating processing (causal processing) performed by the causal processing unit 42.

FIG. 5 is a flow chart illustrating processing (causal processing) performed by the causal processing unit 42 in FIG. 4.

In the causal processing unit 42, processing in steps S21, S22, S23, and S24 is performed when necessary.

In step S21, causal learning data acquisition processing is performed. In the causal learning data acquisition processing, the causal learning data acquisition unit 51 acquires causal learning data and supplies the data to the causal learning unit 52.

In step S22, causal learning processing is performed. In the causal learning processing, the causal learning unit 52 performs causal learning by using causal learning data from the causal learning data acquisition unit 51 and supplies a resultant factor candidate list to the factor candidate list storage unit 53, which is caused to store the factor candidate list.

In step S23, merge processing is performed. In the merge processing, the merge unit 54 sorts out the factor candidate list stored in the factor candidate list storage unit 53 and causes the factor candidate list storage unit 53 to store the sorted factor candidate list.

In step S24, causal estimation processing is performed. In the causal estimation processing, when a state transition of the attention HMM as the first HMM is supplied from the plan controller 36 (FIG. 3) to the causal estimation unit 55 (FIG. 4), the processing is started.

In the causal estimation processing, the causal estimation unit 55 estimates the state of the causal HMM as the second HMM having a causal relationship with the state transition of the attention HMM from the plan controller 36 based on a (sorted) factor candidate list stored in the factor candidate list storage unit 53 and supplies a state vector having the state of the causal HMM as an element to the plan controller 36.

Respective processing of steps S21 to S24 in FIG. 5 will further be described below.

The HMM stored in the learning recognition unit $12_m$ in FIG. 3 is also called the m-th HMM#m and the number of states of the HMM#m is denoted as N(m).

The i-th state $S_i$ (i=1, 2, . . . , N(m)) of the m-th HMM#m is denoted as $S^m_i$ below when appropriate. For example, $S^2_5$ represents the state $S_5$ of the second HMM#2.

Further, if any integer in the range between 1 and N(m) is denoted as i(m), being in some state $S^m_{i(m)}$ in each of M HMM#1 to HMM#M is represented as a state vector [$S^1_{i(1)}$, $S^2_{i(2)}$, . . . $S^M_{i(M)}$] of an M-dimensional vector having a state $S^m_{i(m)}$ as an element.

If it is clear the state of which HMM is represented by the element of each dimension of a state vector, the HMM state as an element of the state vector is represented by the number indicating the ordinal position in the vector.

For example, being in states $S^1_5$, $S^2_7$, and $S^3_{11}$ in HMM#1, #2, and #3 respectively is represented by a state vector [$S^1_5$, $S^2_7$, $S^3_{11}$]=[5, 7, 11]. If, among HMM#1, #2, and #3, for example, HMM#2 and #3 are focused on, the state vector is represented as a vector [$S^2_7$, $S^3_{11}$]=[7, 11] having elements of only states of focused HMM#2 and #3.

In causal learning data acquisition processing (FIG. 5) in step S21, count values of a state counter and a transition counter are first reset to 0.

That is, the causal learning data acquisition unit 51 (FIG. 5) contains the state counter and the transition counter and resets count values of the state counter and the transition counter to 0 when the causal learning data acquisition processing is started.

In addition to resetting count values of the state counter and the transition counter when the causal learning data acquisition processing is started, the causal learning data acquisition unit 51 resets (a variable representing) time t of the state counter and the transition counter to 0.

Count values of the state counter and the transition counter can be attenuated according to a preset attenuation factor such as γ=0.999 with the passage of time t.

The causal learning data acquisition unit 51 compares the respective state (current state) of HMM#1 to #M at time t from the learning recognition units $12_1$ to $12_M$ (FIG. 3) respectively and the respective state (current state) of HMM#1 to #M at time t−1 one unit time before to list up HMMs whose states are different at time t and time t−1.

Then, the causal learning data acquisition unit 51 sequentially changes a variable L indicating the number of HMMs selected from M HMMs (HMM#1 to #M) like 1, 2, . . . , M−1 to perform the following processing for each value of L.

The d-th (d=1, 2, . . . , D) combination of HMM of D=$_MC_{L+1}$ combinations of HMM when (L+1) HMMs are selected from M HMMs (HMM#1 to #M) is denoted as cM(L+1;)(d).

A state vector as an (L+1)-dimensional vector having one state S(d,c) of the c-th (c=1, 2, . . . , L+1) HMM among (L+1) HMMs of the d-th HMM combination cM(L+1;)(d) of D=$_MC_{L+1}$ combinations of HMM as the c-th element is represented as V(cM(L+1;)(d))=[S(d,1), S(d,2), . . . , S(d,L+1)].

The state counter is provided corresponding to the (L+1)-dimensional state vector V(cM(L+1;)(d)) and the state counter corresponding to the state vector V(cM(L+1;)(d)) and the count value thereof will be denoted as $N_S$(V(cM(L+1;)(d))) below when appropriate.

An (L+1)-dimensional state vector V(cM(L+1;)(d)) having the current state at time t of each of (L+1) HMMs of the d-th HMM combination cM(L+1;)(d) as an element is denoted as $v_S(t)$.

At time t, the causal learning data acquisition unit 51 (FIG. 4) increments by 1 the state counter $N_S(v_S(t-1))$ corresponding to the (L+1)-dimensional state vector $v_S(t-1)$ at time t−1 one unit time before.

Therefore, according to the state counter $N_S(V(cM(L+1;)(d)))$, the number of times of states S(d,1), S(d,2), . . . , S(d,L+1) of (L+1) HMMs as elements of the corresponding state vector V(cM(L+1;)(d)) of being the current states at the same time (number of times of being in states S(d,1), S(d,2), . . . , S(d,L+1) at the same time) is counted.

If, among M HMMs, the HMM whose current state has changed (transition) (from the current state at time t−1) at time t is denoted as a transitional HMM, the causal learning data acquisition unit 51 sequentially focuses on the transitional HMM as an attention HMM and performs the following processing on the attention HMM.

That is, if the attention HMM is, among M HMMs, the m'-th HMM#m', the causal learning data acquisition unit 51 denotes the d-th (d=1, 2, . . . , D) combination of HMM of $D=_{M-1}C_L$ combinations of HMM when L HMMs are selected from (M−1) HMMs excluding HMM#m' from M HMMs as cM(L;m')(d).

A state vector as an L-dimensional vector having one state S(d,c) of the c-th (c=1, 2, . . . , L) HMM among L HMMs of the d-th HMM combination cM(L;m')(d) of $D=_{M-1}C_L$ combinations of HMM as the c-th element is represented as V(cM(L;m')(d))=[S(d,1), S(d,2), . . . , S(d,L)].

The transition counter is provided corresponding to a set of the L-dimensional state vector V(cM(L;m')(d)) and the state transition $T_{ij}$ (hereinafter, also denoted as $T(m')_{ij}$) that occurs in HMM#m' and the transition counter corresponding to the set of the L-dimensional state vector V(cM(L;m')(d)) and the state transition $T(m')_{ij}$ and the count value thereof will be denoted as $N_T(T(m')_{ij}, V(cM(L;m')(d)))$ below when appropriate.

An L-dimensional state vector V(cM(L;m')(d)) having the current state at time t of each of L HMMs of the d-th HMM combination cM(L;m')(d) as an element is denoted as $v_T(t)$.

A state transition that occurs in HMM#m' when (immediately after) states of L HMMs as elements of the state vector $v_T(t)$ are current states is denoted as T(t).

At time t, the causal learning data acquisition unit 51 (FIG. 4) increments by 1 the transition counter $N_T(T(t-1), v_T(t-1))$ corresponding to the L-dimensional state vector $v_T(t-1)$ and the state transition T(t−1) at time t−1 one unit time before.

Therefore, according to the transition counter $N_T(T(m')_{ij}, V(cM(L;m')(d)))$, the number of times of states S(d,1), S(d,2), . . . , S(d,L) of L HMMs as elements of the corresponding state vector V(cM(L;m')(d)) of being the current states at the same time (number of times of being in states S(d,1), S(d,2), . . . , S(d,L) at the same time) when the corresponding state transition $T(m')_{ij}$ occurs in HMM#m' is counted.

The causal learning data acquisition unit 51 counts the state counter $N_S(V(cM(L+1;)(d)))$ and the transition counter $N_T(T(m')_{ij}, V(cM(L;m')(d)))$ as causal learning data acquisition processing and acquires the count value $N_S(V(cM(L+1;)(d)))$ of the state counter and the count value $N_T(T(m')_{ij}, V(cM(L;m')(d)))$ of the transition counter as causal learning data.

A concrete example of counting of the state counter $N_S(V(cM(L+1;)(d)))$ and the transition counter $N_T(T(m')_{ij}, V(cM(L;m')(d)))$ will be described.

Figure 6:
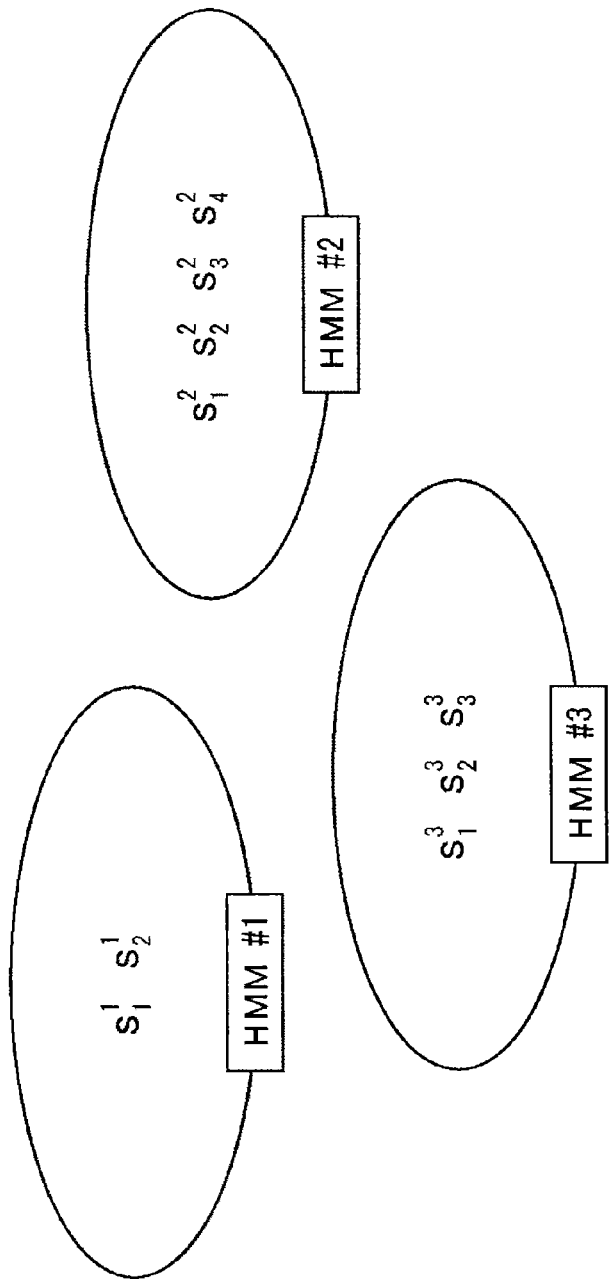
FIG. 6 is a diagram showing an example of HMM stored in learning recognition units $12_1$ to $12_M$.

FIG. 6 is a diagram showing an example of HMM stored in the learning recognition units $12_1$ to $12_M$.

In FIG. 6, M=3 and three HMM#1, #2, #3 are present.

In FIG. 6, the number of states N(1) of HMM#1 is 2 ($S^1_1$, $S^1_2$), the number of states N(2) of HMM#2 is 4 ($S^2_1$, $S^2_2$, $S^2_3$, $S^2_4$), and the number of states N(3) of HMM#3 is 3 ($S^3_1$, $S^3_2$, $S^3_3$).

Further, if a state vector having the current states $S^1_{now}$, $S^2_{now}$, $S^3_{now}$ of HMM#1 to #3 respectively as elements is denoted as $[S^1_{now}, S^2_{now}, S^3_{now}]$, the state vector $[S^1_{now}, S^2_{now}, S^3_{now}]$ when a time series of some observed value is observed at time t=0 to t=5 is assumed to be, for example, as follows:

$t=0$:[1,1,1]

$t=1$:[1,2,1]

$t=2$:[1,2,1]

$t=3$:[2,2,1]

$t=4$:[2,4,3]

$t=5$:[3,4,5]  (1)

In Formula (1), for example, the state vector [1,1,1] at time t=0 represents that the current states $S^1_{now}$, $S^2_{now}$, $S^3_{now}$ of HMM#1 to #3 are all the state $S_1$ (hereinafter, also denoted as state #1). The state vector [1,2,1] at time t=1 represents that the current state $S^1_{now}$ of HMM#1 is state #1, the current state $S^2_{now}$ of HMM#2 is state #2, and the current state $S^3_{now}$ of HMM#3 is state #1.

L takes values 1, 2, . . . , M−1 and thus, if M=3, L takes values 1, 2. $D=_MC_{L+1}$ combinations of HMM when (L+1) HMMs are selected from HMM#1 to #3 (M=3) include {1,2}, {1,3}, {2,3}, and {1,2,3}.

Here, for example, {1,2} represents the combination of HMM#1 and #2.

Among HMM combinations {1,2}, {1,3}, {2,3}, and {1,2,3}, the d-th (d=1, 2, . . . , D) combination of HMM is denoted by the above cM(L+1;)(d).

Regarding some combination of HMM, the number of state vectors having HMM states as elements is equal to the number obtained by multiplication of numbers of states of HMMs contained in the combination.

Thus, if the HMM combination {1,2} (combination of HMM#1 and #2) is focused on, the number of states N(1) of HMM#1 and the number of states N(2) of HMM#2 contained in the combination {1,2} are 2 and 4 respectively and thus, 8 (=2×4) vectors exist as state vectors having states of the HMM combination {1,2} (states of HMM#1 and #2 of the HMM combination {1,2}) as elements.

That is, if the element corresponding to the state of HMM#3 that is not contained in the HMM combination {1,2} is represented by "-", eight vectors [1,1,-], [1,2,-], [1,3,-], [1,4,-], [2,1,-], [2,2,-], [2,3,-], [2,4,-] exist as state vectors having respective states of HMM#1 and #2 of the HMM combination {1,2} as elements.

Similarly, 6 (=2×3) vectors exist as state vectors having respective states of HMM#1 and #3 of the HMM combination {1,3} as elements because the number of states N(1) of HMM#1 is 2 and the number of states N(3) of HMM#3 is 3. 12 (=4×3) vectors exist as state vectors having respective states of HMM#2 and #3 of the HMM combination {2,3} as elements because the number of states N(2) of HMM#2 is 4 and the number of states N(3) of HMM#3 is 3. Further, 24 (=2×4×3) vectors exist as state vectors having respective states of HMM#1 to #3 of the HMM combination {1,2,3} as elements because the number of states N(1) of HMM#1 is 2, the number of states N(2) of HMM#2 is 4, and the number of states N(3) of HMM#3 is 3.

The state counter $N_S(V(cM(L+1;)(d)))$ is provided corresponding to the (L+1)-dimensional state vector V(cM(L+1;)(d)) and thus, 50 (=8+6+12+24) state counters $N_S(V(cM(L+1;)(d)))$ are provided for the three HMM#1 to #3 in FIG. 6.

If L takes values 1, 2, as described above, $D=_{M-1}C_L$ combinations of HMM when L HMMs are selected from HMM#2 and #3 (M−1=2) excluding, for example, HMM#1 corresponding to m'=1 from HMM#1 to #3 (M=3) include {2}, {3}, and {2,3}.

Among HMM combinations {2}, {3}, and {2,3}, the d-th (d=1, 2, ..., D) combination of HMM is denoted by the above cM(L;1)(d).

Because, as described above, the number of state vectors having states of some combination of HMMs as elements is equal to the number obtained by multiplication of numbers of states of HMMs contained in the combination, if, among HMM combinations {2}, {3}, and {2,3}, for example, the HMM combination {2} (combination of only HMM#2) is focused on, the number of states N(2) of HMM#2 contained in the combination {2} is 4 and thus, four vectors exist as state vectors having states of the HMM combination {2} as elements.

That is, if the element corresponding to the state of HMM#1 excluded from the selection when the focused HMM combination {2} is obtained is denoted as "*" and the element corresponding to the state of HMM#3 that is not contained in the focused HMM combination {2} is denoted as "-", four vectors [*,1,-], [*,2,-], [*,3,-], [*,4,-] exist as state vectors having states of HMM#2 of the HMM combination {2} as elements.

Similarly, three vectors exist as state vectors having states of HMM#3 of the HMM combination {3} as elements because the number of states N(3) of HMM#3 is 3. 12 (=4×3) vectors exist as state vectors having respective states of HMM#2 and #3 of the HMM combination {2,3} as elements because the number of states N(2) of HMM#2 is 4 and the number of states N(3) of HMM#3 is 3.

Therefore, when m'=1, 19 (=4+3+12) vectors exist as L-dimensional state vectors V(cM(L;1)(d)).

The transition counter is provided, as described above, corresponding to a set of the L-dimensional state vector V(cM(L;m')(d)) and the state transition $T(m')_{ij}$ that occurs in HMM#m'.

In FIG. 6, as the state transition $T(m')_{ij}$ of HMM#1, two state transitions, the state transition $T(1)_{12}$ from state #1 to state #2 and the state transition $T(1)_{21}$ from state #2 to state #1 exist.

Therefore, when m'=1, 19×2 transition counters $N_T(V(cM(L;1)(d)))$ are provided corresponding to a set of 19 (=4+3+12) state vectors V(cM(L;1)(d)) and two state transitions $T(1)_{ij}$.

Next, $D=_{M-1}C_L$ combinations of HMM when L HMMs are selected from HMM#1 and #3 (M−1=2) excluding, for example, HMM#2 corresponding to m'=2 from HMM#1 to #3 (M=3) include {1}, {3}, and {1,3}.

Among HMM combinations {1}, {3}, and {1,3}, the d-th (d=1, 2, ..., D) combination of HMM is denoted by the above cM(L;2)(d).

Because, as described above, the number of state vectors having states of some combination of HMMs as elements is equal to the number obtained by multiplication of numbers of states of HMMs contained in the combination, if, among HMM combinations {1}, {3}, and {1,3}, for example, the HMM combination {1} is focused on, the number of states N(1) of HMM#1 contained in the combination {1} is 2 and thus, two vectors exist as state vectors having states of the HMM combination {1} as elements.

That is, if the element corresponding to the state of HMM#2 excluded from the selection when the focused HMM combination {(1)} is obtained is denoted as "*" and the element corresponding to the state of HMM#3 that is not contained in the focused HMM combination {1} is denoted as "-", two vectors [1,*,-], [2,*,-] exist as state vectors having states of HMM#1 of the HMM combination {1} as elements.

Similarly, three vectors exist as state vectors having states of HMM#3 of the HMM combination {3} as elements because the number of states N(3) of HMM#3 is 3. 6 (=2×3) vectors exist as state vectors having respective states of HMM#1 and #3 of the HMM combination {1,3} as elements because the number of states N(1) of HMM#1 is 2 and the number of states N(3) of HMM#3 is 3.

Therefore, when m'=2, 11 (=2+3+6) vectors exist as L-dimensional state vectors V(cM(L;2)(d)).

In FIG. 6, on the other hand, as the state transition $T(m')_{ij}$ of HMM#2, 12 state transitions, the state transition $T(2)_{12}$ from state #1 to state #2, the state transition $T(2)_{21}$ from state #2 to state #1, the state transition $T(2)_{13}$ from state #1 to state #3, the state transition $T(2)_{31}$ from state #3 to state #1, the state transition $T(2)_{14}$ from state #1 to state #4, the state transition $T(2)_{41}$ from state #4 to state #1, the state transition $T(2)_{23}$ from state #2 to state #3, the state transition $T(2)_{32}$ from state #3 to state #2, the state transition $T(2)_{24}$ from state #2 to state #4, the state transition $T(2)_{42}$ from state #4 to state #2, the state transition $T(2)_{34}$ from state #3 to state #4, and the state transition $T(2)_{43}$ from state #4 to state #3 exist.

The transition counter $N_T(V(cM(L;m')(d)))$ is provided corresponding to a set of the L-dimensional state vector V(cM(L;m')(d)) and the state transition $T(m')_{ij}$ of HMM#m' and thus, when m'=2, 11×12 transitions counters $N_T(V(cM(L;2)(d)))$ are provided corresponding to a set of 11 state vectors V(cM(L;2)(d)) and 12 state transitions $T(2)_{ij}$.

Next, $D=_{M-1}C_L$ combinations of HMM when L HMMs are selected from HMM#1 and #2 (M−1=2) excluding, for example, HMM#3 corresponding to m'=3 from HMM#1 to #3 (M=3) include {1}, {2}, and {1,2}.

Among HMM combinations {1}, {2}, and {1,2}, the d-th (d=1, 2, ..., D) combination of HMM is denoted by the above cM(L;3)(d).

Because, as described above, the number of state vectors having states of some combination of HMMs as elements is equal to the number obtained by multiplication of numbers of states of HMMs contained in the combination, if, among HMM combinations {1}, {2}, and {1,2}, for example, the HMM combination {1} is focused on, the number of states N(1) of HMM#1 contained in the combination {1} is 2 and thus, two vectors exist as state vectors having states of the HMM combination {1} as elements.

That is, if the element corresponding to the state of HMM#3 excluded from the selection when the focused HMM combination {1} is obtained is denoted as "*" and the element corresponding to the state of HMM#2 that is not contained in the focused HMM combination {1} is denoted as "-", two vectors [1,-,*], [2,-,*] exist as state vectors having states of HMM#1 of the HMM combination {1} as elements.

Similarly, four vectors exist as state vectors having states of HMM#2 of the HMM combination {2} as elements because the number of states N(2) of HMM#2 is 4. 8 (=2×4) vectors exist as state vectors having respective states of HMM#1 and #2 of the HMM combination {1,2} as elements because the number of states N(1) of HMM#1 is 2 and the number of states N(2) of HMM#2 is 4.

Therefore, when m'=3, 14 (=2+4+8) vectors exist as L-dimensional state vectors V(cM(L;3)(d)).

In FIG. 6, on the other hand, as the state transition $T(m')_{ij}$ of HMM#3, six state transitions, the state transition $T(3)_{12}$ from state #1 to state #2, the state transition $T(3)_{21}$ from state #2 to state #1, the state transition $T(3)_{13}$ from state #1 to state #3, the state transition $T(3)_{31}$ from state #3 to state #1, the state transition $T(3)_{23}$ from state #2 to state #3, and the state transition $T(3)_{32}$ from state #3 to state #2 exist.

The transition counter $N_T(V(cM(L;m')(d)))$ is provided corresponding to a set of the L-dimensional state vector V(cM(L;m')(d)) and the state transition $T(m')_{ij}$ of HMM#m' and thus, when m'=3, 14×6 transitions counters $N_T(V(cM(L;3)(d)))$ are provided corresponding to a set of 14 state vectors V(cM(L;3)(d)) and six state transitions $T(3)_{ij}$.

If the current state at each time t is supplied from each of the learning recognition units $12_1$ to $12_M$, the causal learning data acquisition unit 51 increments the state counter $N_S(V(cM(L+1;)(d)))$ and the transition counter $N_T(T(m')_{ij},V(cM(L;m')(d)))$ based on the current state at time t and the current state at time t−1 one unit time before.

That is, for example, at time t=1, as shown in Formula (1), the state vector [1,2,1] having the current states of HMM#1 to #3 as elements (hereinafter, referred to also as the current state vector) is supplied to the causal learning data acquisition unit 51.

At time t=1, the causal learning data acquisition unit 51 compares the current state vector [1,2,1] at time t=1 and the current state vector [1,1,1] at time t=0 one unit time before to list up HMM that has undergone a state transition (state change) from among HMM#1 to #3 as transitional HMM.

At time t=1, HMM#2 is listed up as the transitional HMM.

The causal learning data acquisition unit 51 sequentially focuses on $D=_MC_{L+1}$ HMM combinations {1,2}, {1,3}, {2,3}, and {1,2,3} for L of each value of L=1, 2.

Then, the causal learning data acquisition unit 51 increments by 1 the state counter $N_S(V(cM(L+1;)(d)))$ corresponding to the state vector V(cM(L+1;)(d))=$v_S(0)$, among (L+1)-dimensional state vectors V(cM(L+1;)(d)) having states of HMMs of the focused combination of HMM as elements, having states matching the current states of HMM#1 to #3 at time t=0 as elements of the current state vector [1,1,1] at time t=0 one unit time before as elements.

That is, if the HMM combination {1,2} is focused on, as described above, eight vectors [1,1,-], [1,2,-], [1,3,-], [1,4,-], [2,1,-], [2,2,-], [2,3,-], [2,4,-] exist as state vectors having respective states of HMM#1 and #2 of the HMM combination {1,2} as elements.

For the HMM combination {1,2}, among eight state vectors [1,1,-], [1,2,-], [1,3,-], [1,4,-], [2,1,-], [2,2,-], [2,3,-], [2,4,-], only the state counter corresponding to the state vector [1,1,-] having the current states $S^1_1$ and $S^2_1$ of HMM#1 and #2 of the HMM combination {1,2} at time t=0 one unit time before as elements is incremented by 1.

If the HMM combination {1,3} is focused on, as described above, six vectors exist as state vectors having respective states of HMM#1 and #3 of the HMM combination {1,3} as elements.

For the HMM combination {1,3}, among six state vectors, only the state counter corresponding to the state vector [1,-,1] having the current states $S^1_1$ and $S^3_1$ of HMM#1 and #3 of the HMM combination {1,3} at time t=0 one unit time before as elements is incremented by 1.

If the HMM combination {2,3} is focused on, as described above, 12 vectors exist as state vectors having respective states of HMM#2 and #3 of the HMM combination {2,3} as elements.

For the HMM combination {2,3}, among 12 state vectors, only the state counter corresponding to the state vector [-,1,1] having the current states $S^2_1$ and $S^3_1$ of HMM#2 and #3 of the HMM combination {2,3} at time t=0 one unit time before as elements is incremented by 1.

If the HMM combination {1,2,3} is focused on, as described above, 24 vectors exist as state vectors having respective states of HMM#1 to #3 of the HMM combination as elements.

For the HMM combination {1,2,3}, among 24 state vectors, only the state counter corresponding to the state vector [1,1,1] having the current states $S^1_1, S^2_1, S^3_1$ of HMM#1 to #3 of the HMM combination {1,2,3} at time t=0 one unit time before as elements is incremented by 1.

At time t=1, as described above, state counters corresponding to each of the four state vectors [1,1,-], [1,-,1], [-,1,1], and [1,1,1] are incremented by 1.

The causal learning data acquisition unit 51 sequentially focuses on transitional HMMs and further sequentially focuses on $D=_{M-1}C_L$ combinations of HMM for L of each value of L=1, 2 when L HMMs are selected from HMMs other than focused transitional HMM#m'.

Then, the causal learning data acquisition unit 51 increments by 1 the transition counter $N_T(T(m')_{ij}, V(cM(L;m')(d)))$ corresponding to the state vector V(cM(L;m')(d))=$v_T(0)$, among L-dimensional state vectors V(cM(L;m')(d)) having states of HMMs of the focused combination of HMM as elements, having states matching the current states at time t=0 as elements of the current state vector [1,1,1] at time t=0 one unit time before as elements and the state transition $T(m')_{ij}$=T(0) that occurs in the focused transitional HMM#m'.

That is, in Formula (1), the transitional HMM at time t=1 is HMM#2 only and the state transition occurring in the HMM#2 is the state transition $T(2)_{12}$ from state #1 to state #2.

Further, if HMM#2 as a transitional HMM at time t=1 is focused on, combinations {1}, {3}, and {1,3} exist as $D=_{M-1}C_L$ combinations of HMM when L HMMs are selected from HMMs other than the transitional HMM#2.

Then, if the HMM combination {1} is focused on, only the transition counter corresponding to a set of the state vector [1,*,-], among state vectors having states of HMM#1 of the HMM combination {1} as elements, having the current state $S^1_1$ of HMM#1 of the HMM combination {1} at time t=0 one unit time before as the element and the state transition $T(2)_{12}$ of HMM#2 as a transitional HMM is incremented by 1.

If the HMM combination {3} is focused on, only the transition counter corresponding to a set of the state vector [-,*,1], among state vectors having states of HMM#3 of the HMM combination {3} as elements, having the current state $S^3_1$ of HMM#3 of the HMM combination {3} at time t=0 one unit time before as the element and the state transition $T(2)_{12}$ of HMM#2 as a transitional HMM is incremented by 1.

If the HMM combination {1,3} is focused on, only the transition counter corresponding to a set of the state vector [1,*,1], among state vectors having states of HMM#1 and #3 of the HMM combination {1,3} as elements, having the current states $S^1_1$ and $S^3_1$ of HMM#1 and #3 of the HMM combination {1,3} at time t=0 one unit time before as elements and the state transition $T(2)_{12}$ of HMM#2 as a transitional HMM is incremented by 1.

At time t=1 when the current state vector changes from [1,1,1] to [1,2,1], only the transition counters corresponding to sets of the respective state vectors [1,*,-], [-,*,1], and [1,*,1] and the state transition $T(2)_{12}$ are incremented by 1.

At time t=2, as shown in Formula (1), the current state vector [1,2,1] is supplied to the causal learning data acquisition unit 51.

]At time t=2, the current state vector [1,2,1] matches the current state vector [1,2,1] at time t=1 one unit time before and so the causal learning data acquisition unit 51 does not list up any transitional HMM.

If no transitional HMM is listed up, the causal learning data acquisition unit 51 increments the state counter, but does not increment the transition counter.

That is, the causal learning data acquisition unit 51 sequentially focuses on $D={}_MC_{L+1}$ HMM combinations {1,2}, {1,3}, {2,3}, and {1,2,3} for L of each value of L=1, 2.

Then, the causal learning data acquisition unit 51 increments by 1 the state counter $N_S(V(cM(L+1;)(d)))$ corresponding to the state vector $V(cM(L+1;)(d))=v_S(1)$, among (L+1)-dimensional state vectors $V(cM(L+1;)(d))$ having states of HMMs of the focused combination of HMM as elements, having states matching the current states at time t=1 as elements of the current state vector [1,2,1] at time t=1 one unit time before as elements.

More specifically, if the HMM combination {1,2} is focused on, only the state counter corresponding to the state vector [1,2,-], among state vectors having respective states of HMM#1 and #2 of the HMM combination {1,2} as elements, having the current states $S^1{}_1$ and $S^2{}_2$ of HMM#1 and #2 at time t=1 one unit time before as elements is incremented by 1.

If the HMM combination {1,3} is focused on, only the state counter corresponding to the state vector [1,-,1], among state vectors having respective states of HMM#1 and #3 of the HMM combination {1,3} as elements, having the current states $S^1{}_1$ and $S^3{}_1$ of HMM#1 and #3 at time t=1 one unit time before as elements is incremented by 1.

If the HMM combination {2,3} is focused on, only the state counter corresponding to the state vector [-,2,1], among state vectors having respective states of HMM#2 and #3 of the HMM combination {2,3} as elements, having the current states $S^2{}_2$ and $S^3{}_1$ of HMM#2 and #3 at time t=1 one unit time before as elements is incremented by 1.

If the HMM combination {1,2,3} is focused on, only the state counter corresponding to the state vector [1,2,1], among state vectors having respective states of HMM#1 to #3 of the HMM combination as elements, having the current states $S^1{}_1$, $S^2{}_2$, and $S^3{}_1$ of HMM#1 to #3 at time t=1 one unit time before as elements is incremented by 1.

At time t=2, as described above, state counters corresponding to each of the four state vectors [1,2,-], [1,-,1], [-,2,1], and [1,2,1] are incremented by 1.

At time t=3, as shown in Formula (1), the current state vector [2,2,1] is supplied to the causal learning data acquisition unit 51.

At time t=3, the causal learning data acquisition unit 51 compares the current state vector [2,2,1] at time t=3 and the current state vector [1,2,1] at time t=2 one unit time before to list up HMM#1 as the HMM that has undergone a state transition (state change) from among HMM#1 to #3 as transitional HMM.

The causal learning data acquisition unit 51 sequentially focuses on $D={}_MC_{L+1}$ HMM combinations {1,2}, {1,3}, {2,3}, and {1,2,3} for L of each value.

Then, the causal learning data acquisition unit 51 increments by 1 the state counter $N_S(V(cM(L+1;)(d)))$ corresponding to the state vector $V(cM(L+1;)(d))=v_S(2)$, among (L+1)-dimensional state vectors $V(cM(L+1;)(d))$ having states of HMMs of the focused combination of HMM as elements, having states matching the current states at time t=2 as elements of the current state vector [1,2,1] at time t=2 one unit time before as elements.

More specifically, if the HMM combination {1,2} is focused on, only the state counter corresponding to the state vector [1,2,-], among state vectors having respective states of HMM#1 and #2 of the HMM combination {1,2} as elements, having the current states $S^1$ and $S^2{}_2$ of HMM#1 and #2 at time t=2 one unit time before as elements is incremented by 1.

If the HMM combination {1,3} is focused on, only the state counter corresponding to the state vector [1,-,1], among state vectors having respective states of HMM#1 and #3 of the HMM combination {1,3} as elements, having the current states $S^1{}_1$ and $S^3{}_1$ of HMM#1 and #3 at time t=2 one unit time before as elements is incremented by 1.

If the HMM combination {2,3} is focused on, only the state counter corresponding to the state vector [-,2,1], among state vectors having respective states of HMM#2 and #3 of the HMM combination {2,3} as elements, having the current states $S^2{}_2$ and $S^3{}_1$ of HMM#2 and #3 at time t=2 one unit time before as elements is incremented by 1.

If the HMM combination {1,2,3} is focused on, only the state counter corresponding to the state vector [1,2,1], among state vectors having respective states of HMM#1 to #3 of the HMM combination as elements, having the current states $S^1{}_1$, $S^2{}_2$, and $S^3{}_1$ of HMM#1 to #3 at time t=2 one unit time before as elements is incremented by 1.

At time t=3, as described above, state counters corresponding to each of the four state vectors [1,2,-], [1,-,1], [-,2,1], and [1,2,1] are incremented by 1.

The causal learning data acquisition unit 51 sequentially focuses on transitional HMMs and further sequentially focuses on $D={}_{M-1}C_L$ combinations of HMM for L of each value when L HMMs are selected from HMMs other than focused transitional HMM#m'.

Then, the causal learning data acquisition unit 51 increments by 1 the transition counter $N_T(T(m')_{ij}, V(cM(L;m')(d)))$ corresponding to the state vector $V(cM(L;m')(d))=v_T(2)$, among L-dimensional state vectors $V(cM(L;m')(d))$ having states of HMMs of the focused combination of HMM as elements, having states matching the current states at time t=2 as elements of the current state vector [1,2,1] at time t=2 one unit time before as elements and the state transition $T(m')_{ij}=T(2)$ that occurs in the focused transitional HMM#m'.

That is, in Formula (1), the transitional HMM at time t=3 is HMM#1 only and the state transition occurring in the HMM#1 is the state transition $T(1)_{12}$ from state #1 to state #2.

Further, if HMM#1 as a transitional HMM at time t=3 is focused on, combinations {2}, {3}, and {2,3} exist as $D={}_{M-1}C_L$ combinations of HMM for L of each value when L HMMs are selected from HMMs other than the transitional HMM#1.

Then, if the HMM combination {2} is focused on, only the transition counter corresponding to a set of the state vector [*,2,-], among state vectors having states of HMM#2 of the HMM combination {2} as elements, having the current state $S^2{}_2$ of HMM#2 at time t=2 one unit time before as the element and the state transition $T(1)_{12}$ of HMM#1 as a transitional HMM is incremented by 1.

If the HMM combination {3} is focused on, only the transition counter corresponding to a set of the state vector [*,-,1], among state vectors having states of HMM#3 of the HMM combination {3} as elements, having the current state $S^3{}_1$ of HMM#3 at time t=2 one unit time before as the element and the state transition $T(1)_{12}$ of HMM#1 as a transitional HMM is incremented by 1.

Then, if the HMM combination {2,3} is focused on, only the transition counter corresponding to a set of the state vector [*,2,1], among state vectors having states of HMM#2 and #3 of the HMM combination {2,3} as elements, having the current states $S^2{}_2$ and $S^3{}_1$ of HMM#2 and #3 at time t=2 one unit time before as the element and the state transition $T(1)_{12}$ of HMM#1 as a transitional HMM is incremented by 1.

At time t=3 when the current state vector changes from [1,2,1] to [2,2,1], only the transition counters corresponding to sets of the respective state vectors [*,2,-], [*,-,1], [*,2,1] and the state transition $T(1)_{12}$ are incremented by 1.

At time t=4, as shown in Formula (1), the current state vector [2,4,3] is supplied to the causal learning data acquisition unit 51.

At time t=4, the causal learning data acquisition unit 51 compares the current state vector [2,4,3] at time t=4 and the current state vector [2,2,1] at time t=3 one unit time before to list up HMM#2 and #3 as the HMMs that have undergone a state transition (state change) from among HMM#1 to #3 as transitional HMMs.

The causal learning data acquisition unit 51 sequentially focuses on $D=_MC_{L+1}$ HMM combinations {1,2}, {1,3}, {2,3}, and {1,2,3} for L of each value.

Then, the causal learning data acquisition unit 51 increments by 1 the state counter $N_S(V(cM(L+1;)(d)))$ corresponding to the state vector $V(cM(L+1;)(d))=v_S(3)$, among (L+1)-dimensional state vectors $V(cM(L+1;)(d))$ having states of HMMs of the focused combination of HMM as elements, having states matching the current states at time t=3 as elements of the current state vector [2,2,1] at time t=3 one unit time before as elements.

More specifically, if the HMM combination {1,2} is focused on, only the state counter corresponding to the state vector [2,2,-], among state vectors having respective states of HMM#1 and #2 of the HMM combination {1,2} as elements, having the current states $S^1_2$ and $S^2_2$ of HMM#1 and #2 at time t=3 one unit time before as elements is incremented by 1.

If the HMM combination {1,3} is focused on, only the state counter corresponding to the state vector [2,-,1], among state vectors having respective states of HMM#1 and #3 of the HMM combination {1,3} as elements, having the current states $S^1_2$ and $S^3_1$ of HMM#1 and #3 at time t=3 one unit time before as elements is incremented by 1.

If the HMM combination {2,3} is focused on, only the state counter corresponding to the state vector [-,2,1], among state vectors having respective states of HMM#2 and #3 of the HMM combination {2,3} as elements, having the current states $S^2_2$ and $S^3_1$ of HMM#2 and #3 at time t=3 one unit time before as elements is incremented by 1.

If the HMM combination {1,2,3} is focused on, only the state counter corresponding to the state vector [2,2,1], among state vectors having respective states of HMM#1 to #3 of the HMM combination as elements, having the current states $S^1_2$, $S^2_2$, and $S^3_1$ of HMM#1 to #3 at time t−3 one unit time before as elements is incremented by 1.

At time t=4, as described above, state counters corresponding to each of the four state vectors [2,2,-], [2,-,1], [-,2,1], and [2,2,1] are incremented by 1.

The causal learning data acquisition unit 51 sequentially focuses on transitional HMMs and further sequentially focuses on $D=_{M-1}C_L$ combinations of HMM for L of each value when L HMMs are selected from HMMs other than focused transitional HMM#m'.

Then, the causal learning data acquisition unit 51 increments by 1 the transition counter $N_T(T(m')_{ij}, V(cM(L;m')(d)))$ corresponding to the state vector $V(cM(L;m')(d))=v_T(3)$, among L-dimensional state vectors $V(cM(L;m')(d))$ having states of HMMs of the focused combination of HMM as elements, having states matching the current states at time t=3 as elements of the current state vector [2,2,1] at time t=3 one unit time before as elements and the state transition $T(m')_{ij}=T(3)$ that occurs in the focused transitional HMM#m'.

That is, in Formula (1), the transitional HMM at time t=4 includes HMM#2 and #3 and the state transition occurring in the HMM#2 is the state transition $T(2)_{24}$ from state #2 to state #4 and the state transition occurring in the HMM#3 is the state transition $T(3)_{13}$ from state #1 to state #3.

The causal learning data acquisition unit 51 focuses, among transitional HMMs, HMM#2 and #3, for example, on HMM#2.

If HMM#2 as one of transitional HMMs at time t=4 is focused on, combinations {1}, {3}, and {1,3} exist as $D=_{M-1}C_L$ combinations of HMM for L of each value when L HMMs are selected from HMMs other than the transitional HMM#2.

If the HMM combination {1} is focused on, only the transition counter corresponding to a set of the state vector [2,*,-], among state vectors having states of HMM#1 of the HMM combination {1} as elements, having the current state $S^1_2$ of HMM#1 of the HMM combination {1} at time t=3 one unit time before as the element and the state transition $T(2)_{24}$ of HMM#2 as a transitional HMM is incremented by 1.

If the HMM combination {3} is focused on, only the transition counter corresponding to a set of the state vector [-,*,1], among state vectors having states of HMM#3 of the HMM combination {3} as elements, having the current state $S^3_1$ of HMM#3 at time t=3 one unit time before as the element and the state transition $T(2)_{24}$ of HMM#2 as a transitional HMM is incremented by 1.

If the HMM combination {1,3} is focused on, only the transition counter corresponding to a set of the state vector [2,*,1], among state vectors having states of HMM#1 and #3 of the HMM combination {1,3} as elements, having the current states $S^1_2$ and $S^3_1$ of HMM#1 and #3 at time t=3 one unit time before as elements and the state transition $T(2)_{24}$ of HMM#2 as a transitional HMM is incremented by 1.

Then, the causal learning data acquisition unit 51 focuses on the remaining HMM#3 of HMM#2 and #3 as transitional HMMs.

If HMM#3 as one of transitional HMMs at time t=4 is focused on, combinations {1}, {2}, and {1,2} exist as $D=_{M-1}C_L$ combinations of HMM for L of each value when L HMMs are selected from HMMs other than the transitional HMM#3.

If the HMM combination {1} is focused on, only the transition counter corresponding to a set of the state vector [2,-,*], among state vectors having states of HMM#1 of the HMM combination {1} as elements, having the current state $S^1_2$ of HMM#1 of the HMM combination {1} at time t=3 one unit time before as the element and the state transition $T(3)_{13}$ of HMM#3 as a transitional HMM is incremented by 1.

If the HMM combination {2} is focused on, only the transition counter corresponding to a set of the state vector [-,2,*], among state vectors having states of HMM#2 of the HMM combination {2} as elements, having the current state $S^2_2$ of HMM#2 at time t=3 one unit time before as the element and the state transition $T(3)_{13}$ of HMM#3 as a transitional HMM is incremented by 1.

If the HMM combination {1,2} is focused on, only the transition counter corresponding to a set of the state vector [2,2,*], among state vectors having states of HMM#1 and #2 of the HMM combination {1,2} as elements, having the current states $S^1_2$ and $S^2_2$ of HMM#1 and #2 at time t=3 one unit time before as elements and the state transition $T(3)_{13}$ of HMM#3 as a transitional HMM is incremented by 1.

At time t=4 when the current state vector changes from [2,2,1] to [2,4,3], as described above, transitions counters corresponding to sets of the respective state vectors [2,*,-], [-,*,1], [2,*,1] and the state transition $T(2)_{34}$ are incremented by 1 and transitions counters corresponding to sets of the respective state vectors [2,-,*], -,2,*}, [2,2,*] and the state transition $T(3)_{13}$ are incremented by 1.

Similarly, each time the current states are supplied from the learning recognition units $12_1$ to $12_M$ with the passage of time, the causal learning data acquisition unit 51 increments the state counter and transition counter.

The causal learning data acquisition unit 51 supplies the count value $N_S(V(cM(L+1;)(d)))$ of the state counter and the count value $N_T(T(m')_{ij}, V(cM(L;m')(d)))$ of the transition counter to the causal learning unit 52 as causal learning data.

Next, causal learning processing (FIG. 5) in step S22 will be described.

In the causal learning processing, the causal learning unit 52 performs causal learning that acquires a causal relationship between the state transition $T(m')_{ij}$ of a first HMM#m' as one HMM of M HMMs and the state vector $V(cM(L;m')(d))$ as a state of second HMM as at least one other HMM (states as elements of the state vector $V(cM(L;m')(d))$ are current states) by using the count value $N_S(V(cM(L+1;)(d)))$ of the state counter and the count value $N_T(T(m')_{ij}, V(cM(L;m')(d)))$ of the transition counter from the causal learning data acquisition unit 51 as causal learning data.

In the learning (acquisition) of a causal relationship of the state transition $T(m')_{ij}$ of HMM#m', the causal learning unit 52 performs the following processing for L of each value by sequentially changing L like 1, 2, . . . , M−1.

That is, the causal learning unit 52 determines a conditional probability $p(T(m')_{ij}|V(cM(L;m')(d)))$ that the state transition $T(m')_{ij}$ occurs when states as elements of the state vector $V(cM(L;m')(d))$ of an L-dimensional state vector $V(cM(L;m')(d))=[S(d, 1),S(d,2), . . . , S(d,L)]$ are the current states.

The conditional probability $p(T(m')_{ij}|V(cM(L;m')(d)))$ is determined by using the count value $N_S(V(cM(L+1;)(d)))$ of the state counter and the count value $N_T(T(m')_{ij}, V(cM(L;m')(d)))$ of the transition counter.

That is, the causal learning unit 52 generates an (L+1)-dimensional state vector $[S^{m'}_i, V(cM(L;m')(d))]$ that always contains the state $S^{m'}_i$ of the transition source of HMM#m' as an element by augmenting an L-dimensional state vector $V(cM(L;m')(d))$ with the state $S^{m'}_i$ of the transition source of the state transition $T(m')_{ij}$ of HMM#m' and acquires the count value $N_S([S^{m'}_i, V(cM(L;m')(d))])$ of the state counter corresponding to the state vector $[S^{m'}_i, V(cM(L;m')(d))]$.

The (L+1)-dimensional state vector $[S^{m'}_i, V(cM(L;m')(d))]$ is a vector contained in the (L+1)-dimensional state vector $V(cM(L+1;)(d))$.

If the count value $N_S([S^{m'}_i, V(cM(L;m')(d))])$ of the state counter corresponding to the state vector $[S^{m'}_i, V(cM(L;m')(d))]$ is 0, that is, states as elements of the state vector $[S^{m'}_i, V(cM(L;m')(d))]$ have not been the current states at the same time in the combination of (L+1) HMMs containing HMM#m', the causal learning unit 52 sets a predetermined value $\sigma_0$ to the conditional probability $p(T(m')_{ij}|V(cM(L;m')(d)))$.

The predetermined value $\sigma_0$ is a fixed value equal to 0 or more and equal to 1 or less that gives the minimum probability of the conditional probability $p(T(m')_{ij}|V(cM(L;m')(d)))$.

On the other hand, if the count value $N_S([S^{m'}_i, V(cM(L;m')(d))])$ of the state counter corresponding to the state vector $[S^{m'}_i, V(cM(L;m')(d))]$ is 1 or more, the causal learning unit 52 acquires the count value $N_T(T(m')_{ij}, V(cM(L;m')(d)))$ of the transition counter corresponding to a set of the state vector $V(cM(L;m')(d))$ and the state transition $T(m')_{ij}$, that is, the number of times of occurrence of the state transition $T(m')_{ij}$ in HMM#m' when states as elements of the state vector $[S^{m'}_i, V(cM(L;m')(d))]$ are the current states at the same time in the combination of (L+1) HMMs containing HMM#m'.

Then, the causal learning unit 52 determines an expected value $N_T(T(m')_{ij}, V(cM(L;m')(d)))/N_S([S^{m'}_i, V(cM(L;m')(d))])$ of the conditional probability $p(T(m')_{ij}|V(cM(L;m')(d)))$ by dividing the count value $N_T(T(m')_{ij}, V(cM(L;m')(d)))$ of the transition counter by the count value $N_S([S^{m'}_i, V(cM(L;m')(d))])$ of the state counter as a tentative probability value $p_0$ of the conditional probability $p(T(m')_{ij}|V(cM(L;m')(d)))$.

Then, the causal learning unit 52 determines the conditional probability $p(T(m')_{ij}|V(cM(L;m')(d)))$ by using the tentative probability value $p_0$ according to, for example, Formula (2).

$$p(T(m')_{ij}|V(cM(L;m')(d)))=\min\{1,p_0+\sigma\} \qquad (2)$$

In Formula (2), $\min\{1,p_0+\sigma\}$ represents the smaller of 1 and $p_0+\sigma$.

The value $\sigma$ in Formula (2) is represented by the following formula:

$$\sigma=\sqrt{((p_0(1-p_0)+\sigma_0^2)/N_S([S^{m'}_i,V(cM(L;m')(d))]))} \qquad (3)$$

The causal learning unit 52 determines whether the conditional probability $p(T(m')_{ij}|V(cM(L;m')(d)))$ is equal to a preset threshold (for example, a threshold larger than the predetermined value $\sigma_0$) or more and, if the conditional probability $p(T(m')_{ij}|V(cM(L;m')(d)))$ is equal to the threshold or more, registers the conditional probability $p(T(m')_{ij}|V(cM(L;m')(d)))$ with a factor candidate list together with the state vector $V(cM(L;m')(d))$ by associating with the state transition $T(m')$.

That is, state vectors $V(cM(L;m')(d))$ are registered with the factor candidate list in descending order of conditional probability $p(T(m')_{ij}|V(cM(L;m')(d)))$ for each state transition $T(m')_{ij}$.

Therefore, the factor candidate list is a list of HMM states of the HMM combination cM(L;m')(d) (second HMM state) (states as elements of the state vector $V(cM(L;m')(d))$) as a factor causing the state transition $T(m')_{ij}$ of HMM#m' (first HMM), that is, a list of state vectors $V(cM(L;m')(d))$ having a causal relationship with the state transition $T(m')_{ij}$.

In the factor candidate list, (states as elements of) the state vector $V(cM(L;m')(d))$ registered by being associated with the state transition $T(m')_{ij}$ are factor candidates causing the state transition $T(m')_{ij}$.

The causal learning unit 52 acquires a causal relationship between the state transition $T(m')_{ij}$ and the state vector $V(cM(L;m')(d))$ in the form of the state vector $V(cM(L;m')(d))$ being registered with the factor candidate list by associating with the state transition $T(m')_{ij}$ together with the conditional probability $p(T(m')_{ij}|V(cM(L;m')(d)))$.

A concrete example of causal learning processing performed by the causal learning unit 52 when, as shown in FIG. 6, HMMs stored in the learning recognition units $12_1$ to $12_M$ (FIG. 3) are three HMM#1, #2, #3 (M=3) will be described.

For the state transition $T(2)_{12}$ of HMM#2 from state #2 to state #1 (m'=2), for example, if the value of L takes 1 and 2, HMM combinations {1}, {3}, and {1,3} are obtained as $D={}_{M-1}C_L$ combinations cM(L;2)(d) of HMM (d=1, 2, . . . , D) for L of each value when L HMMs are selected from HMM#1 and #3 obtained by excluding HMM#2 from HMM#1 to #3.

Regarding the HMM combination {1}, the number of states N(1) of HMM#1 contained in the combination {1} is, as described above, 2, and thus, two vectors exist as state vectors having states of HMM#1 of the HMM combination {(1)} as elements.

Regarding the HMM combination {3}, the number of states N(3) of HMM#3 contained in the combination {3} is 3 and thus, three vectors exist as state vectors having states of HMM#3 of the HMM combination {3} as elements. Further, regarding the HMM combination {1,3}, the number of states N(1) of HMM#1 contained in the combination {1,3} is 2 and the number of states N(3) of HMM#3 is 3 and thus, 6 (=2×3) vectors exist as state vectors having states of HMM#1 and #3 of the HMM combination {1,3} as elements.

Therefore, regarding the state transition $T(2)_{12}$ of HMM#2, 11 (=2+3+6) vectors exist as L-dimensional state vectors V(cM(L;2)(d)) that could become a factor.

For example, the vector [1,*,-] exists as one of two state vectors having states of HMM#1 of the HMM combination {1} as elements. Also, for example, the vector [1,*,1] exists as one of six state vectors having states of HMM#1 and #3 of the HMM combination {1,3} as elements.

These state vectors [1,*,-] and [1,*,1] are taken as an example to describe the method of determining the conditional probability $p(T(2)_{12}|V(cM(L;2)(d)))$ with which the state transition $T(2)_{12}$ occurs when states as elements of the state vector V(cM(L;2)(d)) are the current states.

Regarding the state vector [1,*,-], the causal learning unit 52 generates the state vector [1,1,-] as an (L+1)-dimensional state vector $[S^2_1, V(cM(L;2)(d))]=[S^2_1, [1,*,-]]$ that always contains the state $S^2_1$ of the transition source of HMM#2 as an element by augmenting the state vector [1,*,-] as an L-dimensional state vector V(cM(L;2)(d)) with the state $S^2_1$ of the transition source of the state transition $T(2)_{12}$ of HMM#2.

Then, the causal learning unit 52 acquires the count value $N_S([S^{m'}_i, V(cM(L;m')(d))])=N_S([1,1,-])$ of the state counter corresponding to the state vector [1,1,-] as a state vector $[S^2_1, V(cM(L;2)(d))]=[S^2_1, [1*,-]]$.

If the count value $N_S([1,1,-])$ of the state counter is 0, the causal learning unit 52 sets a predetermined value $\sigma_0$ to the conditional probability $p(T(2)_{12}|[1,*,-])$.

On the other hand, if the count value $N_S([1,1,-])$ of the state counter is 1 or more, the causal learning unit 52 acquires the count value $N_T(T(m')_{ij}, V(cM(L;m')(d)))=N_T(T(2)_{12}, [1,*,-])$ of the transition counter corresponding to a set of the state vector V(cM(L;2)(d))=[1,*,-] and the state transition $T(2)_{12}$.

Then, the causal learning unit 52 determines the conditional probability $p(T(m')_{ij}|V(cM(L;m')(d)))=p(T(2)_{12}|[1,*,-])$ by using the count values $N_S([1,1,-])$ and $N_T(T(2)_{12}|[1,*,-])$ according to Formula (2).

If the conditional probability $p(T(m')_{ij}|V(cM(L;m')(d)))=p(T(2)_{12}|[1,*,-])$ is equal to the threshold or more, the causal learning unit 52 registers the conditional probability $p(T(2)_{12}|[1,*,-])$ with a factor candidate list together with the state vector V(cM(L;m')(d))=[1,*,-] by associating with the state transition $T(2)_{12}$.

Next, regarding the state vector [1,*,1], the causal learning unit 52 generates the state vector [1,1,1] as an (L+1)-dimensional state vector $[S^2_1, V(cM(L;2)(d))]=[S^2_1, [1,*,1]]$ that always contains the state $S^2_1$ of the transition source of HMM#2 as an element by augmenting the state vector [1,*,1] as an L-dimensional state vector V(cM(L;2)(d)) with the state $S^2_1$ of the transition source of the state transition $T(2)_{12}$ of HMM#2.

Then, the causal learning unit 52 acquires the count value $N_S([S^{m'}_i, V(cM(L;m')(d))])=N_S([1,1,1])$ of the state counter corresponding to the state vector [1,1,1] as a state vector $[S^2_1, V(cM(L;2)(d))]=[S^2_1,[1,*,1]]$.

If the count value $N_S([1,1,1])$ of the state counter is 0, the causal learning unit 52 sets a predetermined value $\sigma_0$ to the conditional probability $p(T(2)_{12}|[1,*,1])$.

On the other hand, if the count value $N_S([1,1,1])$ of the state counter is 1 or more, the causal learning unit 52 acquires the count value $N_T(T(m')_{ij}, V(cM(L;m')(d)))=N_T(T(2)_{12},[1,*,1])$ of the transition counter corresponding to a set of the state vector V(cM(L;2)(d))=[1,*,1] and the state transition $T(2)_{12}$.

Then, the causal learning unit 52 determines the conditional probability $p(T(m')_{ij}|V(cM(L;m')(d)))=p(T(2)_{12}|[1,*,1])$ by using the count values $N_S([1,1,1])$ and $N_T(T(2)_{12},[1,*,1])$ according to Formula (2).

If the conditional probability $p(T(m')_{ij}|V(cM(L;m')(d)))=p(T(2)_{12}|[1,*,\mathbf{1}])$ is equal to the threshold or more, the causal learning unit 52 registers the conditional probability $p(T(2)_{12}|[1,*,1])$ with a factor candidate list together with the state vector V(cM(L;m')(d))=[1,*,1] by associating with the state transition $T(2)_{12}$.

The factor candidate list in which the conditional probability $p(T(m')_{ij}|V(cM(L;m')(d)))$ is registered by being associated with the state transition $T(m')_{ij}$ together with the state vector V(cM(L;m')(d)) is supplied from the causal learning unit 52 to the factor candidate list storage unit 53 where the list is stored.

Next, merge processing (FIG. 5) in step S23 will be described.

In the merge processing, the merge unit 54 sorts out a factor candidate list by merging state vectors registered with a factor candidate list stored in the factor candidate list storage unit 53 when necessary to eliminate unnecessary state vectors.

The merge unit 54 selects two state vectors registered by being associated with the same state transition $T(m')_{ij}$ for merge processing and determines whether the two state vectors selected for merge processing should be merged.

Two state vectors selected for merge processing in a factor candidate list are two state vectors including an L-dimensional state vector V(cM(L;m')(d)) registered by being associated with the same state transition $T(m')_{ij}$ and an (L+1)-dimensional state vector $[S^{m''}_i, V(cM(L;m')(d))]$ containing the state $S^{m''}_i$ of some HMM#m'' obtained by augmenting the state vector V(cM(L;m')(d)) with the state $S^{m''}_i$ of the HMM#m''.

The HMM#m'' used to augment the state vector V(cM(L;m')(d)) with the state $S^{m''}_i$ is neither the HMM#m' in which the state transition $T(m')_{ij}$ occurs nor the HMM in a state as an element of the state vector V(cM(L;m')(d)).

As an (L+1)-dimensional state vector $[S^{m''}_i, V(cM(L;m')(d))]$ obtained by augmenting the state vector V(cM(L;m')(d)) with the state $S^{m''}_i$ of the HMM#m'', a vector with only the number of states N(m'') of HMM#m'', the vector $[S^{m''}_1, V(cM(L;m')(d))][S^{m''}_2, V(cM(L;m')(d))], \ldots [S^{m''}_{N(m'')}, V(cM(L;m')(d))]$ exists.

Because the (L+1)-dimensional state vector $[S^{m''}_i, V(cM(L;m')(d))]$ is a vector obtained by augmenting the L-dimensional state vector V(cM(L;m')(d)) with the state $S^{m''}_i$ of HMM#m'', the L-dimensional state vector V(cM(L;m')(d)) is conceptually a higher state vector of the (L+1)-dimensional state vector $[S^{m''}_i, V(cM(L;m')(d))]$(the state vector $[S^{m''}_i, V(cM(L;m')(d))]$ is a lower state vector of the state vector V(cM(L;m')(d))).

Whether to merge the state vector $[S^{m''}_i, V(cM(L;m')(d))]$ and the state vector V(cM(L;m')(d)) is determined by whether the state vector $[S^{m''}_i, V(cM(L;m')(d))]$ as a lower state vector can be included in the state vector V(cM(L;m')(d)) as a higher state vector and handled as the same state vector.

That is, the tentative probability value $p_0$ of the higher state vector V(cM(L;m')(d)) and the value $\sigma$ determined according to Formula (3) are denoted as $p_U$ and $\sigma_U$ respectively and the tentative probability value $p_0$ of the lower state vector $[S^{m''}_i, V(cM(L;m')(d))]$ and the value $\sigma$ determined according to Formula (3) are denoted as $p_D$ and $\sigma_D$ respectively.

The merge unit 54 determines whether to merge depending on whether Formula (4) is satisfied.

$$|p_U - p_D| > \alpha(\sigma_U + \sigma_D) \quad (4)$$

In Formula (4), α is a coefficient to adjust the threshold α ($\sigma_U + \sigma_D$).

If Formula (4) is satisfied, that is, the tentative probability value $p_U$ of the higher state vector V(cM(L;m')(d)) and the tentative probability value $p_D$ of the lower state vector [$S^{m''}_i$, V(cM(L;m')(d))] are significantly different, the merge unit 54 determines that the higher state vector V(cM(L;m')(d)) and the lower state vector [$S^{m''}_i$, V(cM(L;m')(d))] cannot be merged (merge processing not allowed).

If Formula (4) is not satisfied, that is, the tentative probability value $p_U$ of the higher state vector V(cM(L;m')(d)) and the tentative probability value $p_D$ of the lower state vector [$S^{m''}_i$, V(cM(L;m')(d))] are not significantly different, the merge unit 54 determines that the higher state vector V(cM(L;m')(d)) and the lower state vector [$S^{m''}_i$, V(cM(L;m')(d))] can be merged (merge processing allowed).

Whether to merge is determined for the higher state vector V(cM(L;m')(d)) and each of N(m") lower state vectors [$S^{m''}_i$, V(cM(L;m')(d))], that is, vectors [$S^{m''}_1$, V(cM(L;m')(d))] [$S^{m''}_2$, V(cM(L;m')(d))], . . . [$S^{m''}_{N(m'')}$, V(cM(L;m')(d))] obtained by augmenting the higher state vector V(cM(L;m')(d)) with each state $S^{m''}_i$ of HMM#m".

If, when the higher state vector V(cM(L;m')(d)) and N(m") respective lower state vectors [$S^{m''}_i$, V(cM(L;m')(d))] are determined whether to merge, at least one of N(m") lower state vectors [$S^{m''}_i$, V(cM(L;m')(d))] is determined not to be allowed to merge, the merge unit 54 deletes the higher state vector V(cM(L;m')(d)) from the factor candidate list and retains the N(m") lower state vectors [$S^{m''}_i$, V(cM(L;m')(d))].

On the other hand, if, when the higher state vector V(cM(L;m')(d)) and N(m") respective lower state vectors [$S^{m''}_i$, V(cM(L;m')(d))] are determined whether to merge, all N(m") lower state vectors [$S^{m''}_i$, V(cM(L;m')(d))] are determined to be allowed to merge, the merge unit 54 merges the N(m") lower state vectors [$S^{m''}_i$, V(cM(L;m')(d))] with the higher state vector V(cM(L;m')(d)) by deleting the N(m") lower state vectors [$S^{m''}_i$, V(cM(L;m')(d))] from the factor candidate list.

Further, the merge unit 54 merges state vectors, among state vectors associated with the state transition T(m')$_{ij}$ together with the higher state vector V(cM(L;m')(d)), partially containing any of the N(m") lower state vectors [$S^{m''}_i$, V(cM(L;m')(d))](state vectors still lower than the lower state vectors [$S^{m''}_i$, V(cM(L;m')(d))]) with the higher state vector V(cM(L;m')(d)) by deleting such state vectors from the factor candidate list.

Thus, if the difference of the tentative probability values $p_0$ of the higher state vector and the lower state vector associated with the same state transition is not significantly different, the merge unit 54 merges the lower state vector with the higher state vector so that the lower state vector is, as it were, handled by the higher state vector together.

The merge processing can be performed preferentially by selecting a stiller higher vector for merge processing.

A concrete example of merge processing performed by the merge unit 54 when, as shown in FIG. 6, HMMs stored in the learning recognition units $12_1$ to $12_M$ (FIG. 3) are three HMM#1, #2, #3 (M=3) will be described.

It is assumed, for example, that state vectors [1,*,-], [1,*,1], [1,*,2], and [1,*,3] are registered with a factor candidate list by associating with some state transition T(2)$_{ij}$ of HMM#2 as an HMM when m'=2.

If, among the state vectors [1,*,-], [1,*,1], [1,*,2], and [1,*,3], for example, the state vector [1,*,-] having only the state of HMM#1 as an element is selected as a higher state vector, three state vectors equal to the number of states N(3) of HMM#3 exist as (L+1)-dimensional state vectors [$S^3_i$, [1,*,-]] obtained by augmenting the higher state vector [1,*,-] with the state $S^{m''}_i = S^3_i$ of HMM#3 (HMM when m"=3), which is neither HMM#2 in which the state transition T(2)$_{ij}$ occurs nor HMM#1 in a state as en element of the higher state vector [1,*,-] and the state vectors [$S^3_i$, [1,*,-]] are state vectors [1,*,1], [1,*,2], [1,*,3].

That is, the state vectors [1,*,1], [1,*,2], [1,*,3] are lower state vectors for the higher state vector [1,*,-].

The merge unit 54 calculates the tentative probability value $p_0$ of each of the higher state vector [1,*,-] and the lower state vectors [1,*,1], [1,*,2], [1,*,3] to determine whether to merge the higher state vector [1,*,-] with each of the lower state vectors [1,*,1], [1,*,2], [1,*,3] depending on whether Formula (4) is satisfied by the tentative probability values $p_0$.

If all lower state vectors [1,*,1], [1,*,2], [1,*,3] are determined to be allowed to merge, the merge unit 54 merges the lower state vectors [1,*,1], [1,*,2], [1,*,3] with the higher state vector [1,*,-] by deleting the lower state vectors [1,*,1], [1,*,2], [1,*,3].

On the other hand, if at least one of the lower state vectors [1,*,1], [1,*,2], [1,*,3] is determined not to be allowed to merge, the merge unit 54 deletes the higher state vector [1,*,-] from the factor candidate list while retaining the lower state vectors [1,*,1], [1,*,2], [1,*,3] in the factor candidate list.

According to the merge processing described above, only state vectors that are necessary in view of a causal relationship with some state transition being represented can be retained in the factor candidate list.

Next, causal estimation processing (FIG. 5) in step S24 will be described.

In the causal estimation processing, the causal estimation unit 55 reads a state vector associated with a state transition of the attention HMM from the plan controller 36 (FIG. 3) in a factor candidate list (factor candidate list after merge processing) stored in the factor candidate list storage unit 53 as an estimation result of states (factors) of the causal HMM in a causal relationship with the state transition of the attention HMM and supplies (returns) the state vector to the plan controller 36.

Figure 7:
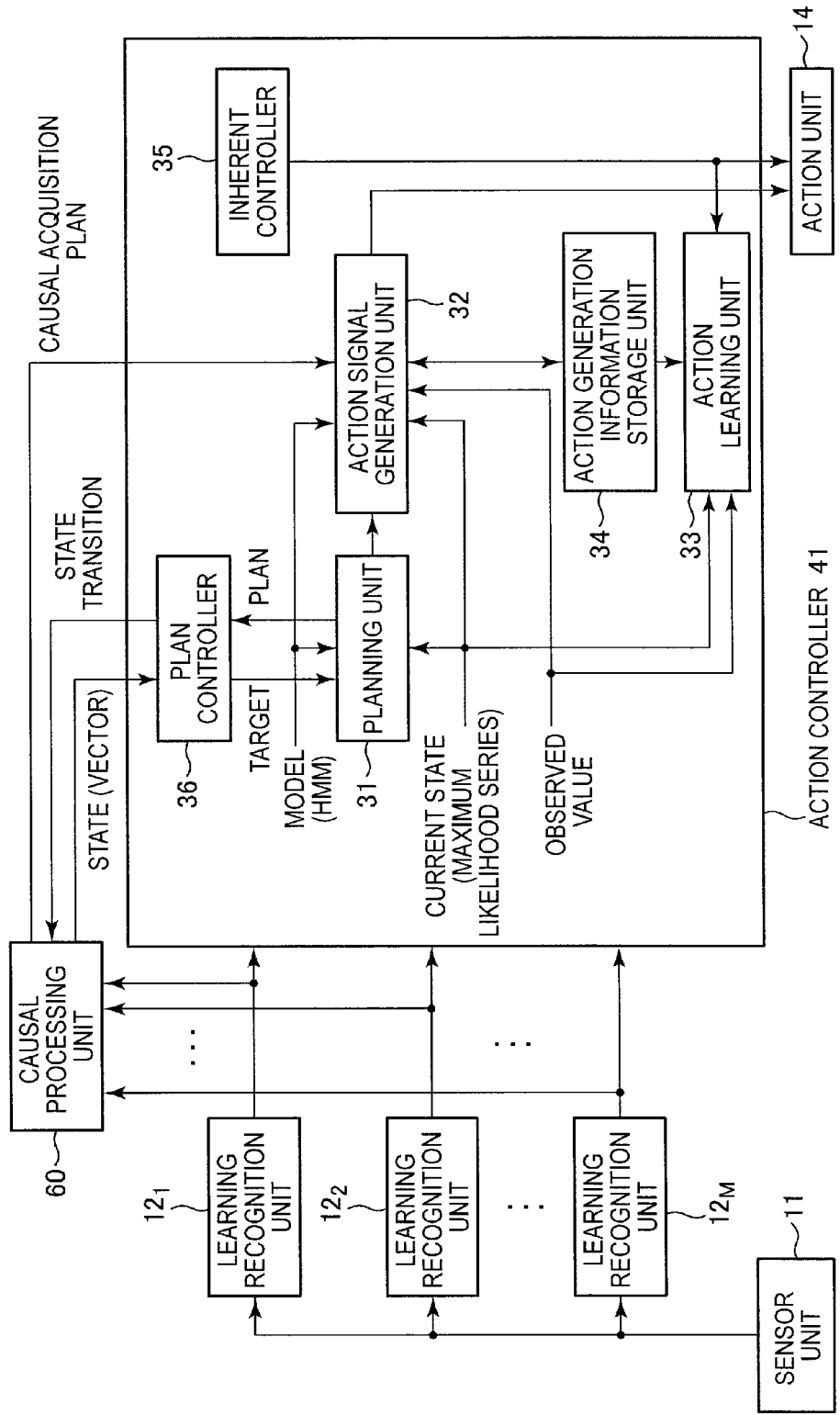
FIG. 7 is a block diagram showing a configuration example of an embodiment of the agent to which the present technology is applied.

If a plurality of state vectors exists in the factor candidate list as the state vector associated with a state transition of the attention HMM, the causal estimation unit 55 reads, among state vectors associated with the state transition of the attention HMM, for example, one state vector with the maximum conditional probability or one state vector randomly selected from states vectors whose conditional probability is equal to a predetermined value or more as an estimation result of states (factors) of the causal HMM in a causal relationship with the state transition of the attention HMM An Embodiment of the Agent to which the Present Technology is Applied FIG. 7 is a block diagram showing a configuration example of an embodiment of the agent to which the present technology is applied.

In FIG. 7, the same reference numerals are attached to the corresponding portions in FIG. 3 and a description thereof is omitted below when appropriate.

In FIG. 7, the agent includes the sensor unit 11, the plurality of M learning recognition units $12_1$ to $12_M$, the action unit 14, the action controller 41, and the causal processing unit 60.

Thus, the agent in FIG. 7 is common to the agent in FIG. 3 in that the sensor unit 11, the plurality of M learning recognition units $12_1$ to $12_M$, the action unit 14, and the action controller 41 are included. However, the agent in FIG. 7 is different from the agent in FIG. 3 in that instead of the causal processing unit 42, the causal processing unit 60 is provided.

Like the causal processing unit 42 in FIG. 3, the causal processing unit 60 performs causal learning and when a state transition of the attention HMM (HMM used to create a plan) is supplied from the plan controller 36, makes a causal estimate that estimates a state vector as states (factors) of a causal HMM having a causal relationship with the state transition of the attention HMM based on causal learning results.

Further, the causal processing unit 60 performs causal acquisition plan creation processing that creates a plan (hereinafter, referred to also as a causal acquisition plan) for the agent to efficiently collect causal learning data used for causal learning and supplies the resultant causal acquisition plan to the action signal generation unit 32 of the action controller 41.

When the causal acquisition plan is supplied from the causal processing unit 60, the action signal generation unit 32 determines an action signal that causes the state transition from the start state to the target state as the causal acquisition plan an supplies the action signal to the action unit 14.

The action unit 14 drives according to the action signal from the action signal generation unit 32 and the agent thereby takes action to efficiently collect causal learning data.

[Configuration Example of the Causal Processing Unit 60]

Figure 8:
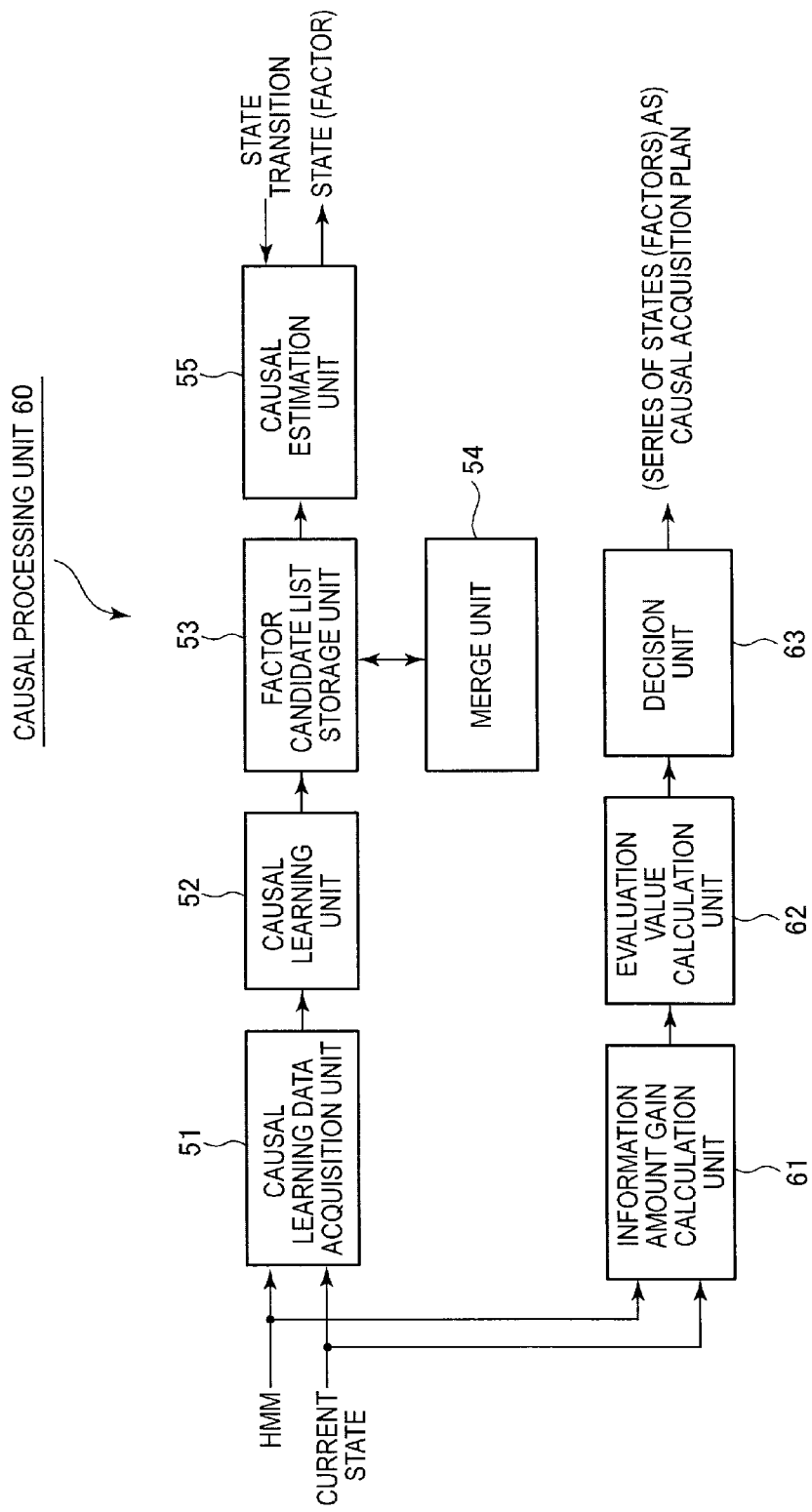
FIG. 8 is a block diagram showing a configuration of a causal processing unit 60.

FIG. 8 is a block diagram showing the configuration of the causal processing unit 60 in FIG. 7.

In FIG. 8, the same reference numerals are attached to the corresponding portions of the causal processing unit 42 in FIG. 4 and a description thereof is omitted below when appropriate.

In FIG. 8, the causal processing unit 60 includes the causal learning data acquisition unit 51 to the causal estimation unit 55, an information amount gain calculation unit 61, an evaluation value calculation unit 62, and a decision unit 63.

Therefore, the causal processing unit 60 is common to the causal processing unit 42 in FIG. 4 in that the causal learning data acquisition unit 51 to the causal estimation unit 55 are included and is different from the causal processing unit 42 in FIG. 4 in that the information amount gain calculation unit 61 to the decision unit 63 are newly provided.

The information amount gain calculation unit 61, the evaluation value calculation unit 62, and the decision unit 63 perform causal acquisition plan creation processing that creates a causal acquisition plan to efficiently collect causal learning data.

That is, the information amount gain calculation unit 61 sets one HMM of HMM#1 to #M as HMM#m' that causes a state transition based on the current states of HMM#1 to #M supplied from the learning recognition units $12_1$ to $12_M$ and assumes that a state vector V(cM(L;m')(d)) as a factor that could cause the state transition $T(m')_{ij}$ in the HMM#m' occurs (a state of at least one HMM other than HMM#m' becomes the current state) and the state transition $T(m')_{ij}$ occurs as a result of the occurrence of the state vector V(cM(L;m')(d)) as a factor to determine an information amount gain as an information amount obtained by causing the state vector V(cM(L;m')(d)) as a factor and observing the result thereof for the causal relationship between the state vector V(cM(L;m')(d)) as a factor and the state transition $T(m')_{ij}$.

After the information amount gain being determined for the state transition $T(m')_{ij}$ of HMM#m', the information amount gain calculation unit 61 supplies the information amount gain to the evaluation value calculation unit 62.

The evaluation value calculation unit 62 determines the evaluation value that evaluates the effectiveness of the occurrence of each state vector V(cM(L;m')(d)) as each factor based on the information amount gain from the information amount gain calculation unit 61 to acquire a causal relationship between (the occurrence of) the state vector V(cM(L;m')(d)) as a factor and the state transition $T(m')_{ij}$ and supplies the evaluation value to the decision unit 63.

The decision unit 63 decides a causal acquisition plan as a series of state vectors V(cM(L;m')(d)) as causing factors based on the evaluation value from the evaluation value calculation unit 62 and supplies the causal acquisition plan to the action signal generation unit 32 (FIG. 7).

Example of the Task Performed by the Agent

Figure 9:
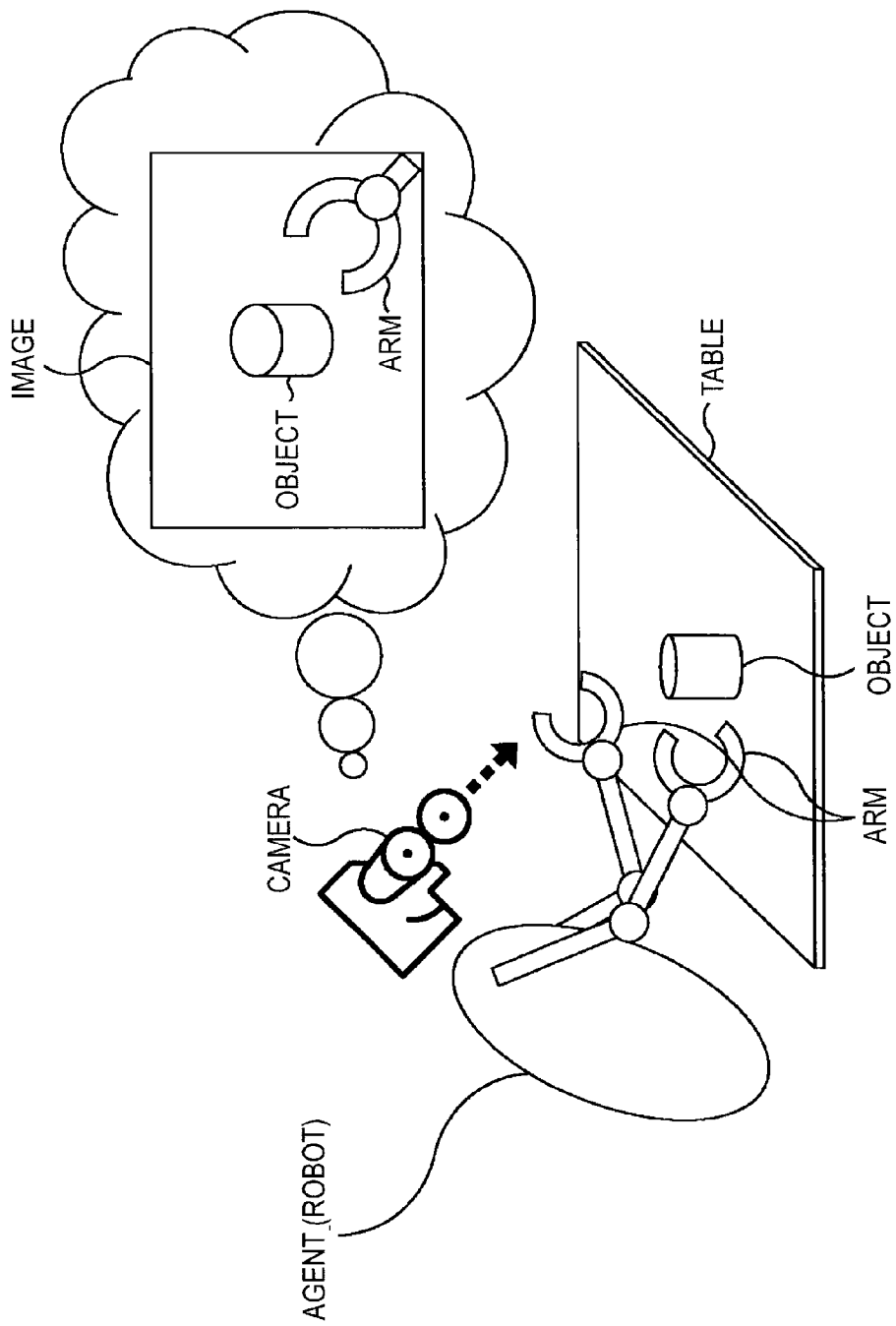
FIG. 9 is a diagram illustrating an object moving task as an example of a task performed by the agent.

FIG. 9 is a diagram illustrating an object moving task as an example of the task performed by the agent in FIG. 7.

The agent as the action unit 14 has an arm and can move the arm as an action.

In FIG. 9, an object is placed on a two-dimensional table and the object moves on the table by being touched by the arm of the agent.

A frame (wall) is installed around the table and if the object moves to an edge of the table and comes into contact with the frame, the object no longer moves to the side on which the object is in contact with the frame and therefore does not fall from the table.

In the object moving task, the agent moves the object placed in a predetermined position to another predetermined position by moving the arm.

To simplify the description below, the processing of the agent in FIG. 7 will be described by taking the object moving task as an example.

Figure 10:
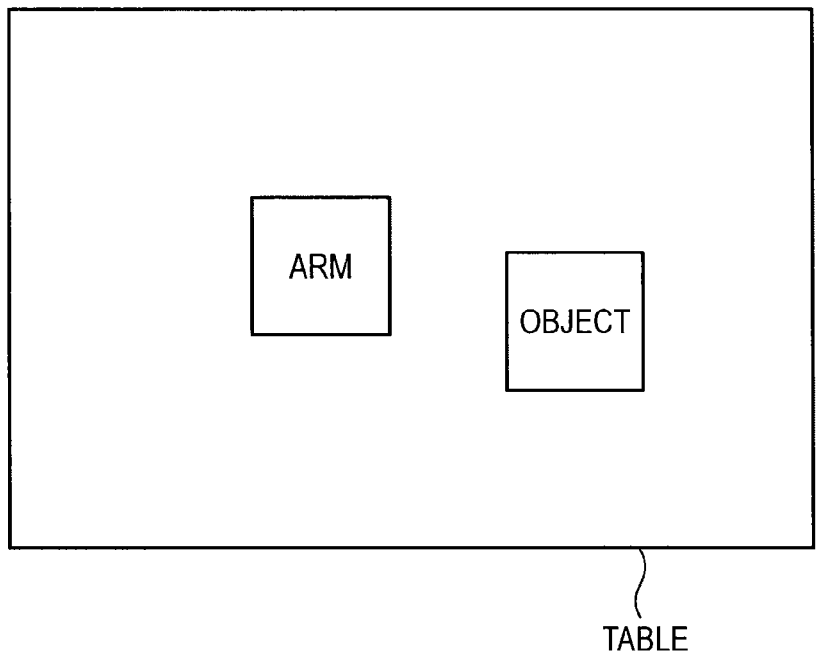
FIG. 10 is a diagram schematically showing an observed value observed by the agent in the object moving task.

FIG. 10 is a diagram schematically showing an observed value observed by the agent in the object moving task.

An image of the arm and object on the table as shown in FIG. 10 is taken by the sensor unit 11 and the image is supplied to the learning recognition units $12_1$ to $12_M$ as an observed value in the agent.

HMMs necessary to perform the object moving task are two HMMs, i.e., an HMM that learns movement of the object (moving object) moved by being touched by the arm and an HMM that learns movement of the agent and thus, M=2 is set and it is assumed that HMM#1 stored in the learning recognition unit $12_1$ learns movement of the object and HMM#2 stored in the learning recognition unit $12_2$ learns movement of the arm.

HMM#1 that learns movement of the object is also called an object HMM and HMM#2 that learns movement of the arm is also called an arm HMM.

To simplify the description, the agent is assumed to be able to observe an arm image as an observed value of the arm and an object image as an observed value of the object separately.

Further, the learning recognition unit $12_1$ performs model learning processing of the object HMM and recognition processing to recognize the current state (maximum likelihood series) of the object HMM by using an observed value of the object and the learning recognition unit $12_2$ performs model learning processing of the arm HMM and recognition processing to recognize the current state (maximum likelihood series) of the arm HMM by using an observed value of the arm.

It is also assumed that the action learning unit 33 (FIG. 7) learns a relationship between an action signal and a state transition of the arm HMM that learns movement of the arm HMM as action according to the action signal as action learning.

In this case, according to the action learning, action generation information associating each state transition $T_{ij}$ of the arm HMM with a function $m=F_{ij}(o)$ as a controller is generated.

Thus, based on such action generation information, the action signal generation unit 32 generates an action signal that causes some state transition of the arm HMM.

It is also assumed that the agent has completed learning (model learning processing) of the arm HMM and the object HMM by using observed values of the arm and object observed when action is taken according to an action signal generated by the inherent controller 35.

Therefore, in the agent, the learning recognition unit $12_1$ storing the object HMM can recognize the current state of the object (object HMM) by using an observed value of the object and the learning recognition unit $12_2$ storing the arm HMM can recognize the current state of the arm (arm HMM) by using an observed value of the arm.

Further, in the agent, the planning unit 31 performs planning to create a plan that sets any state of the arm HMM as a target state and the action signal generation unit 32 generates an action signal according to the plan to move the arm from (the position on the table corresponding to) the current state to (the position on the table corresponding to) the target state.

In the agent, however, the causal learning unit 52 (FIG. 8) has not yet performed causal learning. Thus, the agent does not know which state of the arm HMM and which state of the object HMM correspond to the same on the table, that is, which state as the current state of the arm HMM brings the arm into contact with the object to move the object.

The object on the table moves after being touched by the arm. That is, movement of the object is caused by movement of the arm to the position of the object.

Therefore, to move the object placed in a predetermined position on the table to another predetermined position, information about the arm in which position causes movement of the object, that is, causal learning that acquires a causal relationship between a state transition of the object HMM and the occurrence of a state of the arm HMM as a factor that could cause the state transition (the state that becomes the current state of the arm HMM when the state transition of the object HMM occurs) is necessary.

The causal learning unit 52 (FIG. 8) performs causal learning by using causal learning data collected by the causal learning data acquisition unit 51 and thus, it is necessary to collect causal learning data by the causal learning data acquisition unit 51 to perform causal learning.

For the collection of causal learning data by the causal learning data acquisition unit 51, the current states of the arm HMM and the object HMM are necessary and therefore, it is necessary for the agent to repeatedly move the arm and observe observed values of the arm and object to recognize the current states of the arm HMM and the object HMM.

To acquire a causal relationship between a state transition of the object HMM and a state of the arm HMM that could cause the state transition, among states of the arm HMM and the object HMM, states of the arm HMM and the object HMM when the arm moved by the agent touches the object (when the object contact is successful) are expected to be particularly necessary as the current states.

That is, if the agent continues to move the arm in a position where the arm does not touches the object and the arm and object of only a case when the object does not move at all are observed, it is difficult to collect causal learning data (hereinafter, referred to also as effective causal learning data) allowing to acquire a causal relationship between the state transition of the object HMM and the state of the arm HMM.

However, before causal learning, the agent does not know which state as the current state of the arm HMM brings the arm into contact with the object to move the object and thus, it is difficult to move the arm so as to touch the object.

Methods of moving the arm for the agent to collect causal learning data before causal learning after learning (model learning processing) of the arm HMM and the object HMM is completed include, for example, a method of randomly moving the arm and a method of presetting how to move the arm, that is, a method of moving the arm by giving innate rules as knowledge for innate movement to the agent to following the innate rules.

However, according to the method of randomly moving the arm, for example, if an attempt is made to move a window in any position to a predetermined position while the mouse pointer is set to be invisible, the window hardly moves even if the mouse is clicked and moved randomly and just in the same manner, the arm hardly touches the object (the object contact fails) and a very long time is necessary to collect effective causal learning data.

The method of moving the arm following innate rules is expected to be more successful in contact with the object than the method of randomly moving the arm, but still a pretty long time is necessary to collect effective causal learning data.

Thus, in the agent in FIG. 7, the causal processing unit 60 performs causal acquisition plan creation processing that creates a causal acquisition plan to efficiently collect causal learning data. Then, the agent takes action (moves the arm) according to the causal acquisition plan to efficiently collect effective causal learning data.

In addition to the causal acquisition plan creation processing, like the causal processing unit 42 in FIG. 4, the causal processing unit 60 (FIG. 8) also performs the causal learning data acquisition processing, causal learning processing, merge processing, and causal estimation processing (FIG. 5).

[Causal Acquisition Plan Creation Processing]

Figure 11:
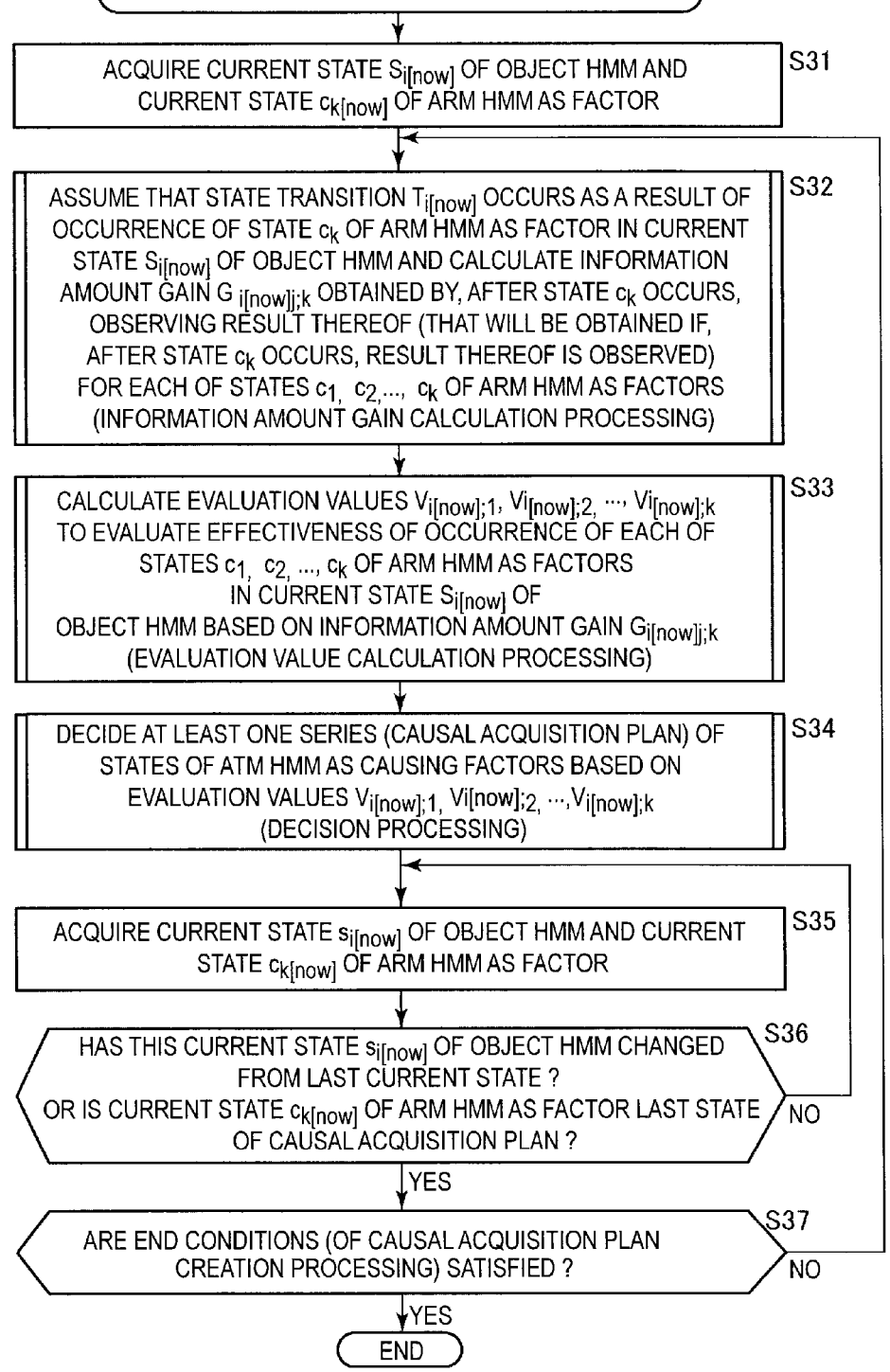
FIG. 11 is a flow chart illustrating causal acquisition plan creation processing performed by the causal processing unit 60.

FIG. 11 is a flow chart illustrating causal acquisition plan creation processing performed by the causal processing unit 60 in FIG. 8.

In step S31, the current state $s_{i[now]}$ of the object HMM is supplied from the learning recognition unit $12_1$ and the information amount gain calculation unit 61 (FIG. 8) waits until the current state $c_{k[now]}$ of the arm HMM as a current factor that is a factor currently occurring is supplied from the learning recognition unit $12_2$ to acquire the current state $s_{i[now]}$ of the object HMM and the current state $c_{k[now]}$ of the arm HMM before proceeding to step S32.

In step S32, the information amount gain calculation unit 61 performs information amount gain calculation processing before proceeding to step S33.

That is, in the information amount gain calculation processing, the information amount gain calculation unit 61 assumes that the state transition $T_{i[now]j}$ from the current state $s_{i[now]}$ of the object HMM to another state $s_j$ occurs as a result of the occurrence of the state $c_k$ (the current state $c_{k[now]}$ is the state $c_k$) of the arm HMM as a factor $c_k$ in the current state $s_{i[now]}$ of the object HMM and calculates the information amount gain $G_{i[now]j;k}$ obtained by observing, after the state $c_k$ occurs, the result thereof, that is, the information amount gain $G_{i[now]j;k}$ that will be obtained if, after the state $c_k$ occurs, the result thereof is observed for each of the states $c_1, c_2, \ldots, c_K$ of the arm HMM as each factor $c_k$.

Then, the information amount gain calculation unit 61 supplies the information amount gain $G_{i[now]j;k}$ to the evaluation value calculation unit 62 (FIG. 8).

Regarding the state transition $T(m')_{ij}$ of HMM#m' of M HMMs described above, the state of HMM as an element of the state vector V(cM(L;m')(d)), that is, the state of each HMM of the combination of L HMMs selected from (M−1) HMMs excluding HMM#m' from M HMMs is the factor $c_k$ causing the state transition T(m')$_{ij}$ and therefore, the number K of factors $c_1, c_2, \ldots, c_K$ is the number of multiplication of the number of patterns of L (L=1, 2, ..., M−1), the number of combination patterns of L HMMs that can be selected from (M−1) HMMs, and the number of patterns of the current state of each HMM of the combination of L HMMs selected from (M−1) HMMs.

To simplify the description, the factor $c_k$ is set as a state of the arm HMM as one HMM (1-dimensional state vector) and thus, the number (total number) K of the factors $c_k$ is equal to the number of states of the arm HMM.

In step S33, the evaluation value calculation unit 62 (FIG. 8) performs evaluation value calculation processing before proceeding to step S34.

That is, in the evaluation value calculation processing, the evaluation value calculation unit 62 calculates evaluation values $V_{i[now];1}, V_{i[now];2}, \ldots, V_{i[now];K}$ that evaluate the effectiveness of the occurrence of each of the states $c_1, c_2, \ldots, c_K$ of the arm HMM as a factor in the current state $s_{i[now]}$ of the object HMM based on the information amount gain $G_{i[now];j;k}$ from the information amount gain calculation unit 61 to acquire a causal relationship between a state transition of the object HMM and a state of the arm HMM.

Then, the evaluation value calculation unit 62 supplies the evaluation values $V_{i[now];1}, V_{i[now];2}, \ldots, V_{i[now];K}$ to the decision unit 63 (FIG. 8).

In step S34, the decision unit 63 performs decision processing before proceeding to step S35.

That is, in the decision processing, the decision unit 63 decides a series in which at least one state of the arm HMM as an occurring factor is arranged as a causal acquisition plan based on the evaluation values $V_{i[now];1}, V_{i[now];2}, \ldots, V_{i[now];K}$ from the evaluation value calculation unit 62 and supplies the causal acquisition plan to the action signal generation unit 32 (FIG. 7).

The action signal generation unit 32 follows the (latest) causal acquisition plan from the decision unit 63 and generates an action signal causing the state transition from the current state $c_{k[now]}$ of the arm HMM to the next state of the series of states as the causal acquisition plan and supplies the action signal to the action unit 14.

The action unit 14 moves the arm according to the action signal from the action signal generation unit 32. At this point, if the arm touches the object, the object is also moved by being touched.

After the arm moves, as described above, observed values of the arm and object are observed by the sensor unit 11 and the learning recognition unit 12$_1$ recognizes the current state $s_{i[now]}$ of the object HMM by using the observed value of the object and also the learning recognition unit 12$_2$ recognizes the current state $c_{k[now]}$ of the arm HMM by using the observed value of the arm.

Then, the current state $s_{i[now]}$ of the object HMM is supplied from the learning recognition unit 12$_1$ and the information amount gain calculation unit 61 waits until the current state $c_{k[now]}$ of the arm HMM is supplied from the learning recognition unit 12$_2$ to acquire, in step S35, the current state $s_{i[now]}$ of the object HMM and the current state $c_{k[now]}$ of the arm HMM from the learning recognition units 12$_1$ and 12$_2$ respectively before proceeding to step S36.

In step S36, the information amount gain calculation unit 61 determines whether this current state $s_{i[now]}$ of the object HMM has changed from the last current state (one unit time before) and the current state $c_{k[now]}$ of the arm HMM as a factor is the last state of the latest causal acquisition plan obtained by the decision unit 63.

If, in step S36, this current state $s_{i[now]}$ of the object HMM is determined not to have changed from the last current state and the current state $c_{k[now]}$ of the arm HMM as a factor is determined not to be the last state of the latest causal acquisition plan, the action signal generation unit 32 follows the latest causal acquisition plan and generates an action signal causing the state transition from the current state $c_{k[now]}$ of the arm HMM to the next state of the series of states as the causal acquisition plan and waits until the current state $s_{i[now]}$ of the object HMM and the current state $c_{k[now]}$ of the arm HMM recognized by using observed values of the arm and the object after the arm moves according to the action signal are supplied from the learning recognition units 12$_1$ and 12$_2$ to the information amount gain calculation unit 61 respectively before returning to step S35.

In step S35, as described above, the information amount gain calculation unit 61 acquires the current state $s_{i[now]}$ of the object HMM and the current state $c_{k[now]}$ of the arm HMM from the learning recognition units 12$_1$ and 12$_2$ respectively and similar processing will subsequently be repeated.

On the other hand, in step S36, if this current state $s_{i[now]}$ of the object HMM is determined to have changed from the last current state or this current state $c_{k[now]}$ of the arm HMM is determined to be the last state of the latest causal acquisition plan, that is, if the arm touches the object in the movement of the arm immediately before and the object moves or the arm moves according to the causal acquisition plan and reaches the position corresponding to the last state of the causal acquisition plan, the processing proceeds to step S37 and the information amount gain calculation unit 61 determines whether end conditions for the causal acquisition plan creation processing are satisfied.

If, in step S37, end conditions for the causal acquisition plan creation processing are determined not to be satisfied, the processing returns to step S32 to subsequently repeat the processing in steps S32 to S37.

If, in step S37, end conditions for the causal acquisition plan creation processing are determined to be satisfied, the causal acquisition plan creation processing terminates.

As end conditions for the causal acquisition plan creation processing, for example, that the loop processing in steps S32 to S37 has been performed a predetermined number of times or the number of actions (number of times of moving the arm) after starting the causal acquisition plan creation processing has reached a predetermined number can be adopted.

Also, as end conditions for the causal acquisition plan creation processing, for example, that the maximum value of the evaluation values $V_{i[now];1}, V_{i[now];2}, \ldots, V_{i[now];K}$ determined in the evaluation value calculation processing in step S33 is equal to a preset threshold or less can be adopted.

A case when the maximum value of the evaluation values $V_{i[now];1}, V_{i[now];2}, \ldots, V_{i[now];K}$ is equal to a preset threshold or less is a case when there is no effective state of the arm HMM to acquire a causal relationship between a state transition of the object HMM and a state of the arm HMM, that is, when an effective state of the arm HMM to acquire a causal relationship between a state transition of the object HMM and a state of the arm HMM does not exist from the start (the state of the arm HMM does not affect the state transition of the object HMM) or an effective state of the arm HMM to acquire a causal relationship between a state transition of the object HMM and the arm HMM has become the current state many times so that the collection of sufficient causal learning data to acquire a causal relationship between a state transition of the object HMM and the arm HMM is completed.

[Information Amount Gain Calculation Processing]

Figure 12:
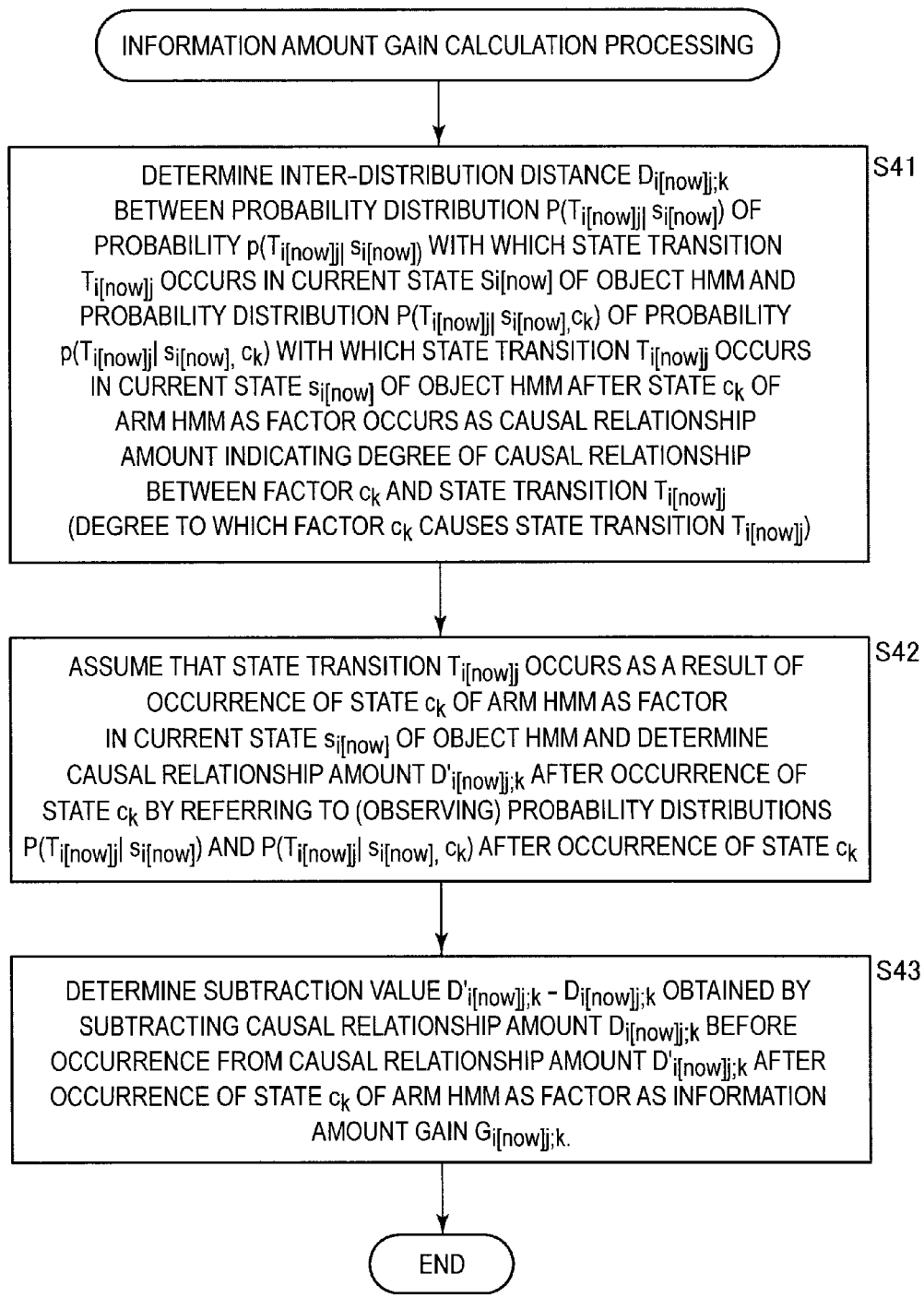
FIG. 12 is a flow chart illustrating information amount gain calculation processing in step S32.

FIG. 12 is a flow chart illustrating information amount gain calculation processing in step S32 in FIG. 11.

The probability of the state transition $T_{ij}$ of the object HMM occurring (the object moving from a position corresponding to the state $s_i$ to a position corresponding to the state $s_j$) in the state $s_i$ of the object HMM (when the object is in a position corresponding to the state $s_i$) is called a base probability and denoted as $p(T_{ij}|s_i)$. Further, the probability distribution of the base probability $p(T_{ij}|s_i)$ is denoted as $P(T_{ij}|s_i)$.

The probability of the state transition $T_{ij}$ of the object HMM occurring as a result of the occurrence of the state $c_k$ of the arm HMM (the current state of the arm HMM is the state $c_k$) as a factor in the state $s_i$ of the object HMM is also called a factor conditional probability and denoted as $p(T_{ij}|s_i,c_k)$. Further, the probability distribution of the factor conditional probability $p(T_{ij}|s_i,c_k)$ is denoted as $P(T_{ij}|s_i,c_k)$.

In the information amount gain calculation processing, in step S41, the information amount gain calculation unit 61 determines an inter-distribution distance $D_{i[now]j;k}$ as a distance between the probability distribution $P(T_{i[now]j}|s_{i[now]})$ of the base probability $p(T_{i[now]j}|s_{i\ [now]})$ with which the state transition $T_{i[now]j}$ occurs in the current state $s_{i[now]}$ of the object HMM and the probability distribution $P(T_{i[now]j}|s_{i[now]}, c_k)$ of the factor conditional probability $p(T_{i[now]j}|s_{i[now]}, c_k)$ with which the state transition $T_{i[now]j}$ occurs in the current state $s_{i[now]}$ of the object HMM after the state $c_k$ of the arm HMM occurs as a factor as a causal relationship amount indicating the degree of the causal relationship between the state transition $T_{i[now]j}$ of the object HMM and the state $c_k$ of the arm HMM before proceeding to step S42.

If the number of times of being in the state $s_i$ is denoted as $B_S$ and the number of times of the state transition $T_{ij}$ occurring from the state $s_i$ to another state $s_j$ is denoted as $B_T$ in the object HMM, the expected value $p\sim(T_{ij}|s_i)$ of the base probability $p(T_{ij}|s_i)$ can be represented as $B_T/B_S$.

If the number of times of the occurrence of the state $c_k$ of the arm HMM as a factor in the state $s_i$ of the object HMM whose number of times of being there is $B_S$ is denoted as $N_S$ and the number of times of the state transition $T_{ij}$ occurring from the $s_i$ to another state $s_j$ in the object HMM after the state $c_k$ of the arm HMM occurs is denoted as $N_T$, the expected value $p\sim(T_{ij}|s_i,c_k)$ of the factor conditional probability $p(T_{ij}|s_i,c_k)$ is represented as $N_T/N_S$.

The numbers of times $B_S$, $B_T$, $N_S$, and $N_T$ are counted by the information amount gain calculation unit 61 based on the current state of the object HMM and the current state of the arm HMM supplied from the learning recognition units $12_1$, $12_2$.

With an increasing causal relationship between the state $c_k$ of the arm HMM and the state transition $T_{ij}$ of the object HMM, that is, the more the current state of the arm HMM being the state $c_k$ affects the occurrence of the state transition $T_{ij}$ of the object HMM, the larger the expected value (average value) $p\sim(T_{ij}|s_i,c_k)=N_T/N_S$ of the factor conditional probability becomes compared with the expected value $p\sim(T_{ij}|s_i)=B_T/B_S$ of the base probability and thus, the difference between the probability distribution $P(T_{ij}|s_i)$ of the base probability and the probability distribution $P(T_{ij}|s_i, c_k)$ of the factor conditional probability represents the causal relationship amount, which indicates the degree of the causal relationship between the state $c_k$ of the arm HMM and the state transition $T_{ij}$ of the object HMM.

Thus, the information amount gain calculation processing adopts the inter-distribution distance $D_{ij;k}$ between the probability distributions $P(T_{ij}|s_i)$ and $P(T_{ij}|s_i, c_k)$ as the difference between the probability distributions $P(T_{ij}|s_i)$ and $P(T_{ij}|s_i, c_k)$ as the causal relationship amount of the state $c_k$ of the arm HMM as a factor with respect to the state transition $T_{ij}$ of the object HMM and determines the inter-distribution distance $D_{ij;k}$ as the causal relationship amount of the state $c_k$ of the arm HMM with respect to the state transition $T_{ij}$ of the object HMM.

In the information amount gain calculation processing, if the state transition $T_{ij}$ of the object HMM occurs as a result of the occurrence of the state $c_k$ of the arm HMM, that is, if the expected value $p\sim(T_{ij}|s_i,c_k)=N_T/N_S$ of the factor conditional probability is larger than the expected value $p\sim(T_{ij}|s_i)=B_T/B_S$ of the base probability ($N_T/N_S > B_T/B_S$), only the state $c_k$ of the arm HMM and the state transition $T_{ij}$ of the object HMM are selected for processing (of the causal relationship amount and subsequently, the information amount gain).

A causal relationship in which the state transition $T_{ij}$ of the object HMM is inhibited as a result of the occurrence of the state $c_k$ of the arm HMM can be handled in the same manner as a causal relationship in which the state transition $T_{ij}$ of the object HMM occurs as a result of the occurrence of the state $c_k$ of the arm HMM by considering that non-occurrence of the state transition $T_{ij}$ of the object HMM is caused by the occurrence of the state $c_k$ of the arm HMM.

It is assumed that the base probability $p(T_{ij}|s_i)$ and the factor conditional probability $p(T_{ij}|s_i, c_k)$ follows the beta distribution.

In such a case, the base probability $p(T_{ij}|s_i)$ whose expected value $p\sim(T_{ij}|s_i)$ is represented by $B_T/B_S$ follows the beta distribution of the beta function $B(B_T+1, B_S-B_T+1)$ and the factor conditional probability $p(T_{ij}|s_i, c_k)$ whose expected value $p\sim(T_{ij}|s_i, c_k)$ is represented by $N_T/N_S$ follows the beta distribution of the beta function $B(N_T+1, N_S-N_T+1)$.

As the inter-distribution distance $D_{ij;k}$ between the probability distributions $P(T_{ij}|s_i)$ and $P(T_{ij}|s_i, c_k)$, any distance of probability distributions can be adopted and here, for example, the KL (Kullback-Leibler) divergence is adopted The KL divergence of the probability distributions $P(T_{ij}|s_i)$ and $P(T_{ij}|s_i, c_k)$ is denoted as $D_{KL}(P(T_{ij}|s_i)\|P(T_{ij}|s_i,c_k))$.

In step S42, the information amount gain calculation unit 61 assumes that the state transition $T_{i[now]j}$ of the object HMM occurs as a result of the occurrence of the state $c_k$ of the arm HMM as a factor in the current state $s_{i[now]}$ of the object HMM and determines the inter-distribution distance $D'_{i[now]j;k}$ as the causal relationship amount after the occurrence of the state $c_k$ of the arm HMM by referring to the probability distribution $P(T_{i[now]j}|s_{i[now]})$ of the base probability and the probability distribution $P(T_{i[now]j}|s_{i[now]}, c_k)$ of the factor conditional probability after the occurrence of the state $c_k$ of the arm HMM before proceeding to step S43.

In step S42, it is only assumed that the state transition $T_{i[now]j}$ of the object HMM occurs as a result of the occurrence of the state $c_k$ of the arm HMM as a factor and thus, the state $c_k$ of the arm HMM is not actually caused, that is, the arm is not moved in such a way that the current state of the arm HMM becomes the state $c_k$.

That is, under the assumption that the state $c_k$ of the arm HMM occurs and the state transition $T_{i[now]j}$ of the object HMM occurs, the information amount gain calculation unit 61 increments by 1 the number of times of being in the state $s_{i[now]}$ in the object HMM to update to $B_S+1$ times and also increments by 1 the number of times of the occurrence of the state transition $T_{i[now]j}$ to update to $B_T+1$ times.

Further, the information amount gain calculation unit 61 increments by 1 the number of times of the occurrence of the state $c_k$ of the arm HMM in the state $s_{i\ [now]}$ of the object HMM to update to $N_S+1$ and also increments by 1 the number of times of the occurrence of the state transition $T_{i[now]j}$ in the object HMM when the state $c_k$ of the arm HMM occurs to update to $N_T+1$.

Then, the information amount gain calculation unit 61 updates the probability distribution $P(T_{i[now]j}|S_{i[now]})$ of the base probability to the beta distribution of the beta function $B(B_T+2, B_S-B_T+1)$ by using the numbers of times $B_S+1$ and $B_T+1$ after the update. Further, the information amount gain calculation unit 61 updates the probability distribution $P(T_{i[now]j}|S_{i[now]}, c_k)$ of the factor conditional probability to the beta distribution of the beta function $B(N_T+2, N_S-N_T+1)$ by using the numbers of times $N_S+1$ and $N_T+1$ after the update.

Then, the information amount gain calculation unit 61 determines the KL divergence $D_{KL}(P'(T_{ii[now]j}|S_{ii[now]})||P'(T_{ii[now]j}|S_{ii[now]}, c_k))$ of the probability distribution $P'(T_{i[now]j}|S_{i[now]})$ of the base probability and the probability distribution $P'(T_{i[now]j}|S_{i[now]}, c_k)$ of the factor conditional probability represented by the beta distribution after the update as the causal relationship amount $D'_{i[now]j;k}$ after the occurrence of the state $c_k$ of the arm HMM.

The numbers of times $B_S$, $B_T$, $N_S$, and $N_T$ are updated in step S42 only to determine the causal relationship amount $D'_{i[now]j;k}$.

In step S43, the information amount gain calculation unit 61 determines a subtraction value $D'_{i[now]j;k}-D_{i[now]j;k}$ by subtracting the causal relationship amount $D_{i[now]j;k}$ before the occurrence from the causal relationship amount $D'_{i[now]j;k}$ after the (temporary) occurrence of the state $c_k$ of the arm HMM as a factor as an information amount gain $G_{i[now]j;k}$ of the state $c_k$ of the arm HMM as a factor and supplies the subtraction value to the evaluation value calculation unit 62 before the processing returns.

If the state $c_k$ of the arm HMM as a factor occurs and further the state transition $T_{ij}$ of the object HMM occurs, the amount of information (information amount gain of the state $c_k$ of the arm HMM) $G_{ij;k}$ obtained by the occurrence of the state $c_k$ of the arm HMM corresponds to an increase of the causal relationship amount between the state $c_k$ of the arm HMM and the state transition $T_{ij}$ of the object HMM before and after the occurrence of the state $c_k$ of the arm HMM.

That is, if the state $c_k$ of the arm HMM occurs and further the state transition $T_{ij}$ of the object HMM occurs, the amount of information (information amount gain of the state $c_k$ of the arm HMM) $G_{ij;k}$ obtained by the occurrence of the state $c_k$ of the arm HMM increases with the state $c_k$ of the arm HMM that makes a causal relationship with the state transition $T_{ij}$ of the object HMM clearer.

Because, as described above, the amount of information (information amount gain) $G_{ij;k}$ obtained by the occurrence of the state $c_k$ of the arm HMM as a factor corresponds to an increase of the causal relationship amount between the state $c_k$ of the arm HMM and the state transition $T_{ij}$ of the object HMM before and after the occurrence of the state $c_k$ of the arm HMM, the amount of information $G_{ij;k}$ can be represented by how much the causal relationship amount (inter-distribution distance) $D'_{ij;k}$ after the occurrence of the state $c_k$ of the arm HMM has increased from the causal relationship amount distance $D_{ij;k}$ before the occurrence of the state $c_k$ of the arm HMM.

That is, if the state $c_k$ of the arm HMM occurs and further the state transition $T_{ij}$ of the object HMM occurs, the amount of information (information amount gain of the state $c_k$ of the arm HMM) $G_{ij;k}$ obtained by the occurrence of the state $c_k$ of the arm HMM can be represented by the subtraction value $D'_{ij;k}-D_{ij;k}$ obtained by subtracting the causal relationship amount $D_{ij;k}$ before the occurrence of the state $c_k$ of the arm HMM from the causal relationship amount $D'_{ij;k}$ after the occurrence of the state $c_k$ of the arm HMM.

Thus, in the information amount gain calculation processing, the subtraction value $D'_{ij;k}-D_{ij;k}$ obtained by subtracting the causal relationship amount $D_{ij;k}$ before the occurrence of the state $c_k$ of the arm HMM from the causal relationship amount $D'_{ij;k}$ after the occurrence of the state $c_k$ of the arm HMM is determined as the information amount gain $G_{ij;k}$ of the state $c_k$ of the arm HMM.

The processing in steps S41 to S43 is performed for all pairs (i, k) of all j=1, 2, ..., N (N is the number of states of the object HMM) and all k=1, 2, ..., K (K is the total number of factors and here, the number of states of the arm HMM) and the information amount gain $G_{i[now]j;k}$ is determined for each combination of the state $s_j$ of the object HMM (excluding the current state $s_{i[now]}$) and the state $c_k$ of the arm HMM in the current state $S_{i[now]}$ of the object HMM.

Figure 13:
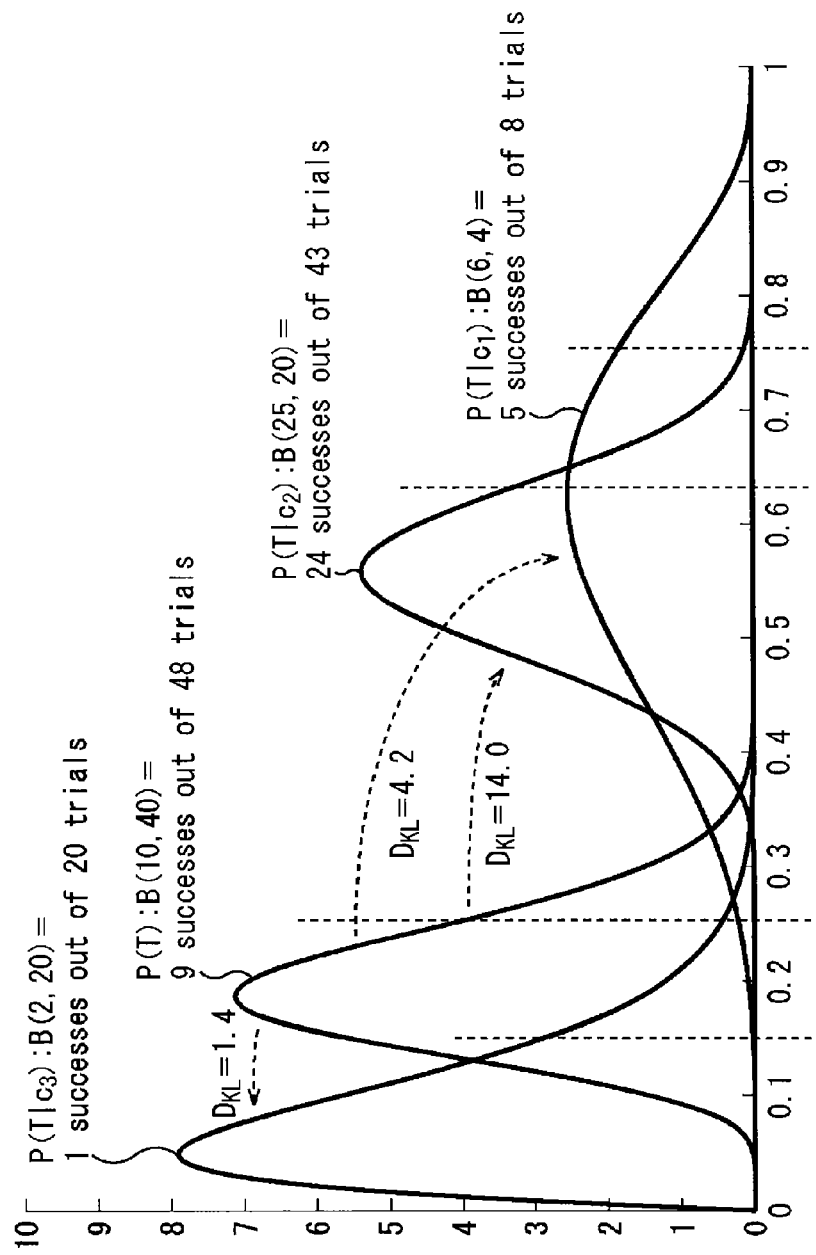
FIG. 13 is a diagram showing a probability distribution represented as a beta distribution.

FIG. 13 is a diagram showing the probability distribution represented as the beta distribution.

In FIG. 13, the probability distribution $P(T|c_1)$ is a probability distribution when only five trials of eight trials are successful and is the beta distribution of the beta function $B(5+1,8-5+1)=B(6,4)$.

The probability distribution $P(T|c_2)$ is a probability distribution when only 24 trials of 43 trials are successful and is the beta distribution of the beta function $B(24+1,43-24+1)=B(25,20)$.

The probability distribution $P(T|c_3)$ is a probability distribution when only one trial of 20 trials is successful and is the beta distribution of the beta function $B(1+1,20-1+1)=B(2,20)$.

The probability distribution $P(T)$ is a probability distribution when only nine trials of 48 trials are successful and is the beta distribution of the beta function $B(9+1,48-9+1)=B(10,40)$.

In FIG. 13, the KL divergences $D_{KL}$ of the probability distribution $P(T)$ and the probability distributions $P(T|c_1)$, $P(T|c_2)$, and $P(T|c_3)$ are 14.0, 4.2, and 1.4 respectively.

Further, in FIG. 13, among the probability distributions $P(T|c_1)$, $P(T|c_2)$, and $P(T|c_3)$, the expected value of (the probability according to) the probability distribution $P(T|c_3)$ is smaller than the expected value of (the probability according to) the probability distribution $P(T)$ and the expected value of the probability distributions $P(T|c_1)$ or $P(T|c_2)$ is larger than the expected value of the probability distribution $P(T)$.

It is now assumed that the probability distribution $P(T)$ is the probability distribution $P(T_{i[now]j}|S_{i[now]})$ of the base probability and the probability distributions $P(T|c_1)$, $P(T|c_2)$, and $P(T|c_3)$ are factor conditional probability distributions $P(T_{i[now]j}|S_{i[now]}, c_1)$, $P(T_{i[now]j}|S_{i[now]}, c_2)$, and $P(T_{i[now]j}|S_{i[now]}, c_2)$ when factors $c_1$, $c_2$, and $c_3$ occur respectively.

In this case, as shown in FIG. 12, the information amount gain calculation unit 61 selects only factor conditional probabilities whose expected value is larger than the expected value of the base probability to determine the causal relationship amount and subsequently the information amount gain.

In FIG. 13, among the probability distributions $P(T|c_1)$, $P(T|c_2)$, and $P(T|c_3)$ of the factor conditional probabilities, the expected value of (the factor conditional probability according to) the probability distribution $P(T|c_3)$ is smaller than the expected value of (the base probability according to) the probability distribution $P(T)$ of the base probability and the expected value of the probability distribution $P(T|c_1)$ or $P(T|c_2)$ is larger than the expected value of the probability distribution $P(T)$ of the base probability.

Therefore, the information amount gain calculation unit 61 determines the information amount gain for the factors $c_1$, $c_2$, but does not determine the information amount gain for the factor $c_3$ (for example, 0 is set).

[Evaluation Value Calculation Processing]

Figure 14:
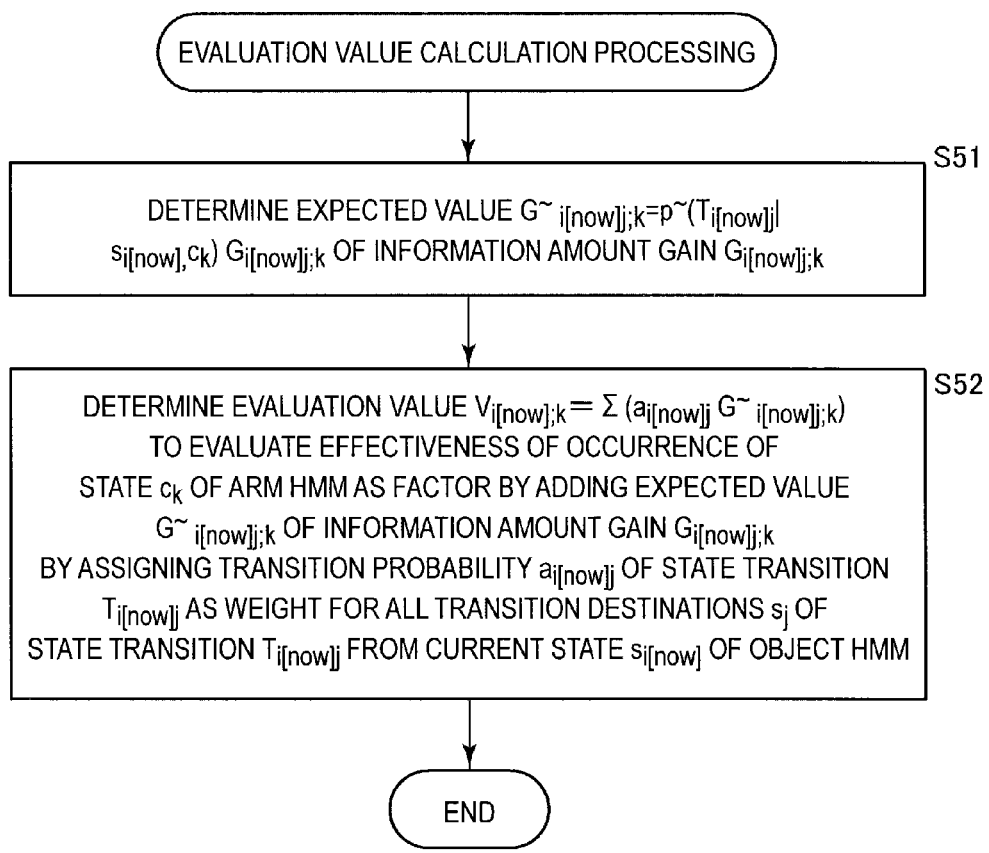
FIG. 14 is a flow chart illustrating evaluation value calculation processing in step S33.

FIG. 14 is a flow chart illustrating evaluation value calculation processing in step S33 in FIG. 11.

In the evaluation value calculation processing, in step S51, the evaluation value calculation unit 62 determines an expected value $G\sim_{i[now]j;k}$ of the information amount gain $G_{i[now]j;k}$ from the information amount gain calculation unit 61 before proceeding to step S52.

The expected value $G\sim_{i[now]j;k}$ of the information amount gain $G_{i[now]j;k}$ can be determined according to the formula $G\sim_{i[now]j;k} = p\sim(T_{i[now]j}|s_{i[now]}, c_k) \times G_{i[now]j;k}$ by using the expected value $p\sim(T_{i[now]j}|s_{i[now]}, c_k) = N_T/N_S$ of the factor conditional probability $p(T_{i[now]j}|s_{i[now]}, c_k)$ with which the state transition $T_{i[now]j}$ occurs in the current state $s_{i[now]}$ of the object HMM when the state $c_k$ of the arm HMM as a factor occurs.

In step S52, the evaluation value calculation unit 62 adds the expected values $G\sim_{i[now]j;k}$ of the information amount gains $G_{i[now]j;k}$ for all states $s_j$ as transition destinations of the state transition $T_{i[now]j}$ from the current state $s_{i[now]}$ of the object HMM by assigning the transition probability $a_{i[now]j}$ of the state transition $T_{i[now]j}$ of the object HMM as a weight and determines the resultant weighted addition value $\Sigma(a_{i[now]j} \times G\sim_{i[now]j;k})$ as an evaluation value $V_{i[now];k}$ to evaluate the effectiveness of the occurrence of the state $c_k$ of the arm HMM as a factor when a causal relationship between (the occurrence of) the state $c_k$ of the arm HMM as a factor and the state transition $T_{i[now]j}$ of the object HMM to supply the evaluation value $V_{i[now];k}$ to the decision unit 63.

The evaluation value $V_{i[now];k}$ is determined according to the formula $V_{i[now];k} = \Sigma(a_{i[now]j} \times G\sim_{i[now]j;k})$. $\Sigma$ of the formula $V_{i[now];k} = (a_{i[now]j} \times G\sim_{i[now]j;k})$ indicates the summation by changing the variable j as integers in the range of 1 to N as the number of states of the object HMM.

The processing in steps S51 and S52 is performed for all $k=1, 2, \ldots, K$ (K is the total number of factors and here, the number of states of the arm HMM) and the evaluation value $V_{i[now];k}$ for each state $c_k$ of the arm HMM is determined in the current state $s_{i[now]}$ of the object HMM as a value indicating the effectiveness of the occurrence of the state $c_k$ of the arm HMM.

In addition to determining the evaluation value $V_{i[now];k}$ according to the formula $V_{i[now];k} = \Sigma(a_{i[now]j} \times G\sim_{i[now]j;k})$, for example, if magnitude $w_{ij}$ is allocated to the state transition $T_{ij}$ of the object HMM by some method, the evaluation value $V_{i[now];k}$ can be determined according to the formula $V_{i[now];k} = \Sigma(w_{i[now]j} a_{i[now]j} \times G\sim_{i[now]j;k})$ using the magnitude $w_{ij}$.

[Decision Processing]

Figure 15:
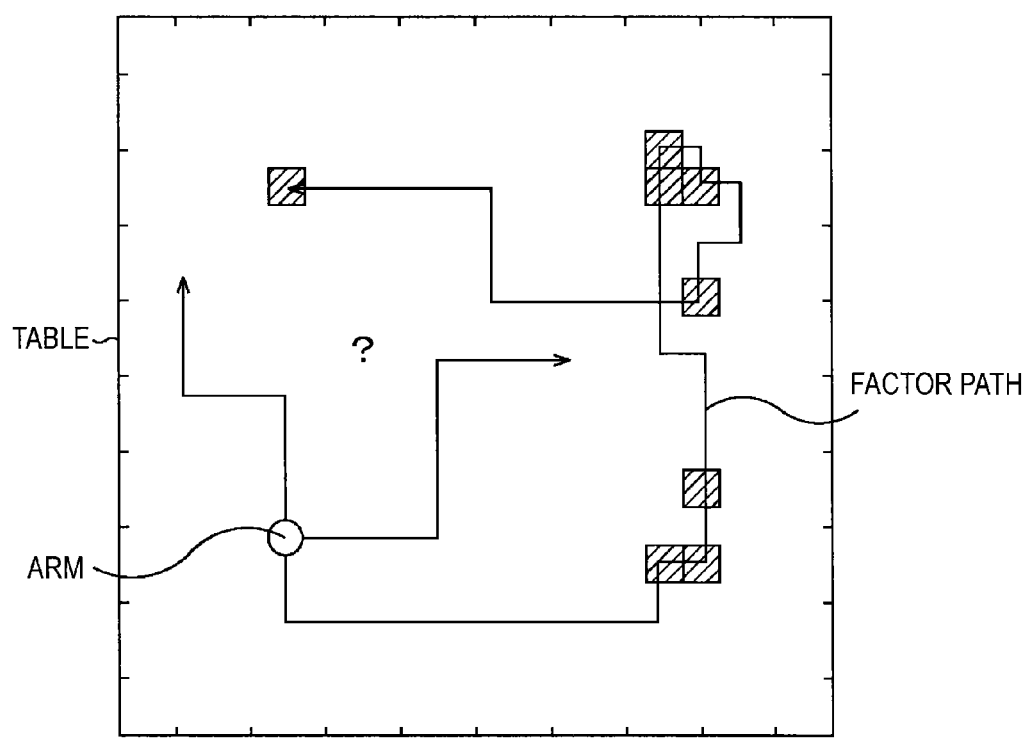
FIG. 15 is a diagram illustrating decision processing in step S34.

FIG. 15 is a diagram illustrating decision processing in step S34 in FIG. 11.

In the decision processing, the decision unit 63 decides a series in which at least one state of the arm HMM as an occurring factor is arranged as a causal acquisition plan based on the evaluation value $V_{i[now];k}$ from the evaluation value calculation unit 62.

The evaluation value $V_{i[now];k}$ is a value that evaluates the effectiveness of the occurrence of each state $c_{1, 2, \ldots, c_K}$ of the arm HMM to acquire a causal relationship between (the occurrence of) the state $c_k$ of the arm HMM and the state transition $T_{i[now]j}$ of the object HMM and therefore, effective information, that is, information that makes a causal relationship between the state $c_k$ of the arm HMM and the state transition $T_{i[now]j}$ of the object HMM clearer can be obtained by causing the state $c_k$ of the arm HMM whose evaluation value $V_{i[now];k}$ is large.

If the state $c_k$ of the arm HMM whose evaluation value $V_{i[now];k}$ can instantly be caused, that is, a (direct) state transition from the current state $c_{k[now]}$ to the state $c_k$ of the arm HMM whose evaluation value $V_{i[now];k}$ is large is possible in the arm HMM (the arm can be moved so as to cause the state transition from the current state $c_{k[now]}$ to the state $c_k$ of the arm HMM whose evaluation value $V_{i[now];k}$ is large in the arm HMM) and therefore, the state transition of the arm HMM is not limited, the decision unit 63 decides a series of two states, the current state $c_{k[now]}$ of the arm HMM and the state $c_k$ of the HMM of the maximum evaluation value $V_{i[now];k}$ as a causal acquisition plan.

On the other hand, if the state $c_k$ of the arm HMM whose evaluation value $V_{i[now];k}$ may not be instantly caused, that is, a plurality of state transitions may be necessary to cause the current state $c_{k[now]}$ to switch to the state $c_k$ of the arm HMM whose evaluation value $V_{i[now];k}$ is large in the arm HMM (the arm may not be moved so as to cause the state transition directly from the current state $c_{k[now]}$ to the state $c_k$ of the arm HMM whose evaluation value $V_{i[now];k}$ is large in the arm HMM) and therefore, the state transition of the arm HMM is limited, the decision unit 63 sets the current state $c_{k[now]}$ of the arm HMM as the initial state and decides, among factor paths, which are series of states $c_k$ as factors capable of causing state transitions, the factor path having the maximum average value (including the weighted average value) of the added value of the evaluation values $V_{i[now];k}$ the states $c_k$ as factors constituting the factor path as a causal acquisition plan.

That is, FIG. 15 shows an example of the factor path.

The factor path corresponds to (can be associated with) a trajectory of the arm moving one the table and thus, as shown in FIG. 15, many state series exist as factor paths having the current state $c_{k[now]}$ of the arm HMM as the initial state.

The decision unit 63 decides, among so many factor paths, the factor path having the maximum average value of the added value of the evaluation values $V_{i[now];k}$ the states $c_k$ as factors constituting the factor path as a causal acquisition plan.

In FIG. 15, shaded portions indicate positions on the table corresponding to the states $c_k$ of the arm HMM whose evaluation value $V_{i[now];k}$ is large and the decision unit 63 conceptually decides a factor path corresponding to trajectories of the arm passing through such positions as a causal acquisition plan.

Figure 16:
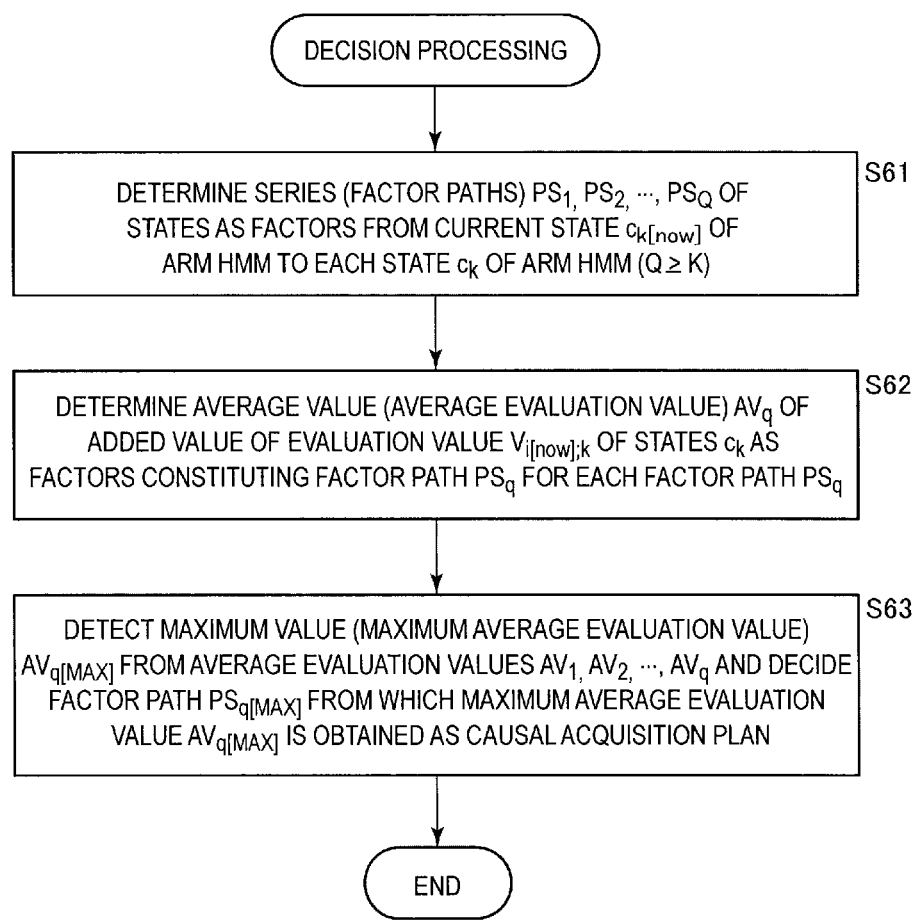
FIG. 16 is a flow chart illustrating the decision processing in step S34.

FIG. 16 is a flow chart illustrating the decision processing in step S34 in FIG. 11.

In the decision processing, in step S61, the decision unit 63 determines factor paths $PS_1, PS_2, \ldots, PS_Q$, which are series of states as factors from the current state $c_{k[now]}$ of the arm HMM to each state $c_k$ of the arm HMM as candidates (plan candidates) of the causal acquisition plan before proceeding to step S62.

The decision unit 63 determines, for example, at least one series as a factor path up to the state $c_k$ for one state $c_k$ of the arm HMM.

Therefore, the number Q of the factor paths $PS_q$ ($q=1, 2, \ldots, Q$) is a number equal to the number K of states $c_k$ of the arm HMM or more ($Q \geq K$).

If state transitions that loop two or more arm HMMs are permitted as factor paths from the current state $c_{k[now]}$ of the arm HMM to some state $c_k$ of the arm HMM, an infinite number of factor paths will exist and thus, the decision unit 63 restricts (the number of) factor paths determined as plan candidates by determining factor paths under predetermined restrictions (conditions).

That is, if there is no restriction on state transitions of the arm HMM (for example, the agent is a character of a video game and can move the arm to any position instantaneously), the decision unit 63 decides a series of two states, the current state $c_{k[now]}$ of the arm HMM and the state $c_k$ of the arm HMM for each state $c_k$ of the arm HMM as a factor path $PS_k$.

Therefore, if there is no restriction on state transitions of the arm HMM, the number Q of factor paths $PS_q$ (q=1, 2, . . . , Q) matches the number K of the states $c_k$ of the arm HMM.

If state transitions of the arm HMM are restricted, the decision unit 63 sets the current state $c_{k[now]}$ of the arm HMM as the initial state and searches for factor paths to be plan candidates according to a predetermined search method from factor paths as series of states of the arm HMM capable of making state transitions to the state $c_k$ of the arm HMM for each state $c_k$ of the arm HMM.

That is, the decision unit 63 searches for, as a factor path, series of states reaching the state $c_k$ from the current state $c_{k[now]}$ of the arm HMM by selecting the current state $c_{k[now]}$ of the arm HMM as an attention state to be focused on for each state $c_1, c_2, \ldots, c_K$ of the arm HMM and repeatedly selects a state of the arm HMM to which a (direct) state transition is possible from the attention state as a new attention state.

The decision unit 63 searches for at least one factor path for one state $c_k$ of the arm HMM.

When searching for factor paths, for example, the decision unit 63 can limit the number of states (search depth) of the arm HMM constituting factor paths to a predetermined number.

When searching for factor paths, for example, the decision unit 63 can perform a width priority search that limits the number of states of the arm HMM that are newly selected as an attention state to a predetermined number.

Further, when searching for factor paths, for example, the decision unit 63 can search for series of states that do not contain any loop as factor paths by inhibiting factor paths from containing a loop. In such a case, the series length (path length) of the factor path (number of states of the arm HMM constituting the factor path) is guaranteed to have a finite length.

In addition, the decision unit 63 can search for the shortest state series (state series whose series length is the shortest) reaching the state $c_k$ from the current state $c_{k[now]}$ of the arm HMM by, for example, dynamic programming (for example, the Dijkstra method) as a factor path.

In step S62, the decision unit 63 adds up the evaluation value $V_{i[now];k}$ of the state $c_k$ of the arm HMM as a factor constituting the factor path $PS_q$ for each factor path $PS_q$ and determines the average value (hereinafter, referred to also as the average evaluation value) $AV_q$ of the resultant added value of the evaluation value $V_{i[now];k}$ as a value indicating the effectiveness (hereinafter, referred to also as effectiveness of the factor path $PS_q$) to take action following the factor path $PS_q$ to acquire a causal relationship between the state of the arm HMM and the state transition of the object HMM before proceeding to step S63.

In the above case, the average evaluation value $AV_q$ as an average value of the added value of the evaluation value $V_{i[now];k}$ of the state $c_k$ of the arm HMM constituting the factor path $PS_q$ is determined as a value indicating the effectiveness of the factor path $PS_q$, but if, when searching for the factor paths $PS_q$, factor paths of a fixed series length are searched for, the added value of the evaluation value $V_{i[now];k}$ of the state $c_k$ of the arm HMM constituting the factor path $PS_q$ may be determined as a value indicating the effectiveness of the factor path $PS_q$.

Under the condition that the series length of each of the factor paths $PS_1, PS_2, \ldots, PS_Q$ is fixed, the added value of the evaluation value $V_{i[now];k}$ of the state $c_k$ of the arm HMM constituting the factor path $PS_q$ is equivalent to the average value $AV_q$ of the added value and therefore, determining the added value of the evaluation value $V_{i[now];k}$ of the state $c_k$ of the arm HMM constituting the factor path $PS_q$ is equivalent to determining the average value $AV_q$ of the added value.

In step S63, the decision unit 63 detects the maximum value (hereinafter, referred to also as the maximum average evaluation value) $AV_{q[MAX]}$ from respective average evaluation values $AV_1, AV_2, \ldots, AV_Q$ of the factor paths $PS_1, PS_2, \ldots, PS_Q$ and decides the factor path $PS_{q[MAX]}$ from which the maximum average evaluation value $AV_{q[MAX]}$ is obtained as the causal acquisition plan.

Then, the decision unit 63 supplies the causal acquisition plan to the action signal generation unit 32.

The action signal generation unit 32 generates an action signal according to the causal acquisition plan from the decision unit 63 and supplies the action signal to the action unit 14.

The action unit 14 drives the arm of the agent according to the action signal from the action signal generation unit 32. Accordingly, the agent moves the arm in such a way that states of the arm HMM constituting the causal acquisition plan sequentially become the current state of the arm HMM.

In the causal processing unit 60 (FIG. 8), as described above, the information amount gain calculation unit 61 assumes that a state transition of the object HMM occurs as a result of the occurrence of a state of the arm HMM and determines the information amount gain that is obtained (will be obtained) by causing a state of the arm HMM and observing the result thereof about a causal relationship between (the occurrence of) a state of the arm HMM and a state transition of the object HMM. Then, the evaluation value calculation unit 62 determines the evaluation value that evaluates the effectiveness of the occurrence of each state of the arm HMM based on the information amount gain to acquire a causal relationship between a state of the arm HMM and a state transition of the object HMM and the decision unit 63 decides, based on the evaluation value, a factor path as a series of states of the arm HMM with the maximum average value of the added value of the evaluation value as the causal acquisition plan as a series of occurring states of the arm HMM.

Therefore, by taking action according to the causal acquisition plan, the agent can collect, through obtaining the causal relationship between the state of the arm HMM and the state transition of the object HMM, causal learning data with a large amount of information, that is, can efficiently collect effective causal learning data so that the time necessary to acquire a causal relationship can be shortened.

[Simulation]

Figure 17:
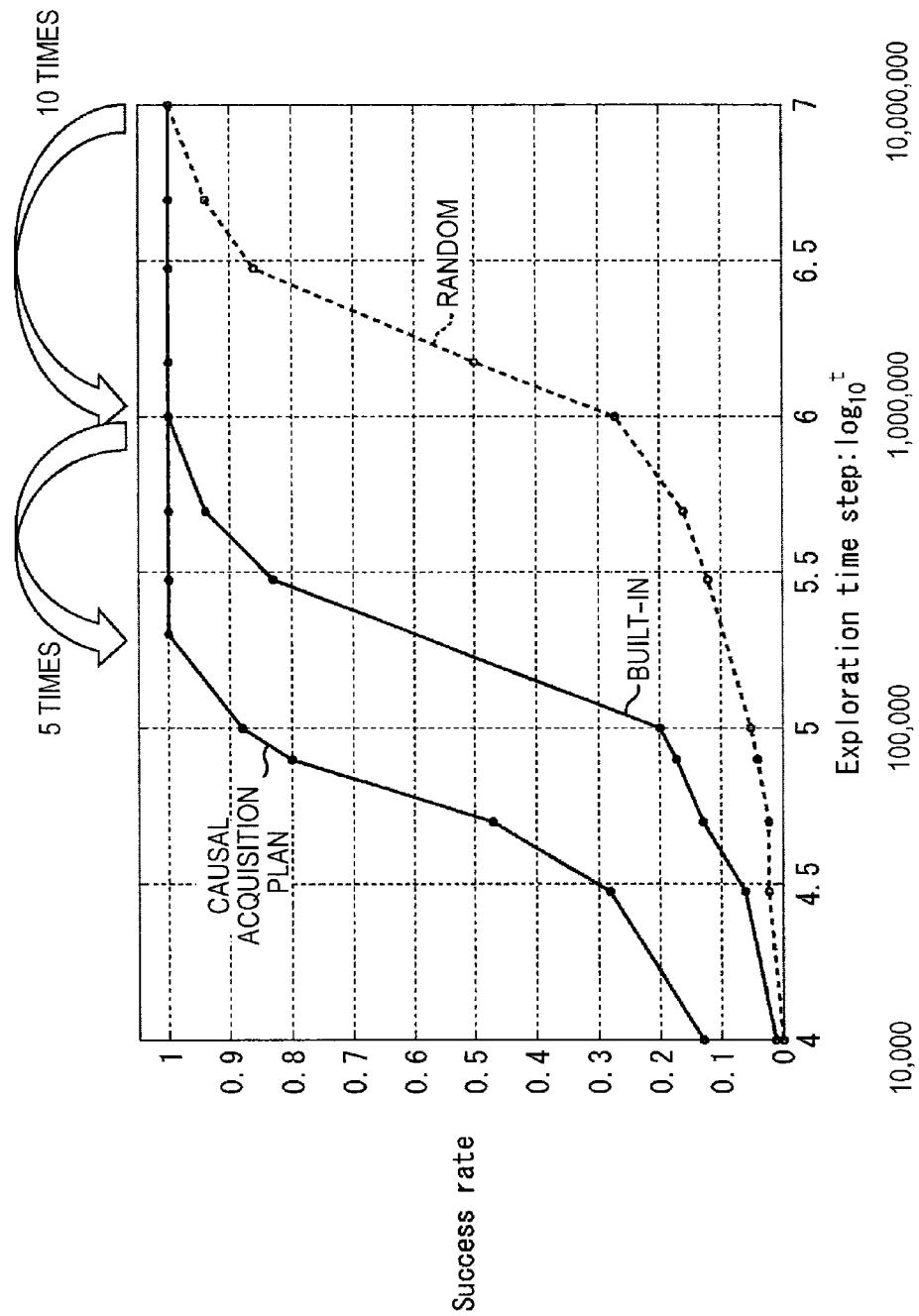
FIG. 17 is a diagram showing a simulation result of the object moving task.

FIG. 17 is a diagram showing a simulation result of the object moving task by, after collecting causal learning data to perform causal learning, making a causal estimate using a result (factor candidate list) of the causal learning.

In the simulation, the arm HMM and the object HMM are learned by using observed values observed while the agent takes action 10,000 times according to an action signal output by the inherent controller 35 and then, the agent is caused to take action to collect causal learning data before collecting causal learning data.

The action taken by the agent to collect causal learning data is called causal collection action.

In the simulation, the agent performs causal learning by using causal learning data collected by the causal collection action and performs the object moving task while making a causal estimate using the result (factor candidate list) of the causal learning.

The agent moves the arm to move the object from the start position to the goal position in the object moving task, but in the simulation, 100 pairs of two positions are randomly decided and for each of the 100 pairs, one of two positions is set as the start position and the other as the goal position to perform the object moving task.

FIG. 17 shows a relationship between the number of times (Exploration step) of action taken by the agent for the learning and the rate of success (Success rate) of the object moving task.

In FIG. 17, the horizontal axis represents the number of times of action taken by the agent for learning on a logarithmic scale.

In the simulation, as described above, the agent takes action 10.000 times to collect data (observed values) used to learn the arm HMM and the object HMM and then takes the causal collection action to collect causal learning data and therefore, the number of times exceeding 10,000 times is the number of times the causal collection action is taken.

In FIG. 17, the vertical axis represents the rate of success when after action (causal collection action) of the number of times of the horizontal axis is taken, causal learning using causal learning data collected by the causal collection action is performed, and the object moving task is performed while making a causal estimate using the result (causal candidate list) of the causal learning.

In the simulation, the rate of success of the object moving task is determined by setting certain cases such as a case when the object cannot be moved to the goal position within a predetermined time as interruption conditions for interrupting the object moving task, counting a case when interruption conditions do not apply and the object can be moved to the goal position as a success of the object moving task, and counting a case when one of the interruption conditions applies and before moving to the goal position as a failure of the object moving task.

Also in the simulation, the rate of success of the object moving task is determined for each of the case when action according to a causal acquisition plan obtained by the causal processing unit 60 is taken as the causal collection action (hereinafter, described also as "causal acquisition plan"), the case when action according to so-called built-in rules (rules implemented by making full use of person's knowledge, for example, "Push an object to move the object" and "An object does not move when the object is pressed against the wall and in such a case, move round to the opposite side and then the object") is taken as the causal collection action (hereinafter, described also as "built-in"), and the case when random action is taken as the causal collection action (hereinafter, described also as "random").

In the simulation, other conditions than the causal collection action for "causal acquisition plan", "built-in", and "random", for example, causal learning by using causal learning data collected by the causal collection action and modules that make a causal estimate by using the result of the causal learning are all made common.

FIG. 17 shows the rate of success of the object moving task for each case of "causal acquisition plan", "built-in", and "random".

It is possible to verify according to FIG. 17 that in order to perform an object moving task whose rate success is 100%, it is necessary for "built-in" to take the causal connection action five times the number of times in the case of "causal acquisition plan" and it is necessary for "random" to take the causal connection action 10 times the number of times in the case of "built-in".

Therefore, according to "causal acquisition plan", effective causal learning data can be collected ⅕ the time necessary for "built-in" and effective causal learning data can be collected 1/50 the time necessary for "random".

[Description of the Computer to which the Present Technology is Applied]

Next, a sequence of processing described above can be performed by hardware or software. If a sequence of processing is performed by software, a program constituting the software is installed on a general-purpose computer.

Figure 18:
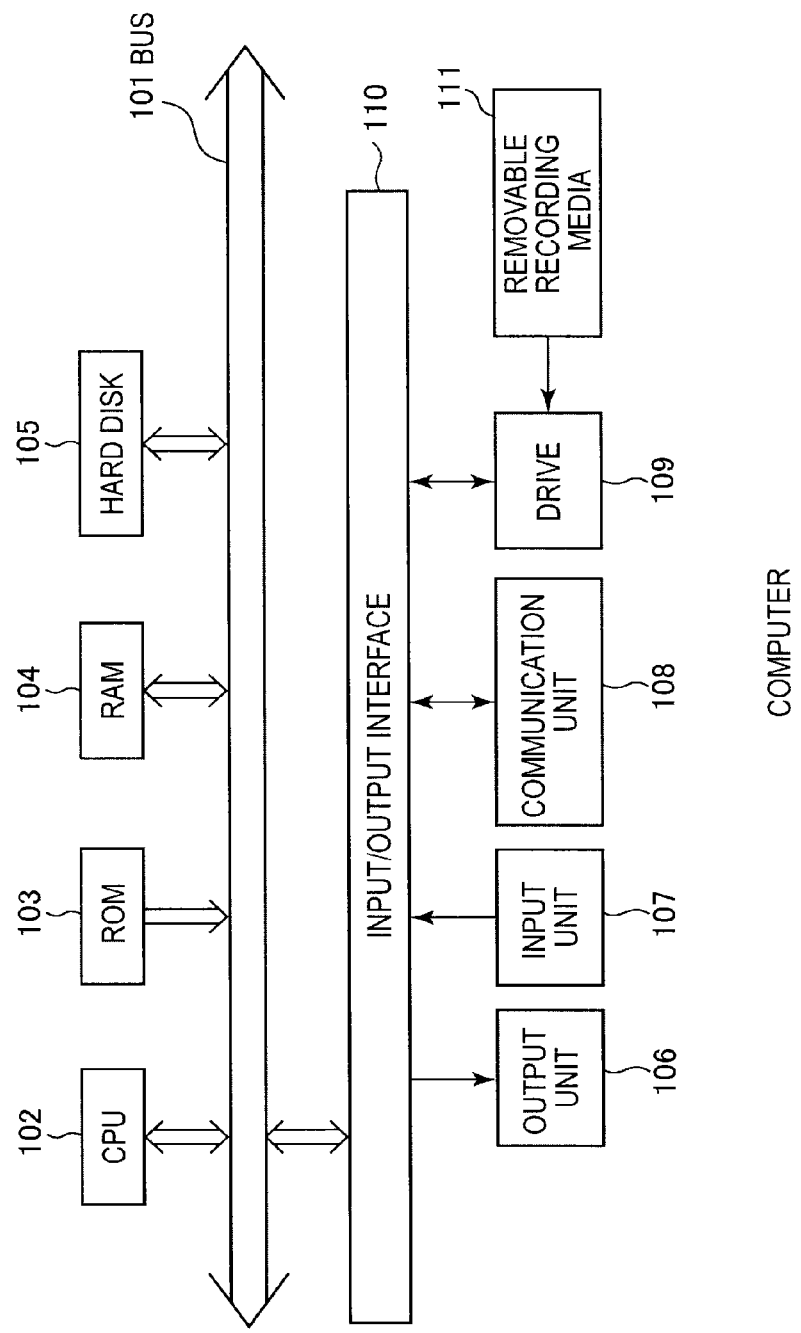
FIG. 18 is a block diagram showing a configuration example of an embodiment of a computer to which the present technology is applied.

FIG. 18 shows a configuration example according to an embodiment of the computer on which the program to perform the above sequence of processing is installed.

The program can be pre-recorded in a hard disk 105 or a ROM 103 as a recording medium contained in the computer.

Alternatively, the program can be stored (recorded) in a removable recording medium 111. The removable recording medium 111 can be provided as so-called packaged software. As the removable recording medium 111, for example, a flexible disk, CD-ROM (Compact Disc Read Only Memory), MO (Magneto Optical) disk, DVD (Digital Versatile Disc), magnetic disk, and semiconductor memory can be cited.

In addition to installing the program on a computer from the removable recording medium 111 as described above, the program can also be installed by downloading to the computer via a communication network or broadcasting network and installing on the contained hard disk 105. That is, for example, the program can be transferred from a download site to the computer via an artificial satellite for digital satellite broadcasting wirelessly or transferred to the computer via a wired network such as a LAN (Local Area Network) and the Internet.

The computer contains a CPU (Central Processing Unit) 102 and an input/output interface 110 is connected to the CPU 102 via a bus 101.

If an instruction is input by the user through an operation of an input unit 107 or the like via the input/output interface 110, the CPU 102 executes a program stored in the ROM (Read Only Memory) 103 according to the instruction. Alternatively, the CPU 102 loads a program stored in the hard disk 105 into a RAM (Random Access Memory) 104 to execute the program.

The CPU 102 thereby performs processing according to the above flow chart or processing performed by the configuration in the above block diagram. Then, the CPU 102 outputs the processing result from an output unit 106 via, for example, the input/output interface 110 when necessary or transmits the processing result from a transmission unit 108 or further causes the hard disk 105 to record the processing result.

The input unit 107 is constituted of, for example, a keyboard, mouse, microphone and the like. The output unit 106 is constituted of an LCD (Liquid Crystal Display), speaker and the like.

Processing performed herein by the computer according to a program does not necessarily have to be performed chronologically in the order described in a flow chart. That is, processing performed by the computer according to a program also includes processing performed in parallel or individually (for example, parallel processing or processing by an object).

The program may be processed by one computer (processor) or by a plurality of computers in a distributed manner. Further, the program may be performed after being transferred to a remote computer.

Embodiments of the present technology are not limited to the above embodiments and various modifications may be made without deviating from the scope of the present technology.

For example, the present technology may be configured as cloud computing in which one function is shared and processed commonly by a plurality of apparatuses via a network.

Moreover, each step described in the above flow charts may be executed not only by one apparatus, but also by a plurality of apparatuses by dividing the step among these apparatuses.

Further, if a plurality of pieces of processing is contained in one step, the plurality of pieces of processing contained in the one step may be performed not only by one apparatus, but also by a plurality of apparatuses by dividing the step among these apparatuses.

While a case when the present technology is applied to the object moving task is described in the present embodiment, but the present technology can be applied to any task other than the object moving task.

Further, in the present embodiment, (the occurrence of) the state of one HMM, the arm HMM, is adopted as the factor $c_k$, but (a state vector having as elements) respective states of a plurality of HMMs may be adopted as the factors $c_k$.

Additionally, the present technology may also be configured as below.

(1) An information processing apparatus, including:
an information amount gain calculation unit that, on the assumption that a factor that could cause a state transition in a state transition model occurs and the state transition takes place as a result of an occurrence of the factor, determines an information amount gain, which is an information amount obtained by causing the factor to occur regarding a causal relationship between the factor and the state transition and observing a result thereof;
an evaluation value calculation unit that determines an evaluation value to evaluate effectiveness of causing each of the factors to occur based on the information amount gain to acquire the causal relationship between the factor and the state transition; and
a decision unit that decides the factor to be occurred based on the evaluation value.

(2) The information processing apparatus according to (1),
wherein the information amount gain calculation unit
determines an inter-distribution distance indicating a divergence between a probability distribution of a base probability as a probability with which the state transition takes place in a predetermined state and a probability distribution of a factor conditional probability as a probability with which a predetermined factor occurs and the state transition takes place in the predetermined state as a causal relationship amount indicating a degree of the causal relationship between the predetermined factor and the state transition in the predetermined state, and
causes the predetermined factor to occur to determine a difference between the causal relationship amount after observing a result thereof and the causal relationship amount before the predetermined factor occurs as the information amount gain.

(3) The information processing apparatus according to (2),
wherein the inter-distribution distance is a KL (Kullback-Leibler) divergence of the probability distribution of the base probability and the probability distribution of the factor conditional probability.

(4) The information processing apparatus according to (2) or (3),
wherein the probability with which the state transition takes place follows a beta distribution.

(5) The information processing apparatus according to (4),
wherein an expected value of the base probability as the probability with which the state transition takes place in a predetermined state to another predetermined state is represented as $B_T/B_S$ by using the number of times $B_S$ of being in the predetermined state and the number of times $B_T$ that the state transition takes place from the predetermined state to the other predetermined state,
wherein the expected value of the factor conditional probability as the probability with which the predetermined factor occurs and the state transition in the predetermined state to the other predetermined state is represented as $N_T/N_S$ by using the number of times $N_S$ of the occurrence of the predetermined factor in the predetermined state, the number of times of having been in the predetermined state being $B_S$, and the number of times $N_T$ that the state transition takes place from the predetermined state to the other predetermined state when the predetermined factor occurs,
wherein the base probability follows the beta distribution of a beta function $B(B_T+1, B_S-B_T+1)$, and
wherein the factor conditional probability follows the beta distribution of a beta function $B(N_T+1, N_S-N_T+1)$.

(6) The information processing apparatus according to any one of (1) to (5),
wherein the evaluation value calculation unit determines, as the evaluation value to evaluate the effectiveness of causing the predetermined factor to occur, a weighted added value obtained by adding the expected value of the information amount gain by assigning a transition probability of the state transition of the state transition model as a weight to acquire the causal relationship between the predetermined factor and the state transition from the predetermined state.

(7) The information processing apparatus according to any one of (1) to (6),
wherein the decision unit determines a factor path as a series of the factors until each of the factors occurs from a current factor as the factor currently occurring and decides the factor path with a maximum average value of an added value of the evaluation value of the factor as a causal acquisition plan as a series of the factors caused to acquire the causal relationship.

(8) The information processing apparatus according to (7),
wherein the decision unit determines the factor path by limiting the number of factors constituting the factor path.

(9) The information processing apparatus according to (7),
wherein the decision unit determines a series of factors containing no loop as the factor path.

(10) The information processing apparatus according to (7),
wherein the decision unit determines a shortest path from the current factor to each of the factors as the factor path.

(11) The information processing apparatus according to (7),
wherein the state transition model is an HMM (Hidden Markov Model), and
wherein, when a current state of a first HMM as one HMM of a plurality of HMMs that have learned by using observed values observed by an agent and the current state of a second HMM of at least one other HMM are recognized by using the observed values,
the information amount gain calculation unit assumes that being in each state of the second HMM is each of the factors and the state transition from the current state of the first HMM occurs as a result of being in each state of the second HMM to determine the information amount gain obtained by being in each state of the second HMM regarding the causal relationship between each state of the second HMM and the state transition of the first HMM, the evaluation value calculation unit determines, as the evaluation value to evaluate the effectiveness of being in each state of the second HMM, the weighted added value obtained by adding the expected value of the information amount gain by assigning the transition probability of the state transition of the first HMM as the weight to acquire the causal relationship between the states of the second HMM and the state transition of the first HMM, and the decision unit determines a series of states to reach each state of the second HMM from the current state of the second HMM as the factor path and decides the series of states of the second HMM as the factor path with the maximum average value of the added value of the evaluation value as the causal acquisition plan.

(12) The information processing apparatus according to (11), wherein, when the state transition of the second HMM is not restricted, the series to reach each of the states of the second HMM from the current state of the second HMM is determined as the factor path.

(13) The information processing apparatus according to (11) or (12), wherein the second HMM is an HMM that has learned movement of an arm of the agent capable of taking action to move the arm, wherein the first HMM is an HMM that has learned movement of a moving object that is moved by being touched by the arm, and wherein the agent moves the arm in such a way that the states of the second HMM constituting the series as the causal acquisition plan sequentially become the current state.

(14) An information processing method, including:

on the assumption that a factor that could cause a state transition in a state transition model occurs and the state transition takes place as a result of an occurrence of the factor, determining an information amount gain, which is an information amount obtained by causing the factor to occur regarding a causal relationship between the factor and the state transition and observing a result thereof;

determining an evaluation value to evaluate effectiveness of causing each of the factors to occur based on the information amount gain to acquire the causal relationship between the factor and the state transition; and deciding the factor to be occurred based on the evaluation value.

(15) A program for causing a computer to function as:

an information amount gain calculation unit that, on the assumption that a factor that could cause a state transition in a state transition model takes place and the state transition occurs as a result of an occurrence of the factor, determines an information amount gain, which is an information amount obtained by causing the factor to occur regarding a causal relationship between the factor and the state transition and observing a result thereof;

an evaluation value calculation unit that determines an evaluation value to evaluate effectiveness of causing each of the factors to occur based on the information amount gain to acquire the causal relationship between the factor and the state transition; and a decision unit that decides the factor to be occurred based on the evaluation value.

The present disclosure contains subject matter related to that disclosed in Japanese Priority Patent Application JP 2011-196773 filed in the Japan Patent Office on Sep. 9, 2011, the entire content of which is hereby incorporated by reference.

What is claimed is:

1. An information processing apparatus, comprising:

circuitry configured to:

determine, based on an assumption that a factor that could cause a state transition in a state transition model occurs and the state transition takes place as a result of an occurrence of the factor, an information amount gain, which is an information amount obtained by causing the factor to occur regarding a causal relationship between the factor and the state transition and observing a result thereof;

determine an inter-distribution distance indicating a divergence between a probability distribution of a base probability as a probability with which the state transition takes place in a predetermined state and a probability distribution of a factor conditional probability as a probability with which a predetermined factor occurs and the state transition takes place in the predetermined state as a causal relationship amount indicating a degree of the causal relationship between the predetermined factor and the state transition in the predetermined state;

cause the predetermined factor to occur to determine a difference between the causal relationship amount after observing a result thereof and the causal relationship amount before the predetermined factor occurs as the information amount gain;

determine an evaluation value to evaluate effectiveness of causing each of the factors to occur based on the information amount gain to acquire the causal relationship between the factor and the state transition; and decide the factor to be occurred based on the evaluation value.

2. The information processing apparatus according to claim 1, wherein the inter-distribution distance is a KL (Kullback-Leibler) divergence of the probability distribution of the base probability and the probability distribution of the factor conditional probability.

3. The information processing apparatus according to claim 2, wherein the probability with which the state transition takes place follows a beta distribution.

4. The information processing apparatus according to claim 3, wherein an expected value of the base probability as the probability with which the state transition takes place in a predetermined state to another predetermined state is represented as $B_T/B_S$ by using the number of times $B_S$ of being in the predetermined state and the number of times $B_T$ that the state transition takes place from the predetermined state to the other predetermined state, wherein the expected value of the factor conditional probability as the probability with which the predetermined factor occurs and the state transition in the predetermined state to the other predetermined state is represented as $N_T/N_S$ by using the number of times $N_S$ of the occurrence of the predetermined factor in the predetermined state, the number of times of having been in the predetermined state being $B_S$, and the number of times $N_T$ that the state transition takes place from the predetermined state to the other predetermined state when the predetermined factor occurs, wherein the base probability follows the beta distribution of a beta function $B(B_T+1, B_S-B_T+1)$, and wherein the factor conditional probability follows the beta distribution of a beta function $B(N_T+1, N_S-N_T+1)$.

5. The information processing apparatus according to claim 4,
wherein the circuitry is configured to determine, as the evaluation value to evaluate the effectiveness of causing the predetermined factor to occur, a weighted added value obtained by adding the expected value of the information amount gain by assigning a transition probability of the state transition of the state transition model as a weight to acquire the causal relationship between the predetermined factor and the state transition from the predetermined state.

6. The information processing apparatus according to claim 5,
wherein the circuitry is configured to determine a factor path as a series of the factors until each of the factors occurs from a current factor as the factor currently occurring and decides the factor path with a maximum average value of an added value of the evaluation value of the factor as a causal acquisition plan as a series of the factors caused to acquire the causal relationship.

7. The information processing apparatus according to claim 6,
wherein the circuitry is configured to determine the factor path by limiting the number of factors constituting the factor path.

8. The information processing apparatus according to claim 6,
wherein the circuitry is configured to determine a series of factors containing no loop as the factor path.

9. The information processing apparatus according to claim 6,
wherein the circuitry is configured to determine a shortest path from the current factor to each of the factors as the factor path.

10. The information processing apparatus according to claim 6,
wherein the state transition model is an HMM (Hidden Markov Model), and
wherein, when a current state of a first HMM as one HMM of a plurality of HMMs that have learned by using observed values observed by an agent and the current state of a second HMM of at least one other HMM are recognized by using the observed values, the circuitry is configured to:
assume that being in each state of the second HMM is each of the factors and the state transition from the current state of the first HMM occurs as a result of being in each state of the second HMM to determine the information amount gain obtained by being in each state of the second HMM regarding the causal relationship between each state of the second HMM and the state transition of the first HMM,
determine, as the evaluation value to evaluate the effectiveness of being in each state of the second HMM, the weighted added value obtained by adding the expected value of the information amount gain by assigning the transition probability of the state transition of the first HMM as the weight to acquire the causal relationship between the states of the second HMM and the state transition of the first HMM, and
determine a series of states to reach each state of the second HMM from the current state of the second HMM as the factor path and decide the series of states of the second HMM as the factor path with the maximum average value of the added value of the evaluation value as the causal acquisition plan.

11. The information processing apparatus according to claim 10,
wherein, when the state transition of the second HMM is not restricted, the series to reach each of the states of the second HMM from the current state of the second HMM is determined as the factor path.

12. The information processing apparatus according to claim 10,
wherein the second HMM is an HMM that has learned movement of an arm of the agent capable of taking action to move the arm,
wherein the first HMM is an HMM that has learned movement of a moving object that is moved by being touched by the arm, and
wherein the agent moves the arm in such a way that the states of the second HMM constituting the series as the causal acquisition plan sequentially become the current state.

13. An information processing method, comprising:
determining, via circuitry of an information processing apparatus and based on an assumption that a factor that could cause a state transition in a state transition model occurs and the state transition takes place as a result of an occurrence of the factor, an information amount gain, which is an information amount obtained by causing the factor to occur regarding a causal relationship between the factor and the state transition and observing a result thereof;
determining, via the circuitry, an inter-distribution distance indicating a divergence between a probability distribution of a base probability as a probability with which the state transition takes place in a predetermined state and a probability distribution of a factor conditional probability as a probability with which a predetermined factor occurs and the state transition takes place in the predetermined state as a causal relationship amount indicating a degree of the causal relationship between the predetermined factor and the state transition in the predetermined state;
causing, via the circuitry, the predetermined factor to occur to determine a difference between the causal relationship amount after observing a result thereof and the causal relationship amount before the predetermined factor occurs as the information amount gain:
determining, via the circuitry, an evaluation value to evaluate effectiveness of causing each of the factors to occur based on the information amount gain to acquire the causal relationship between the factor and the state transition; and
deciding, via the circuitry, the factor to be occurred based on the evaluation value.

14. A non-transitory computer readable medium storing a program which, when execute by a computer, causes the computer to function as:
an information amount gain calculation unit that determines, based on an assumption that a factor that could cause a state transition in a state transition model takes place and the state transition occurs as a result of an occurrence of the factor, an information amount gain, which is an information amount obtained by causing the factor to occur regarding a causal relationship between the factor and the state transition and observing a result thereof;

an evaluation value calculation unit that determines an evaluation value to evaluate effectiveness of causing each of the factors to occur based on the information amount gain to acquire the causal relationship between the factor and the state transition; and a decision unit that decides the factor to be occurred based on the evaluation value, wherein the information amount gain calculation unit:

determines an inter-distribution distance indicating a divergence between a probability distribution of a base probability as a probability with which the state transition takes place in a predetermined state and a probability distribution of a factor conditional probability as a probability with which a predetermined factor occurs and the state transition takes place in the predetermined state as a causal relationship amount indicating a degree of the causal relationship between the predetermined factor and the state transition in the predetermined state, and causes the predetermined factor to occur to determine a difference between the causal relationship amount after observing a result thereof and the causal relationship amount before the predetermined factor occurs as the information amount gain.

* * * * *